US012331564B2

(12) United States Patent
Minnich et al.

(10) Patent No.: US 12,331,564 B2
(45) Date of Patent: Jun. 17, 2025

(54) VEHICLE GLOVE BOX LATCH

(71) Applicant: Southco, Inc., Concordville, PA (US)

(72) Inventors: David A. Minnich, Lincoln University, PA (US); Andrew John Keeling, Kennett Square, PA (US)

(73) Assignee: Southco, Inc., Concordville, PA (US)

( * ) Notice: Subject to any disclaimer, the term of this patent is extended or adjusted under 35 U.S.C. 154(b) by 311 days.

(21) Appl. No.: 17/763,797

(22) PCT Filed: Sep. 25, 2020

(86) PCT No.: PCT/US2020/052711
§ 371 (c)(1),
(2) Date: Mar. 25, 2022

(87) PCT Pub. No.: WO2021/062149
PCT Pub. Date: Apr. 1, 2021

(65) Prior Publication Data

US 2022/0341224 A1 Oct. 27, 2022

Related U.S. Application Data

(60) Provisional application No. 62/906,492, filed on Sep. 26, 2019.

(51) Int. Cl.
*E05B 83/30* (2014.01)
*E05B 81/06* (2014.01)

(52) U.S. Cl.
CPC .............. *E05B 83/30* (2013.01); *E05B 81/06* (2013.01)

(58) Field of Classification Search
CPC ................................. E05B 81/06; E05B 83/30
See application file for complete search history.

(56) References Cited

U.S. PATENT DOCUMENTS 4,550,580 A 11/1985 Neyret
5,586,795 A 12/1996 Sasaki
(Continued)

FOREIGN PATENT DOCUMENTS

CN 101112878 A 1/2008
CN 107614821 A 1/2018
(Continued)

OTHER PUBLICATIONS

International Search Report and Written Opinion for International Application No. PCT/US2020/052711, dated Nov. 5, 2020, 10 pages.
(Continued)

*Primary Examiner* — Mark A Williams
(74) *Attorney, Agent, or Firm* — Buchanan Ingersoll & Rooney PC

(57) ABSTRACT

A vehicle glove box latch sub-assembly includes a rotor that is pivotably connected to a rotor mounting portion of a housing, and at least one pawl rotatably coupled to the rotor and having opposing ends. The rotor includes a body, a post disposed on the body, and rotation limiters extending from the post. One end of the opposing ends of the pawl includes an engagement portion that is configured to be engaged with an opening in the vehicle in which the glove box is mounted, and the other end of the opposing ends of the pawl includes a socket that is mounted to the post of the rotor for securing the pawl to the rotor. The socket includes a rotation limiter that is configured to bear on the rotation limiter of the post upon relative rotation between the post and the socket.

23 Claims, 55 Drawing Sheets

(56) References Cited

U.S. PATENT DOCUMENTS

| | | | | |
|---|---|---|---|---|
| 5,927,772 | A * | 7/1999 | Antonucci | E05B 85/18 292/DIG. 31 |
| 6,669,243 | B2 | 12/2003 | Katoh et al. | |
| 7,048,311 | B2 | 5/2006 | Sawatani et al. | |
| 7,182,373 | B2 * | 2/2007 | Yamada | E05B 83/30 292/171 |
| 7,383,707 | B2 | 6/2008 | Yamada et al. | |
| 7,455,333 | B2 | 11/2008 | Ookawara | |
| 7,475,929 | B2 | 1/2009 | Yamada | |
| 7,490,875 | B2 * | 2/2009 | Najima | E05C 3/24 292/201 |
| 7,695,028 | B2 | 4/2010 | Katou et al. | |
| 7,766,409 | B2 * | 8/2010 | Ohnuki | E05B 63/242 292/231 |
| 7,832,240 | B2 | 11/2010 | Najima | |
| 8,033,582 | B2 | 10/2011 | Sawatani et al. | |
| 8,141,398 | B2 | 3/2012 | Ookawara | |
| 8,403,374 | B2 | 3/2013 | Shimizu et al. | |
| 8,590,351 | B2 | 11/2013 | Ookawara et al. | |
| 8,789,863 | B2 | 7/2014 | Shimizu | |
| 9,074,389 | B2 | 7/2015 | Shimizu | |
| 9,121,206 | B2 * | 9/2015 | Shimizu | E05C 9/042 |
| 9,850,691 | B2 | 12/2017 | Nakasone | |
| 10,376,485 | B2 | 8/2019 | Yang et al. | |
| 10,480,223 | B2 * | 11/2019 | Nakasone | E05C 9/042 |
| 10,822,836 | B2 | 11/2020 | Nakasone | |
| 2002/0171248 | A1 * | 11/2002 | Diss | E05B 83/30 292/164 |
| 2003/0025339 | A1 * | 2/2003 | Vitry | E05B 83/30 292/213 |
| 2004/0168487 | A1 * | 9/2004 | Sawatani | B60R 7/06 70/145 |
| 2006/0208495 | A1 | 9/2006 | Talukdar et al. | |
| 2007/0080542 | A1 * | 4/2007 | Ookawara | E05B 83/30 292/36 |
| 2007/0163310 | A1 | 7/2007 | Ookawara et al. | |
| 2014/0150505 | A1 | 6/2014 | Shimizu | |
| 2015/0008680 | A1 | 1/2015 | Suzuki | |
| 2015/0028602 | A1 | 1/2015 | Shimizu et al. | |
| 2015/0152671 | A1 | 6/2015 | Nakasone | |
| 2016/0097225 | A1 | 4/2016 | Tamaki | |
| 2017/0009496 | A1 | 1/2017 | Nakasone | |
| 2017/0009497 | A1 | 1/2017 | Nakasone | |
| 2017/0044803 | A1 | 2/2017 | Nakasone | |
| 2018/0340360 | A1 | 11/2018 | Nakasone | |
| 2019/0003215 | A1 | 1/2019 | Stola et al. | |
| 2019/0234120 | A1 | 8/2019 | Flaute et al. | |
| 2021/0317690 | A1 * | 10/2021 | Nakasone | E05B 83/30 |

FOREIGN PATENT DOCUMENTS

| | | | |
|---|---|---|---|
| CN | 207122213 | U | 3/2018 |
| DE | 112012003202 | T5 | 4/2014 |
| EP | 2090468 | A1 | 8/2009 |
| EP | 2653638 | A1 | 10/2013 |
| FR | 2 882 798 | A1 | 9/2006 |
| GB | 2516802 | A | 2/2015 |
| GB | 2538021 | A | 11/2016 |
| GB | 2540085 | A | 1/2017 |
| GB | 2558858 | A | 7/2018 |
| JP | 0368988 | B2 | 10/1991 |
| JP | 2005009301 | A | 1/2005 |
| JP | 2009235794 | A | 10/2009 |
| JP | 2012097503 | A | 5/2012 |
| JP | 2013018496 | A | 1/2013 |
| JP | 2015200064 | A | 11/2015 |
| JP | 2016185973 | A | 10/2016 |
| JP | 20160143513 | A | 12/2016 |
| WO | 2017094551 | A1 | 6/2017 |
| WO | 2018008598 | A1 | 1/2018 |

OTHER PUBLICATIONS

Chinese Office Action with Search Report for Chinese Application No. 201980038058.6, dated Sep. 2, 2021, 6 pages.
Extended European Search Report for European Application No. 21 189 205.4, dated Mar. 1, 2022, 11 pages.
International Preliminary Report on Patentability for International Application No. PCT/US2019/025404, dated Oct. 6, 2020, 11 pages.
International Search Report and Written Opinion for International Application PCT/US2019/025404, dated Oct. 7, 2019, 15 pages.
Partial European Search Report for European Application No. 21 189 197.3, dated Jan. 10, 2022, 13 pages.
Partial European Search Report for European Application No. 21 189 205.4, dated Nov. 18, 2021, 13 pages.
Entire patent prosecution history of U.S. Appl. No. 17/045,006, filed Oct. 2, 2020, entitled, "Vehicle Glove Box Latch".
Extended European Search Report for European Application No. 21 189 197.3, dated May 9, 2022, 13 pages.
Japanese Notice of Reasons for Rejection for Japanese Application No. 2020-554439, dated Feb. 14, 2023 with translation, 7 pages.
Office Action (Notice of Reasons for Rejection) mailed Jun. 4, 2024, by the Japanese Patent Office in corresponding Japanese Patent Application No. 2022-519254 and an English translation of the Office Action. (4 pages).
Non Final Office Action for U.S. Appl. No. 17/045,006, mailed Oct. 21, 2022, 43 pages.
Office Action issued by the U.S. Patent and Trademark Office in the U.S. Appl. No. 18/491,250, mailed Mar. 31, 2025, U.S. Patent and Trademark Office, Alexandria, VA. (15 pages).

* cited by examiner

VEHICLE GLOVE BOX LATCH

CROSS-REFERENCE TO RELATED APPLICATION

This Application is a U.S. National Phase Patent Application of PCT Patent Application No. PCT/US2020/052711, filed Sep. 25, 2020, which is related to, and claims the benefit of priority of U.S. Provisional Application No. 62/906,492, entitled VEHICLE GLOVE BOX LATCH, filed on Sep. 26, 2019, the contents of each of which are incorporated herein by reference in their entirety for all purposes.

FIELD OF THE INVENTION

The present invention relates to the field of latches or connector systems configured to provide a mechanical connection between adjacent components, and particularly to latch systems for securing automotive glove box or accessory compartment doors in the closed position.

BACKGROUND OF THE INVENTION

Automotive door closure systems, such as glove boxes and the like, typically include a housing, a door, and a latch that cooperates with one or more strikers to hold the door in the closed position to cover the housing. It has been found that there is a continuing need to improve upon or provide alternatives to existing door closure systems.

SUMMARY OF THE INVENTION

According to a first aspect of the present invention, there is provided a vehicle glove box latch sub-assembly for a vehicle glove box. The vehicle glove box latch sub-assembly comprises a housing that is configured to be connected to the vehicle glove box, a rotor that is pivotably connected to a rotor mounting portion of the housing, and at least one pawl rotatably coupled to the rotor and having opposing ends. The rotor includes a body, a post disposed on the body, and rotation limiters extending from the post. One end of the opposing ends of the pawl includes an engagement portion that is configured to be engaged with an opening in the vehicle in which the glove box is mounted, and the other end of the opposing ends of the pawl includes a socket that is mounted to the post of the rotor for securing the pawl to the rotor. The socket includes a rotation limiter that is configured to bear on the rotation limiter of the post upon relative rotation between the post and the socket to either limit or prevent rotation relative rotation between the post and the socket beyond a pre-determined rotational angle.

According to a second aspect of the present invention, there is provided a pawl for a vehicle glove box latch for a vehicle glove box. The pawl comprises an elongated body having opposing ends, wherein one end of the opposing ends of the pawl includes an engagement portion that is configured to be engaged with an opening in the vehicle in which the glove box is mounted, and the other end of the opposing ends of the pawl includes a socket that is configured to be mounted to a rotor for securing the pawl to the rotor. The socket includes a rotation limiter that is configured to bear on a surface of the rotor upon relative rotation between the rotor and the socket to either limit or prevent rotation relative rotation between the rotor and the socket beyond a pre-determined rotational angle.

BRIEF DESCRIPTION OF THE DRAWINGS

The above and other aspects and features of the present invention will become more apparent to those of ordinary skill in the art by describing in detail exemplary embodiments thereof with reference to the attached drawings.

FIGS. 34B and 34C depict different cross sections of the latch assembly.

FIGS. 35B and 35C depict different cross sections of the latch assembly.

DETAILED DESCRIPTION OF THE INVENTION

Figure 1A:
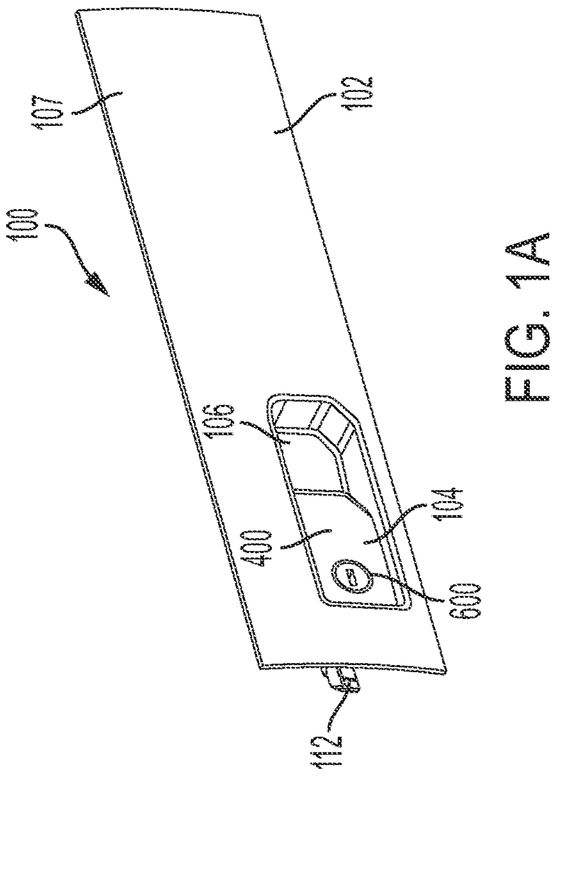
FIG. 1A is a front isometric view of a first exemplary embodiment of a door assembly.

Although the invention is illustrated and described herein with reference to specific embodiments, the invention is not intended to be limited to the details shown. Rather, various modifications may be made in the details within the scope and range of equivalents of the claims and without departing from the invention.

First Embodiment

A first embodiment of a door assembly 100 incorporating aspects of the present invention is illustrated in FIGS. 1A through 14B. The door assembly 100 generally includes a door 102 (only the front panel of which is shown). The door 102 may be a glove box door for a vehicle, for example. Although not shown, the door is mounted over an opening, such as an opening formed in the dashboard of a vehicle. The door 12 is hinged to the opening and can move between a closed position and an open position, as is known in the art.

In the closed position of the door 102, the front face 107 of the door is flush with the surface of the dashboard. In the open position of the door 102, the door 102 protrudes from the surface of the dashboard. Strikers (not shown) are provided at the perimeter of the opening of the dashboard.

The door 102 may be a unitary component or composed of multiple components mounted together. The door 102 includes a generally rectangular shape having a substantially rectangular recessed region 106 on its front face 107. Two projections 115 and 119 project outward in a rear facing direction from the rear face of the door 102.

The projection 115 includes an aperture extending therethrough. A hollow square-shaped clip 121 is mounted to the aperture in the projection 115. Each interior facing side of the clip 121 include resilient tabs 129 that are capable of accommodating transverse motion of the pawl that is positioned therein.

Figure 13A:
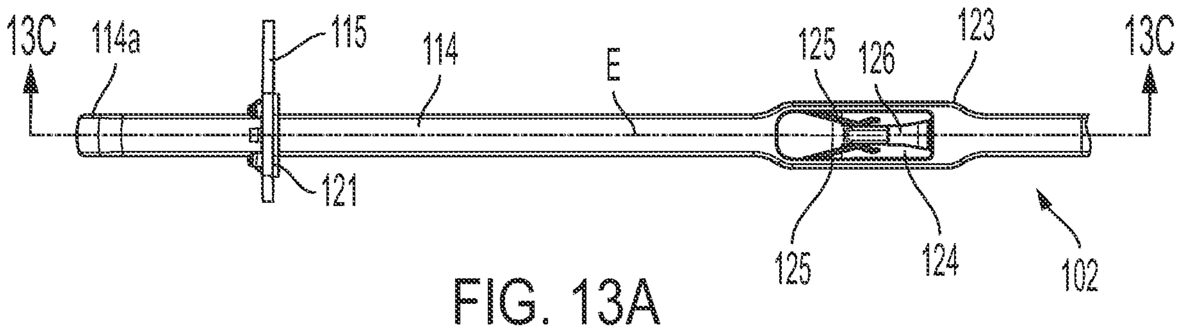
FIG. 13A is a detailed view of the door assembly of FIG. 1B as viewed from the rear of the door assembly.
Figure 13B:
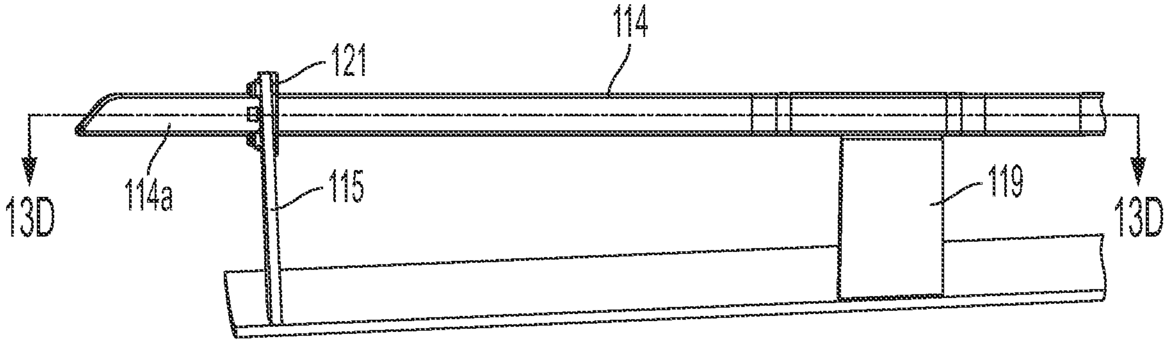
FIG. 13B is a bottom view of the partial door assembly of FIG. 13A.
Figure 13C:
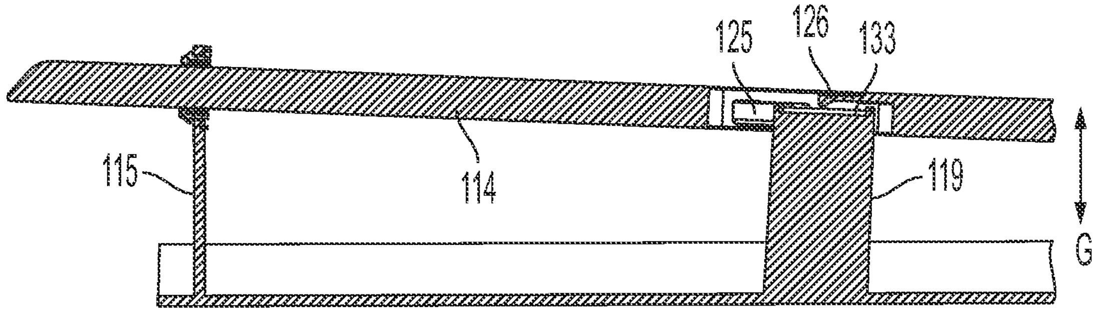
FIG. 13C is a cross-sectional view of the partial door assembly of FIG. 13A taken along the lines 13C-13BC.
Figure 13D:
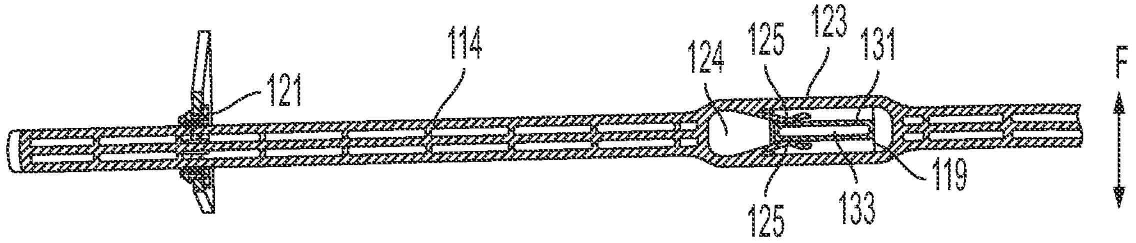
FIG. 13D is a cross-sectional view of the partial door assembly of FIG. 13B taken along the lines 13D-13D.

The projection 119 has a free end 131 that is narrower than the remainder of the projection 119, as best shown in FIG. 13D. An elongated recess 133 or channel is formed at the rear facing surface of the free end 131. The purpose of the projections 115 and 119 will be described in greater detail with reference to FIGS. 13A-13D.

A latch assembly 104 is mounted to the door 102 to releasably retain the door 102 in the closed position. The latch assembly 104 is at least partially positioned within the recessed region 106 of the door 102 such that the front face of the paddle 400 of the latch assembly is either flush with or slightly recessed with respect to the front face 107 of the door 102. Alternatively, the paddle 400 may slightly protrude or significantly protrude, as dictated by the design. The latch assembly 104 is mounted to the recessed region 106 of the door 102 by a threaded fastener 109 and a clip 307 on a housing 300 of the latch assembly 104, as will be described later with reference to the method of assembling the door assembly 100.

The fastener 109 together with the clip 307 comprise a means for mounting the latch assembly 104 to the door 102. It should be understood that the means for mounting can vary. For example, the means for mounting may comprise a plurality of clips, a plurality of fasteners, a snap, a clamp, a weld, an adhesive, a barb, a slot, a prong, or a surface, for example, or any other device that can be used to mount the latch assembly 104 to the door 102.

Figure 1B:
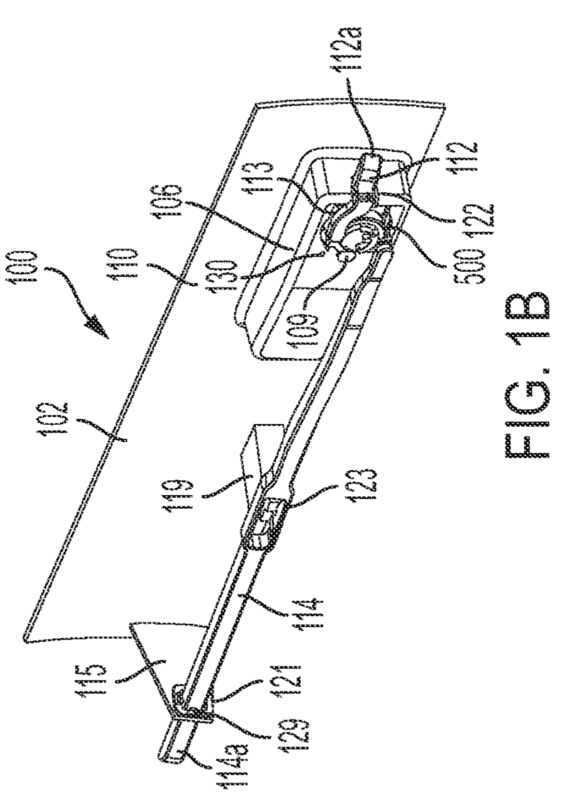
FIG. 1B is a rear isometric view of the door assembly.
Figure 1C:
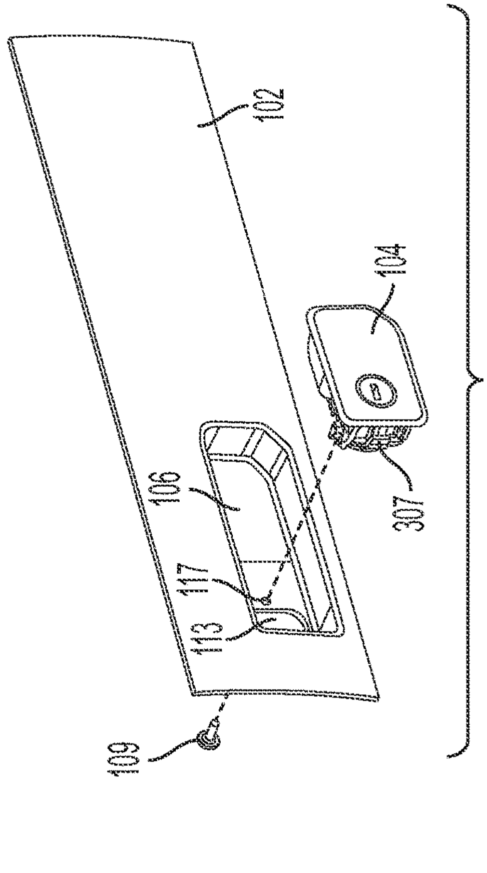
FIG. 1C is another front isometric view of the door assembly with the latch assembly shown exploded from the door.
Figure 14A:
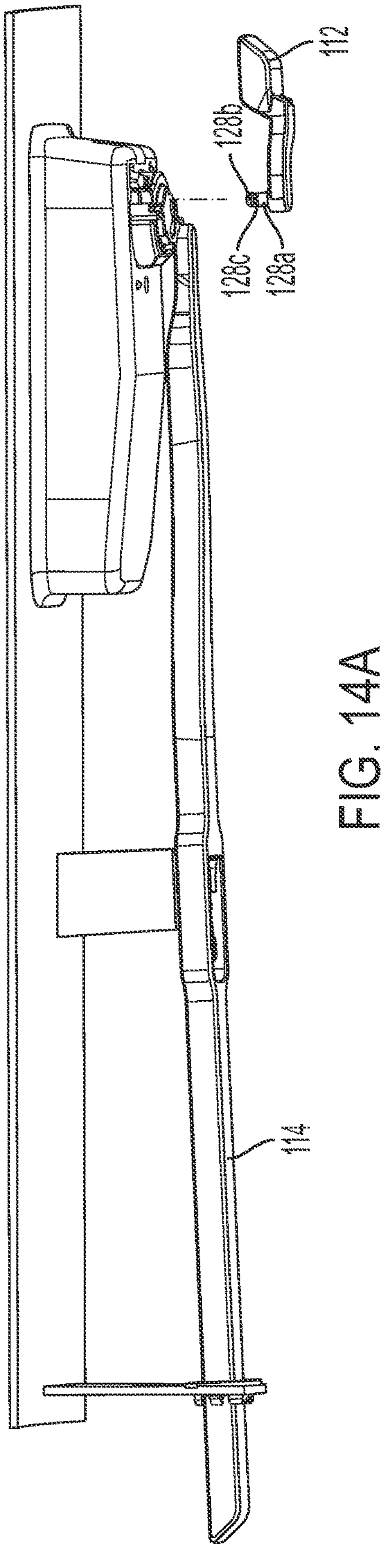
FIGS. 14A and 14B depict different methods for connecting the pawl to the rotor of the door assembly of FIG. 1A.
Figure 14B:
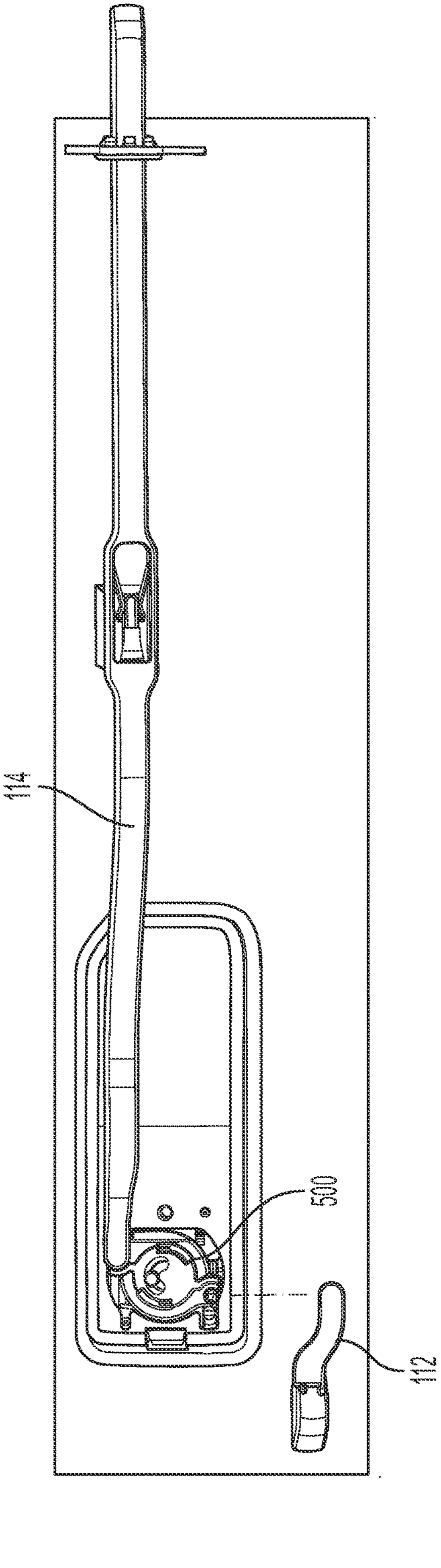
Figure 15A:
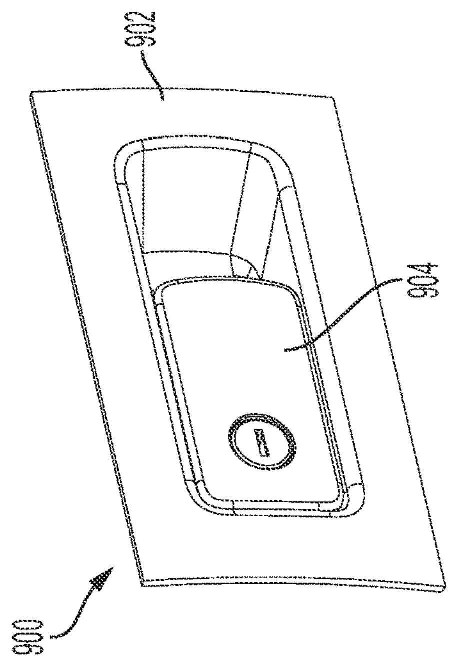
FIG. 15A is a front isometric view of a second exemplary embodiment of a door assembly, wherein only a portion of the door is shown.
Figure 15C:
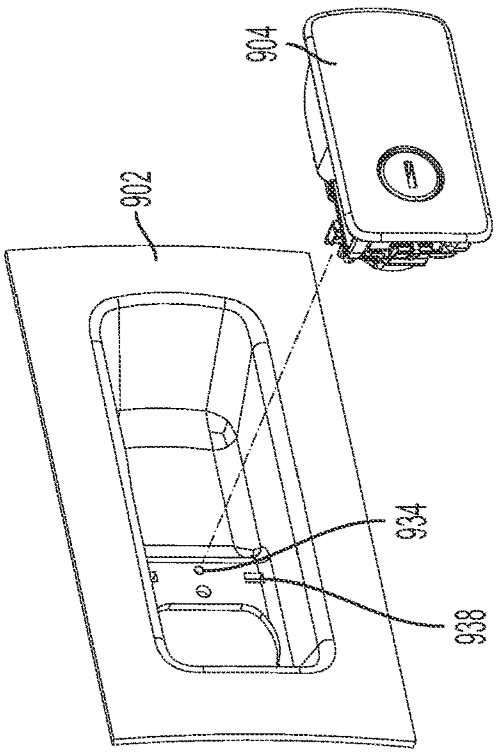
FIG. 15C is another front isometric view of the door assembly with the latch assembly shown exploded from the door.

Referring now to FIGS. 1B, 14A and 14B, at least a portion of the latch assembly 104, including a rotor 500 and two pawls 112 and 114, protrudes from the rear face 110 of the door 102 and through an opening 113 formed in the recessed region 106. The pawls 112 and 114 are configured to releasably engage the strikers on the vehicle opening. When the pawls 112 and 114 are engaged with the strikers, the door 102 is maintained in the closed position. Engagement between the free ends 112*a* and 114*a* of the pawls 112 and 114, respectively and their respective strikers prevents the door 102 from being moved to the open position from the closed position. When the pawls 112 and 114 are separated from the strikers, the door 102 is either maintained in the open position or can readily be moved to the open position.

Opposite the free end 112*a* and 114*a* of each pawl 112 and 114 is a post 120 and 127, respectively, that is connected to the rotor 500 of the latch assembly 104. As shown in FIG. 14A, the post 120 of the pawl 112 includes a shaft 128*a* that extends from the end of the pawl 112, a bulbous portion 128*b* at the free end of the shaft 128*a*, and an annular channel 128*c* defined between the shaft 128*a* and the bulbous portion 128*b*. Although not explicitly shown, it should be understood that the post 127 of the pawl 114 is substantially identical to the post 120. It should be understood that the connection between the pawls 112 and 114 and the rotor 500 may be any type of connection (fixed or releasable), and is not limited to the connection that is shown.

Referring now to FIGS. 1B and 13A-13D, the pawl 114 is both positioned through the clip 121 on the door 102, and mounted above the projection 119 on the door 102. The pawl 114 includes a guide segment 123 that interacts with the projection 119. The guide segment 123 includes an opening 124 formed at a widened region of the pawl 114. Two prongs 125 extend into the opening 124 and toward one another from opposing sides of the opening 124. The prongs 125 approach but do not cross the central axis 'E' (FIG. 13A) of the pawl 114. Each prong 125 is v-shaped and the point of the v-shape points toward the central axis E.

A prong 126 is formed on a side of the opening 124 that is adjacent to both sides of the opening 124 to which the prongs 125 are mounted. The prong 126 extends along the axis E. Also, as shown in FIG. 13A, the prong 126 extends to a length along the central axis E such that it passes over the prongs 125. The prong 126 is positioned at an elevation above the prongs 125 such that the prongs 125 and 126 do not contact each other, as shown in FIG. 13C. The prongs 125 and 126 may be integral with the pawl 114 or provided on a separate component that is mounted in the opening 124. The prongs 125 and 126 are flexible. The prongs 125 interact with the sides of the free end 131 of the projection 119, as shown in FIG. 13D, whereas the prong 126 interacts with the recess 133 formed in the free end 131. Interaction between the pawl 114 and the projection 119 will be described in greater detail with reference to FIGS. 13A-13D.

Figure 2:
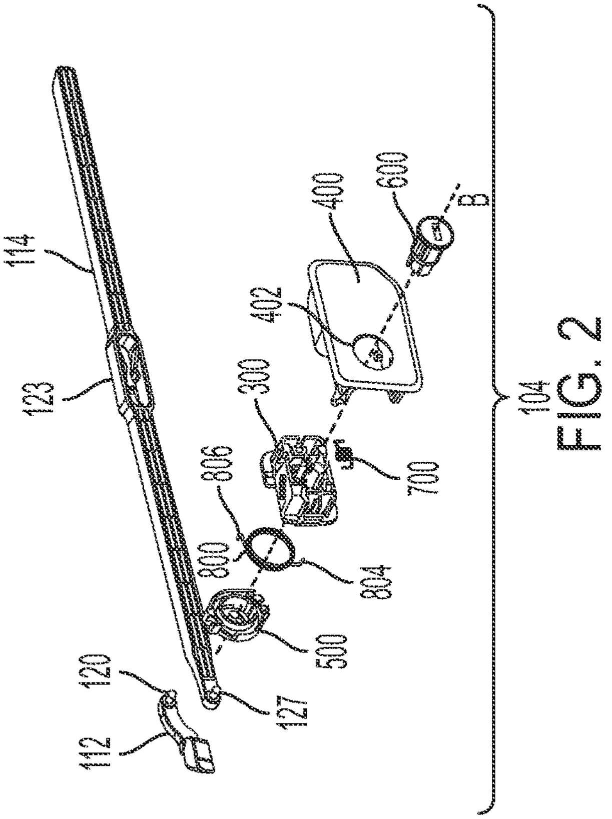
FIG. 2 is an exploded view of the latch assembly of the door assembly of FIGS. 1A-1C.
Figure 3C:
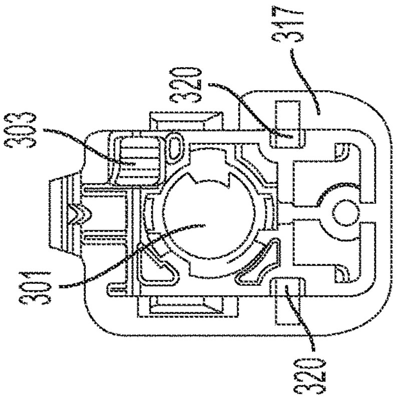
FIGS. 3A, 3B, 3C, 3D, 3E, 3F and 3G are rear isometric, front isometric, front elevation, right elevation, left elevation, top plan and bottom plan views, respectively, of the housing of the latch assembly of FIG. 2.
Figure 3B:
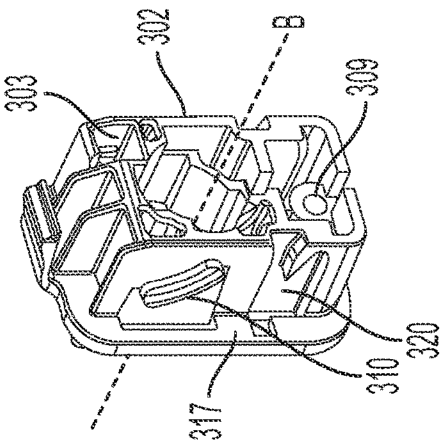
Figure 3A:
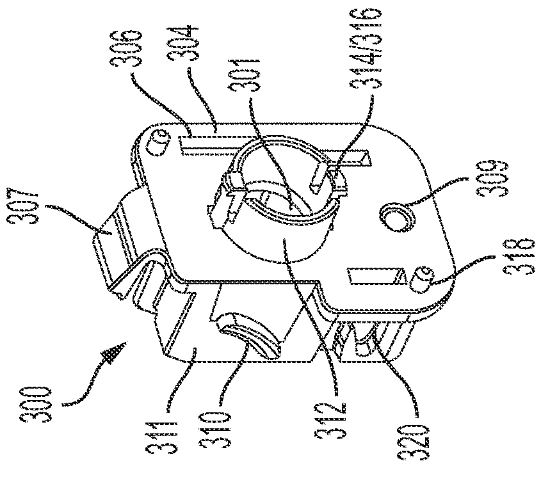
Figure 3G:
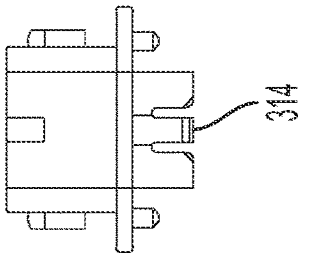
Figure 3F:
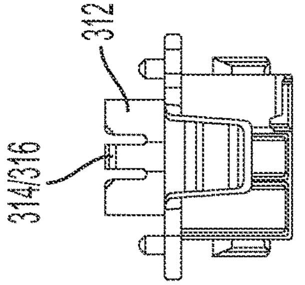
Figure 3E:
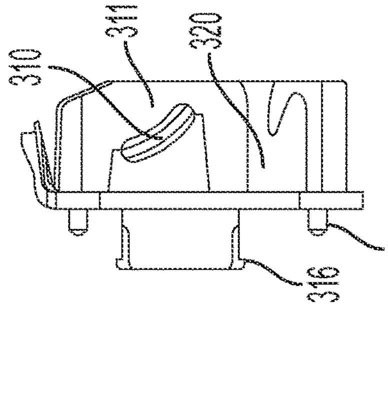
Figure 3D:
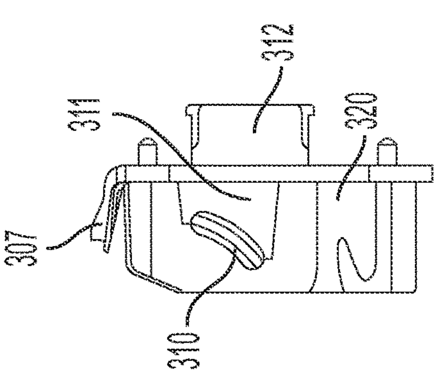
Figures 4A, 4B, 4C, 4D, 4E, 4F, 4G:
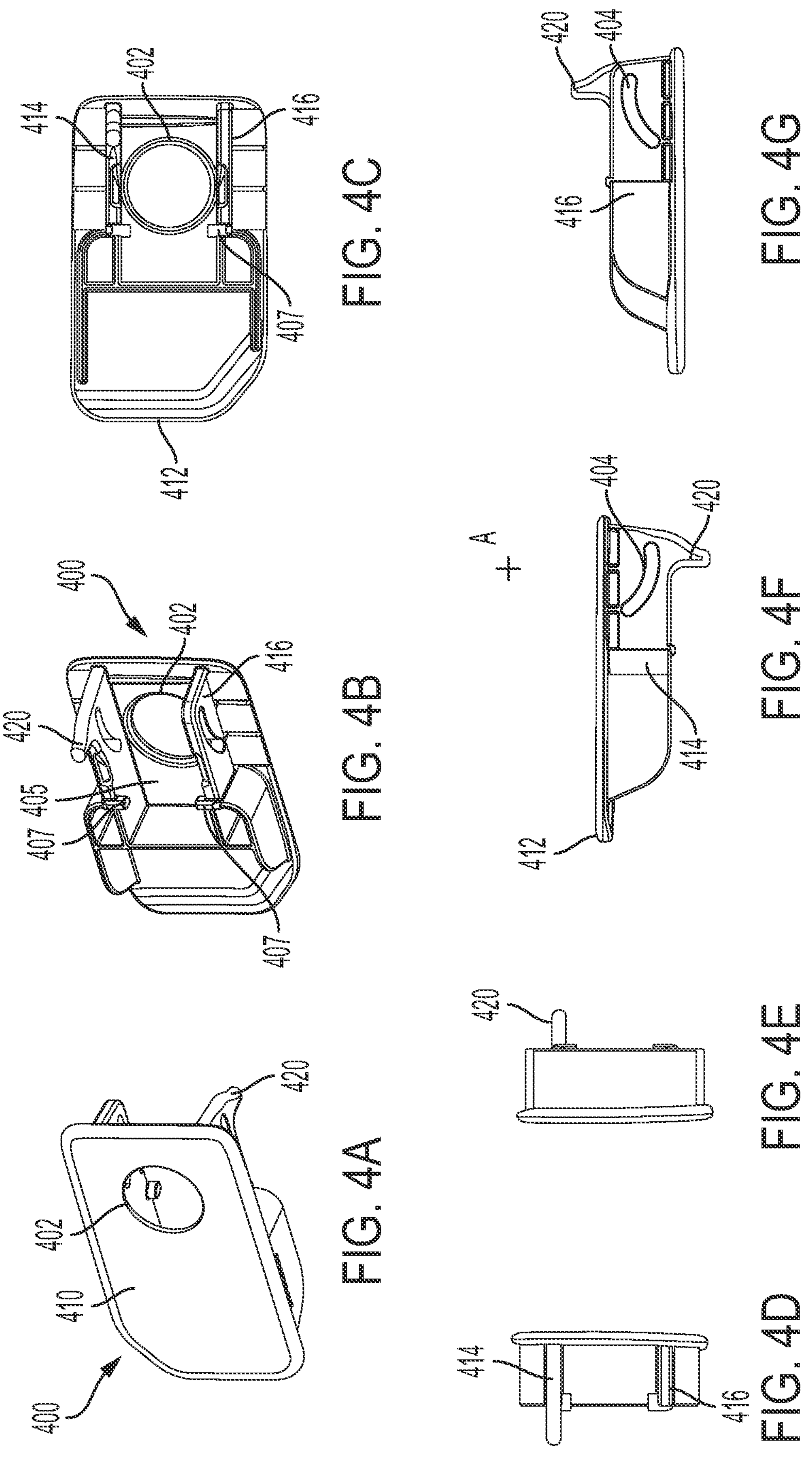
FIGS. 4A, 4B, 4C, 4D, 4E, 4F and 4G are front isometric, rear isometric, rear elevation, right elevation, left elevation, bottom plan and top plan views, respectively, of the paddle of the latch assembly of FIG. 2.

FIG. 2 depicts an exploded view of the latch assembly 104. The primary components of the latch assembly 104 are a base housing 300, a user-operated paddle 400, a rotor 500, a lock barrel 600, torsion springs 700 and 800, and, optionally, two pawls 112 and 114. The base housing 300 is mountable to the front side of the door 102 and remains fixed in place (i.e., stationary) during operation of the latch assembly 104. The paddle 400 is pivotably mounted with respect to the front face 302 of the housing 300 about a pivot axis A (see FIG. 12C). The rotor 500 is rotatably mounted to the rear face 304 of the housing 300 about concentric axis B (see FIGS. 9C, 10C and 11C). The pawls 112 and 114, which may or may not be considered as forming part of the latch assembly 104, are mounted to the rotor 500. The lock barrel 600 is mounted to the housing 300 and aligned with an opening 402 in the paddle 400. The lock barrel 600 is provided for either locking or unlocking the latch assembly 104. The lock barrel 600 is an optional component and may be omitted. The torsion spring 700 is connected to the paddle 400 for retaining the paddle 400 in the home position shown in FIG. 1A. The second torsion spring 800 is connected to the rotor 500 for biasing the rotor 500 to a rotational position corresponding to the closed state of the latch assembly 104 (i.e., in which the pawls 112 and 114 are engaged with the strikers).

The individual components of the latch assembly 104 will now be described in greater detail.

FIGS. 3A-3G depict the base housing 300 of the latch assembly 104. The base housing 300 has a substantially rectangular body to which the other components of the latch assembly 104 are mounted. A recess 301 extends through the housing 300 (unless the latch assembly 104 does not include the lock barrel 600). The outer barrel of the lock barrel 600 is fixed within the recess 301.

The base housing 300 includes the clip 307 for mounting the door 102. The clip 307 is formed on one side of the housing 300. The clip 307 is a flexible tab or prong that extends outwardly from the side of the housing 300. The clip 307 may also be referred to herein as a retention feature, and the retention feature may be a post, surface, clamp, slot, or projection, for example.

Two arcuate shaped ribs 310 protrude from the side walls 311 of the housing 300. The ribs 310 are configured to be positioned within corresponding arcuate shaped slots 404 disposed on the side walls 311 of the paddle 400. The slots 404 are longer (as measured by either length or arc length) than the ribs 310 such that the paddle 400 is capable of pivoting with respect to the housing 300 (compare FIGS. 12A and 12B). The paddle 400 can pivot with respect to the housing 300 about axis A due to the engagement between the slots 404 and the ribs 310.

The ribs 310 may be referred to more generally as a paddle mounting portion of the housing 300. It should be understood that the connection between the housing 300 and the paddle 400 may vary from that which is shown and described. For example, the paddle 400 may be connected to the housing 300 by a post, clip, shaft, fastener, pin, or hinge, for example.

A hollow cylinder 312 protrudes rearwardly from the rear face 304 of the housing 300. The cylinder 312 is collinear with the recess 301, and the interior of the cylinder 312 defines at least a portion of the recess 301. The cylinder 312 is interrupted by two flexible prongs 314 that are positioned on opposite sides of the cylinder 312. Each prong 314 includes a barb 316 at its end, and each prong 314 is configured to flex with respect to the cylinder 312. The barbs 316 are configured to connect to slots 506 formed in the rotor 500. Engagement between the barbs 316 and their respective slots 506 retains the rotor 500 to the housing 300. The slots 506 are longer (as measured by either length or arc length) than the barbs 316 such that the rotor 500 is capable of rotating with respect to the housing 300 without detaching from the housing 300 (compare FIGS. 9C, 10C and 11C).

The engagement between the housing 300 and the rotor 500 can vary. For example, the prongs 314 may be fixed (instead of flexible) and keyed with a slot formed in the rotor 500. Also, the interface between the cylinder 312 and the hollow space 530 formed by the cylindrical inner wall 501 may be switched such that the inner diameter of the cylinder 312 is the interface with the rotor 500 as opposed to the outer diameter of the cylinder 312, as shown.

The cylinder 312 and the prongs 314 may be referred to more generally as a rotor mounting portion of the housing 300. It should be understood that the connection between the housing 300 and the rotor 500 may vary from that which is shown and described. For example, the rotor 500 may be connected to the housing 300 by a post, clamp, barb, surface, fastener, clip, or shaft, for example.

The rotor mounting portion of the housing 300, the rotor 500 and the lock barrel 600 at least partially overlap one another along the axis 'B' and are concentrically aligned along the same axis 'B.' This arrangement results in decreased depth 'D' (see FIG. 9B) of the latch assembly 104, which results in decreased depth of the recess 106 in the glove box door 102 needed to accommodate the latch assembly 104, which results in increased available storage space in the glove box. In contrast, if the rotor mounting portion, rotor and lock barrel were offset from one another and non-overlapping, then such an arrangement would result in increased depth of the latch assembly, increased depth of the recess 106 in the glove box door 102 needed to accommodate the enlarged latch assembly, and decreased available storage space in the glove box.

Two alignment pins 318 (FIG. 3A) protrude from the rear face 304 of the housing 300. Each pin 318 is configured to be inserted into a hole 130 (FIG. 1B) disposed in the door 102 for alignment purposes.

Two tracks 320 are formed on opposite side walls 311 of the housing 300. Posts 407 on the paddle 400 travel in respective tracks 320 upon pivoting the paddle 400. The posts 407 interact with the tracks 320 to limit pivoting action of the paddle 400 beyond a predetermined point, and aid in preventing the paddle 400 from becoming detached from the housing 300. Each track 320 is an indentation formed in the side wall 311. The track 320 protrudes into and is at least partially formed on a shoulder 317 that is formed on the underside of the rear face 304 of the housing 300.

FIGS. 4A-4G depict the paddle 400 of the latch assembly 104. The paddle 400 includes a substantially rectangular front face 410 in the form of a wall. The opening 402 for accommodating the lock barrel 600 is defined in the face 410. The opening 402 may be omitted if the lock barrel 600 is omitted. The end 412 of the front face 410 furthest from the slots 404 is configured to be grasped by a user of the latch assembly 104. Opposing side walls 414 and 416 protrude downwardly from the front face 410. The side wall 414 includes one of the two slots 404, and a rounded leg 420 extending downwardly from the wall 414 at a location adjacent the slot 404. The rounded leg 420 is configured for rotating the rotor 500, as will be described later. One of the two posts 407 extends inwardly from the bottom edge of the side wall 414 toward the side wall 416. The side wall 416 includes the other of the two slots 404. The other of the two posts 407 extends inwardly from the bottom edge of the side wall 416 toward the side wall 414. As noted above, each post 407 is positioned within one of the tracks 320 of the housing 300 in an assembled form of the latch assembly 104.

FIGS. 5A-5G depict the rotor 500 of the latch assembly 104. The rotor 500 is a substantially circular body that is capable of rotating with respect to the housing 300 against the bias of the spring 800. Two crescent shaped recesses 510*a* and 510*b* (referred to either individually or collectively as recess(es) 510) are defined on the perimeter of the rotor 500. Each recess 510 is configured to be releasably coupled to one of the posts 120 and 127 of the pawls 112 and 114, respectively. The posts 120 and 127 are capable of pivoting within the recesses 510 during operation without becoming detached from the recesses 510.

Figure 5C:
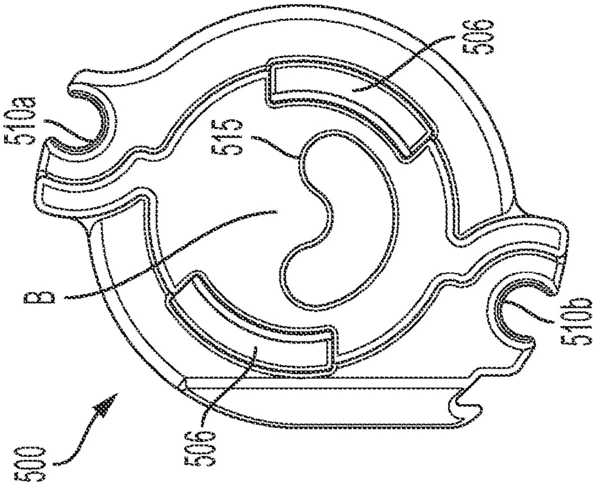
FIGS. 5A, 5B, 5C, 5D and 5E are rear isometric, front isometric, rear elevation, right elevation and bottom plan views, respectively, of the rotor of the latch assembly of FIG. 2.
Figure 5B:
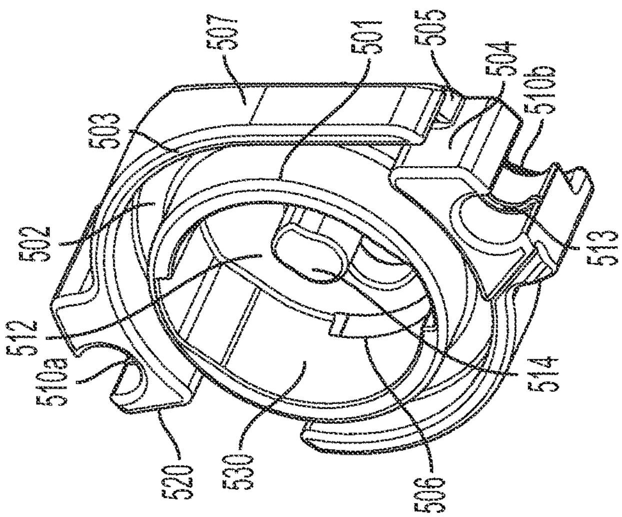
Figure 5E:
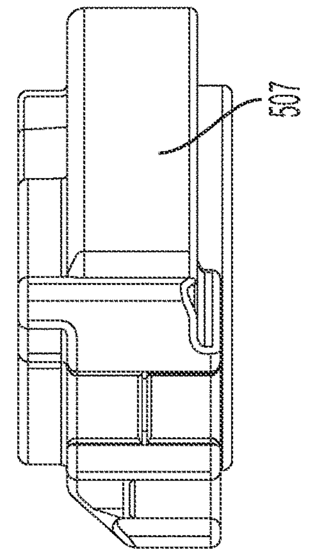
Figure 5A:
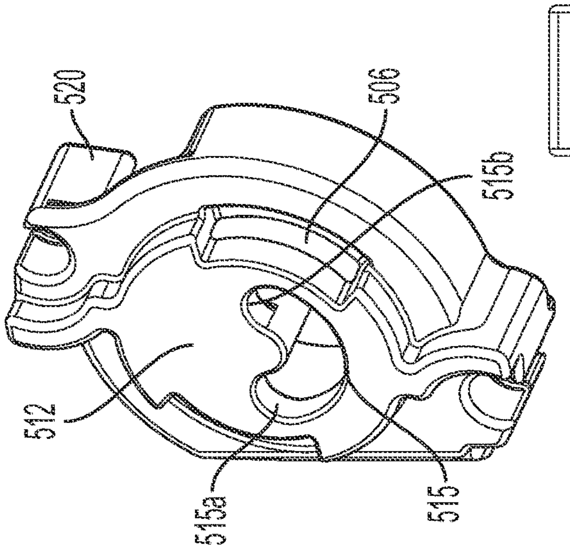
Figure 5D:
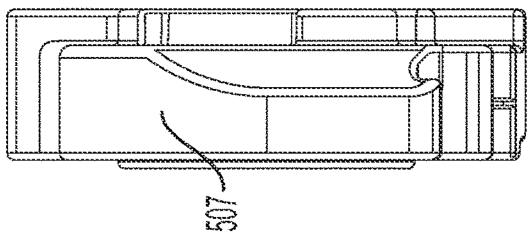

Each recess 510 is defined by a C-shaped clip having a non-continuous perimeter. The non-continuous perimeter defines an opening 511 through which the post 120 or 127 can be inserted into the C-shaped clip (according to one method of mating the post with the rotor). As shown in FIG. 5B, an annular rib 513 protrudes about the perimeter of each recess 510. The ribs 513 are positioned between the front and rear surfaces of the rotor 500. In assembled form, the ribs 513 are positioned within respective recesses 128*c* in the pawls 112 and 114.

Various prior art latch designs include posts on the rotor that are coupled to recesses on the pawls (i.e., opposite to that of the arrangement of the posts and recesses in the latch assembly 100). Positioning the posts 120 and 127 on the pawls 112 and 114 and the recesses 510 on the rotor 500 for receiving the posts 120 and 127 provides the ability to bias the pawls 120 and 127 into engagement with the rotor 500 in the case of a fast deceleration or crash. This arrangement also provides other rigidity, permitting rotation of the pawl 112 without pivoting the pawl 112.

The rotor 500 includes a base wall 512 having a stepped surface. The base wall 512 is oriented substantially parallel to the rear facing surface 304 of the housing 300 in an assembled form of the latch assembly 104. A substantially cylindrical inner wall 501 and a substantially cylindrical outer wall 503 project orthogonally from the base wall 512.

An annular recess or channel 502 is defined on the front facing side of the rotor 500, and is formed between the walls 501 and 503. The recess 502 is sized to receive the coiled body of the spring 800. A recess 504 intersects and is tangential to the annular recess 502. The recess 504 is defined on the perimeter of the rotor 500, and a shoulder 505 is formed at the location where the recess 504 intersects the perimeter surface 507 of the rotor 500. One of the free legs of the spring 800 is positioned in the recess 504, and that leg is seated on the shoulder 505.

Two slots 506 are formed at the base of the inner wall 501 of the rotor 500. The slots 506 are positioned circumferentially opposite one another along the circumference of the inner wall 501. As noted above, the barbs 316 of the housing 300 are configured to connect to the slots 506 such that the rotor 500 is rotationally mounted to the housing 300. The slots 506 extend into the base wall 512. In operation, the rotor 500 can be rotated until the ends of the slots 506 contact the fixed barbs 316 of the housing 300. As noted above, the housing 300 (and its barbs 316) is stationary and the rotor 500 rotates with respect to the stationary housing 300.

A hollow space 530 is formed by the inner wall 501 for receiving the end of the lock barrel 600. A post 514 projects upwardly from the center of the base wall 512 in the same direction as the inner wall 501. A crescent-shaped opening 515 extends through the base wall 512. A post 604 of the lock barrel 600 is movably positioned in the crescent-shaped opening 515. The crescent-shaped opening 515 includes a crescent-shaped slots that is delimited by two opposing ends 515*a* and 515*b*. The central axis of the crescent-shaped opening 515 is substantially aligned with the axis of rotation 'B' of the rotor 500. The post 514 is configured to increase the rigidity of the rotor 500 at the interface between the post 604 and the opening 515.

A bearing surface 520 is defined on the perimeter surface 507 of the rotor 500. In operation, the leg 420 of the paddle 400 bears on the bearing surface 520 to cause the rotor 500 to rotate against the bias of the spring 800, as will be described later.

One or more of the housing 300, the paddle 400 and the rotor 500 may be either composed of plastic and formed from an injection molding process, or composed of metal (such as aluminum) and formed from a casting process, for example. Other acceptable materials and material forming processes are known to those skilled in the art.

Figure 6B:
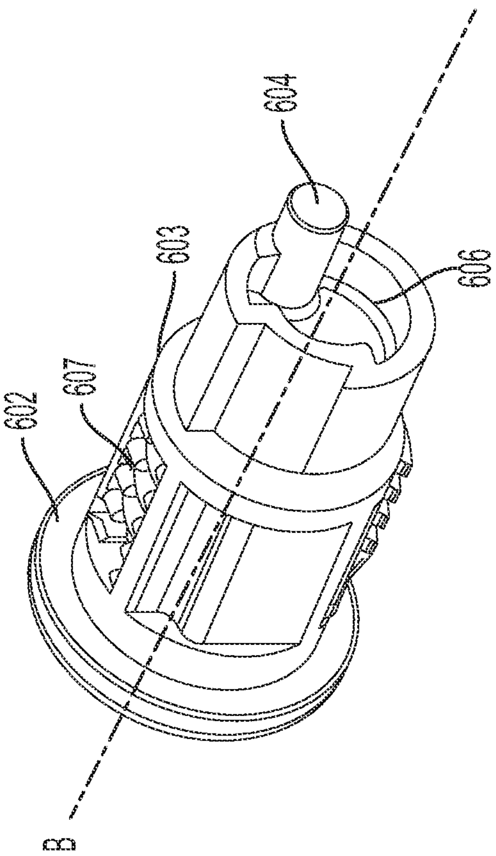
FIGS. 6A and 6B are front and rear isometric views, respectively, of the lock barrel of the latch assembly of FIG. 2.
Figure 6A:
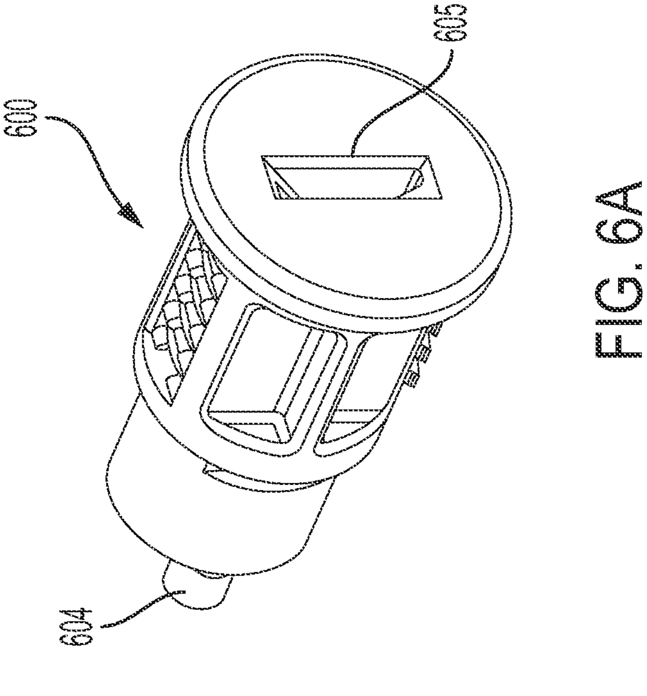

FIGS. 6A and 6B depict the lock barrel 600 of the latch assembly 104. The lock barrel 600 is rotatably mounted to the housing 300 and radially aligned with the opening 402 in the paddle 400. A shoulder 602 formed on the top end of the lock barrel 600 is seated on the front facing side 302 of the housing 300. The outer body of the lock barrel 600 is rotationally fixed with respect to the housing 300. The lock barrel 600 includes an internal cylinder 603 which is capable of rotating with respect to the housing 300 and the outer body of the lock barrel 600. A post 604 extends from the internal cylinder 603 and is capable of rotating along with the internal cylinder 603. The lock barrel 600 is a solid body with the exception of a series of internal wafers 607 that are configured to be extended and retracted in a transverse direction with respect to the cylinder 603.

The post 604 extends from the rear surface of the lock barrel 600. The post 604 is capable of rotating about the central axis B of the lock barrel 600 when the proper key (not shown) is inserted in the keyhole 605 of the internal cylinder 603 and rotated within the internal cylinder 603 of the lock barrel 600, as is known in the art. A crescent-shaped recess 606 is formed on the rear end of the lock barrel 600 at a location adjacent the post 604. In assembled form, the post 514 of the rotor 500 is moveably seated within the recess 606.

The internal lock cylinder 603 is configured to be moved between unlocked and locked states using a key, as is known in the art. In the locked state of the lock barrel 600, the paddle 400 is prevented from rotating about axis A from the home state shown in FIG. 1A. Installing the key causes the wafers 607 to retract and disengage from the housing 300, which permits the lock barrel 600 to be rotated along with the key. In the unlocked state, the paddle 400 can be rotated both to and from the home state shown in FIG. 1A by a user. It should be understood that in the home state of the paddle 400 shown in FIG. 1A, the pawls 112 and 114 are engaged with their respective strikers. The lock barrel 600 may be either locked or unlocked in the home state of the paddle 400.

The lock barrel 600 may vary from that which is shown and described. By way of non-limiting example, the lock barrel 600 may be operated electronically. As another alternative, the lock barrel may be omitted from the latch assembly 104 in its entirety. If the lock barrel 600 is omitted then the paddle 400 will not require a hole 402. The geometry, position and structure of the post 604 may vary. The lock barrel 600 may be mounted to the paddle 400 (or other component) in a variety of ways.

Figure 7:
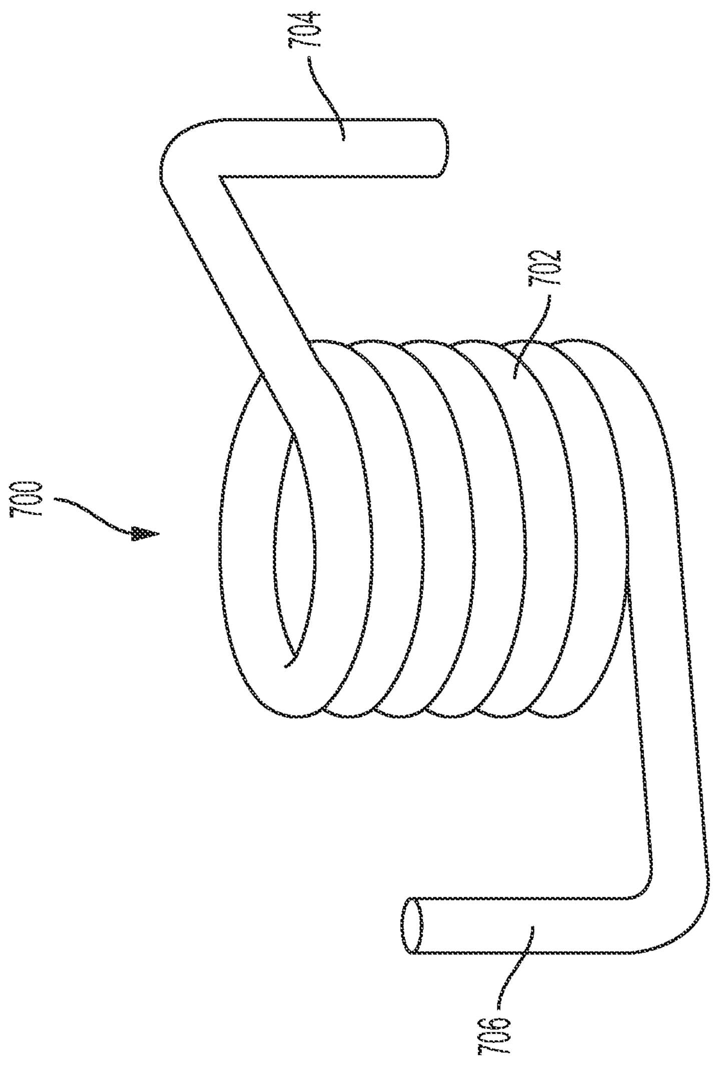
FIG. 7 is an isometric view of a torsion spring of the latch assembly of FIG. 2.

FIG. 7 depicts the torsion spring 700 of the latch assembly 104. The torsion spring 700 is connected to the paddle 400 for retaining the paddle 400 in the home position shown in FIG. 1A. In the home position of the paddle 400, the rear facing surface 405 (FIG. 4B) of the paddle 400 faces (and is parallel with) the front face 302 (FIG. 3B) of the housing 300.

The torsion spring 700 includes a coiled body 702 having two free ends 704 and 706. The free ends 704 and 706 extend in opposite directions along separate axes that are each oriented parallel to the central axis of the coiled body 702.

In an assembled form of the latch assembly 104, the coiled body 702 is positioned within a recess 303 (FIG. 3B) formed on the front face 302 of the housing 300. The end 704 of the spring 700 is positioned either within an aperture or against a surface of the recess 303 of the housing 300, whereas the other end 706 of the spring 700 is positioned against the rear facing surface 405 of the paddle 400.

Figure 8:
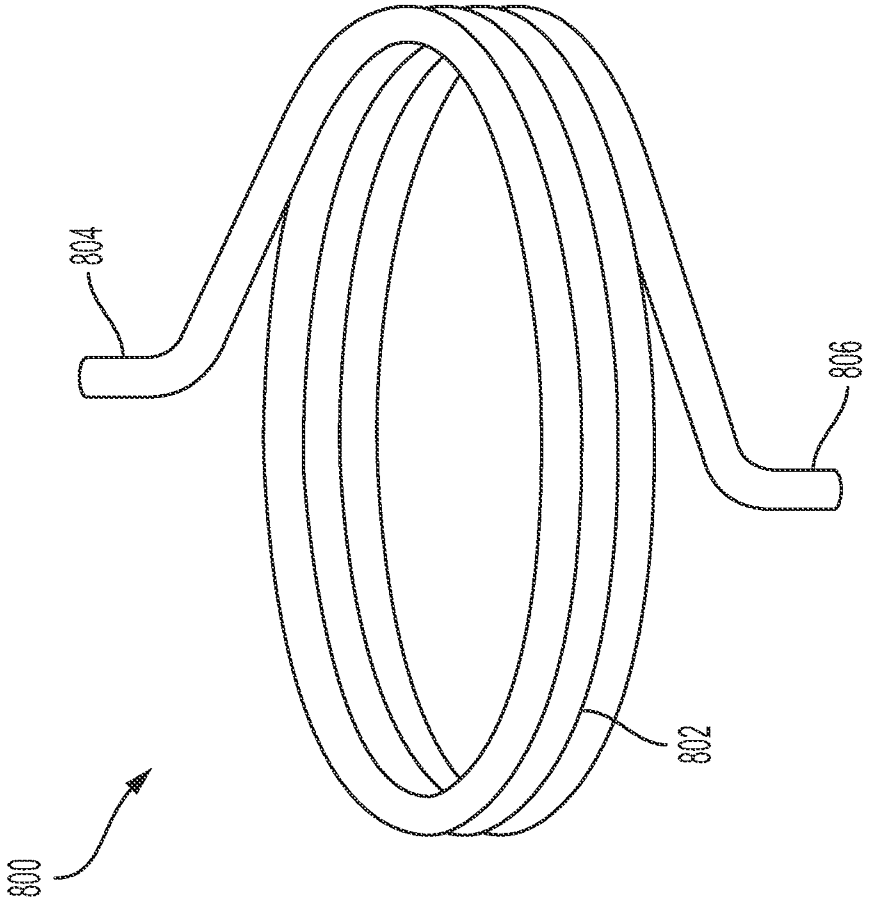
FIG. 8 is an isometric view of another torsion spring of the latch assembly of FIG. 2.

FIG. 8 depicts the torsion spring 800 of the latch assembly 104. The torsion spring 800 is connected to the rotor 500 for biasing the rotor 500 to a rotational position corresponding to the closed state of the latch assembly 104 (i.e., in which the pawls 112 and 114 are engaged with the strikers).

The torsion spring 800 includes a coiled body 802 having two free ends 804 and 806. The free ends 804 and 806 extend in opposite directions along separate axes that are each oriented parallel to the central axis B of the coiled body 802. In an assembled form of the latch assembly 104, the coiled body 802 of the spring 800 is mounted within the annular recess 502 that is formed on the front side of the rotor 500, as described above.

Although not shown, a bumper formed of a soft material may be seated between the rear face of the paddle 400 and the top surface of the housing 300 in order to limit sound generation upon moving the paddle to the home position.

Referring now to the process of assembling the latch assembly 104, the lock barrel 600 is mounted in the recess 301 of the housing 300 such that the outer barrel 300 is fixed to the housing 300 while the lock cylinder 603 (and the post 604) are capable of rotating with respect to the housing 300.

The coiled body 802 of the spring 800 is mounted over the cylinder 312 of the housing 300. The free end 806 of the spring 800 is then positioned within the slot 306 of the housing 300. The rotor 500 is then moved over the cylinder 312 of the housing 300. The free end 804 of the spring 800 is positioned into the recess 504 of the rotor 500. The rotor 500 is then rotated, thereby coiling the spring 800. The rotor 500 is continued to be moved over the cylinder 312 and rotated into position such that the barbs 316 of the housing 300 are eventually retained in the slots 506 of the rotor 500.

The coiled body 702 of the spring 700 is positioned within the recess 303 (FIG. 3B) formed on the front face 302 of the housing. The end 704 of the spring 700 is positioned either within an aperture or against a surface of the recess 303 of the housing 300. The paddle 400 is then mounted to the housing 300 by positioning the ribs 310 within respective slots 404 of the paddle 400. The other end 706 of the spring 700 is positioned against the rear facing surface 404 of the paddle 400. The point at which the end 706 of the spring 700 contacts the paddle 400 is rearward of the axis A so as to bias the paddle 400 to the home position.

It is noted that prior to assembly of the paddle, a separate elastomeric element may be installed to act as a bumper between the housing and the underside of the paddle. This will serve to mitigate noise upon release of the paddle.

It is also noted that the lock barrel 600 may be installed last and installed once the entire assembly is installed and mounted in the door system. Applications can have the lock barrel installed near the end of the vehicle production line. This does not preclude the lock from being installed earlier and supplied as a complete unit but even in that case the lock would not likely be installed until after the paddle is installed.

It is further noted that a pathway is created in the housing (near 309) that allows for access to the retention wafer on the lock cylinder. By this method, when the paddle is open to the full rotation, a tool may gain access to the lock cylinder retention wafer and allow for removal and servicing of the lock cylinder.

The latch assembly 104 is now assembled and ready for assembling onto the door 102 to form the door assembly 100.

To assemble the door assembly 100, the latch assembly 104 (now assembled) is moved toward the opening 113 in the door 102 until the clip 307 of the housing 300 becomes snapped, clipped or otherwise engaged with the slot 122 (FIG. 1B). Thereafter, the rear face 304 of the housing 300 is placed against the front face of the door 102, and the pins 318 on the housing 300 are positioned with holes 130 (FIG. 1B) in the door 102. The fastener 109 is then moved from the rear side of the door 102 through the hole 117 of the door, and into the hole 309 at the rear face 304 of the housing 300. The fastener 109 is threadedly fastened to the hole 309 in the housing 300 thereby captivating the latch assembly 104 to the door 102.

Assembly of the latch assembly 104 to the door 102 is achieved by the above-described snap engagement (by virtue of items 307 and 122) together with only a single fastener 109 engaged from the rear face of the door 102. This mounting scheme eases the assembly process as well as the accuracy of assembly.

The post 120 of the pawl 112 is mounted within the recess 510*a* of the rotor 500. The end 114*a* of the pawl 114 is then positioned through the opening in the clip 121 (FIG. 1B). The post 127 of the pawl 114 is then mounted within the recess 510*b* of the rotor 500.

As best shown in FIGS. 14A and 14B, the posts 120 and 127 can be inserted into their respective recesses 510 from two different directions that are orthogonal to one another. More particularly, as shown in FIG. 14A, the posts 120 and 127 may be inserted into their respective recesses 510 in the front-rear direction. As shown in FIG. 14B, the posts 120 and 127 may be inserted into their respective recesses 510 in the right-left direction via the opening 511. The mated orientation of the posts 120 and 127 in their respective recesses 510 prevents the posts 120 and 127 from inadvertently become detached from their recesses 510.

The guide segment 123 of the pawl 114 rests on the free end of the projection 119 on the door 102.

The door assembly 100 is now assembled and ready for operation. It should be understood that the above description of assembling the latch assembly 104 and the door assembly 100 is not limited to any step or sequence of steps, and may vary from that which is described without departing from the scope and spirit of the invention.

Figures 9A, 9B, 9C, 10A, 10B, 10C:
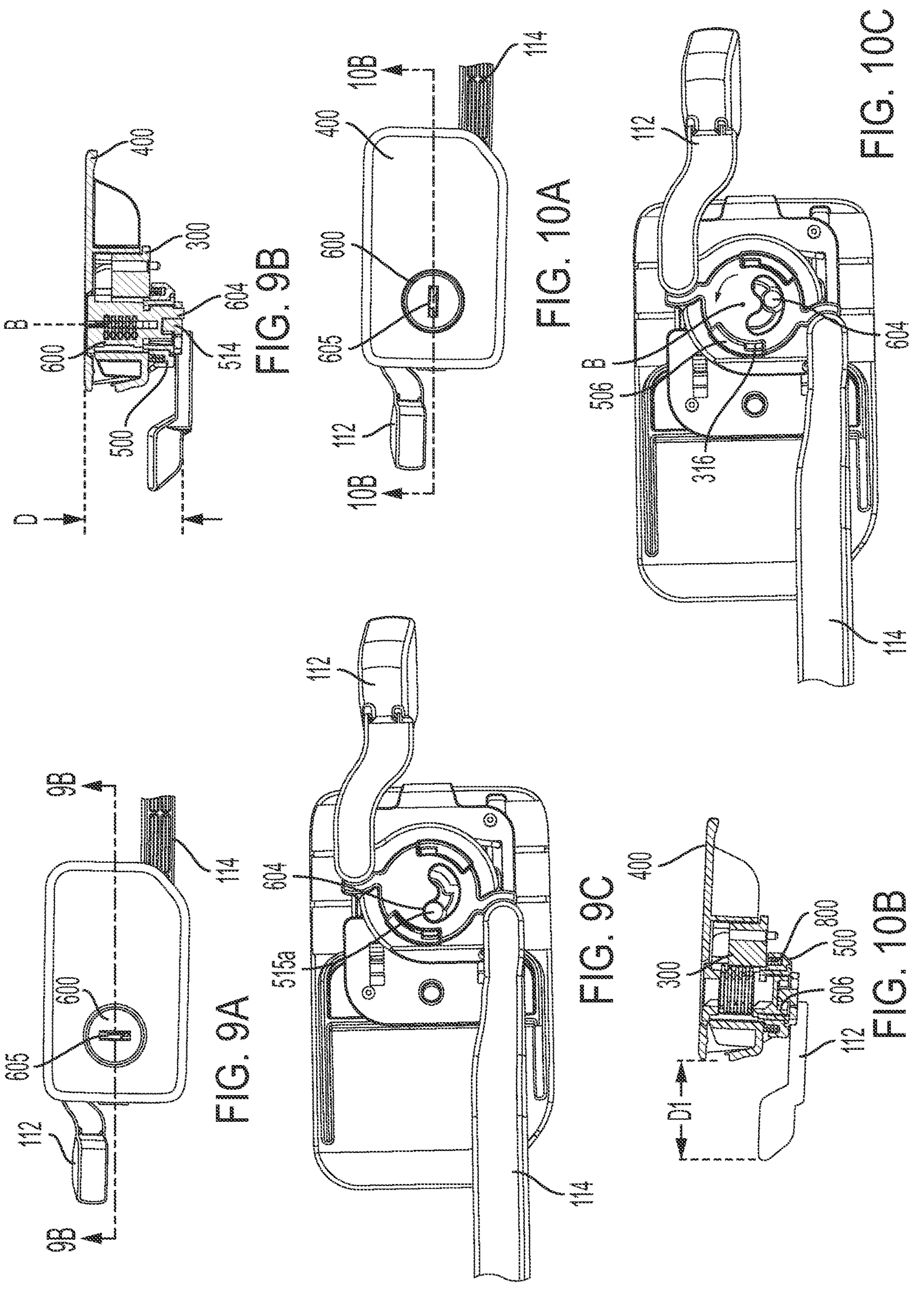
FIG. 9A is a front elevation view of the latch assembly of FIG. 2, wherein the latch assembly is shown in a locked and closed state and one of the pawls is shown truncated.
FIG. 9B is a cross-sectional view of the locked and closed latch assembly of FIG. 9A taken along the lines 9B-9B.
FIG. 9C is a rear elevation view of the locked and closed locked latch assembly of FIG. 9A.
FIG. 10A is a front elevation view of the latch assembly of FIG. 9A, wherein the latch assembly is shown in an unlocked and closed state.
FIG. 10B is a cross-sectional view of the unlocked and closed latch assembly of FIG. 10A taken along the lines 10B-10B.
FIG. 10C is a rear elevation view of the unlocked and closed latch assembly of FIG. 10A.

Referring now to the method of operating the door assembly 100, starting from the closed and locked position of the latch assembly 104 shown in FIGS. 9A, 9B, 9C and 12A, the paddle 400 is prevented from pivoting outwardly from its home position shown in those figures because the lock barrel 600 is maintained in the locked state. More particularly, as best shown in FIG. 9C, the paddle 400 is prevented from pivoting outward because the post 604 of the lock barrel 600 is positioned against the end 515*a* of the crescent-shaped opening 515 of the rotor 500. If a user were to try to pivot the paddle 400 while the latch assembly 104 is maintained in the locked position, then the rounded leg 420 of the paddle 400 would bear on the bearing surface 520 of the rotor 500 thereby urging the rotor 500 to rotate in the counterclockwise direction, as viewed from the rear of the latch assembly in FIG. 9C. However, the rotor 500 would be prevented from rotating in the counterclockwise direction due to the engagement between the locked post 604 and the end 515*a* of the crescent-shaped opening 515. The lock barrel 600 must be unlocked (thereby moving the post 604) before the paddle 400 can be pivoted to an open position.

Turning now to FIGS. 10A, 10B, 10C and 12A, a user inserts a key into the keyhole 605 of the lock barrel 600 and rotates the lock cylinder 603 (see arrow in FIG. 10C) thereby converting the lock barrel 600 from a locked state to an unlocked state, as is known in the art. Compare the orientations of the keyhole 605 in FIGS. 9A and 10A. As best shown in FIG. 10C, unlocking the lock cylinder 603 causes the post 604 of the lock barrel 600 to move away from the end 515*a* of the opening 515 of the rotor 500 and become centered (or substantially centered) within the opening 515. At this stage, the latch assembly 104 is still in the closed position, however, the rotor 500 is now capable of rotating in the counter clockwise direction because the post 604 no longer abuts the end 515*a* of the opening 515 of the rotor 500. In the closed position of the latch assembly 104, the door assembly 100 cannot be moved with respect to the opening of the motor vehicle to which the door assembly 100 is mounted without rotating the paddle 400, as will be described hereinafter.

Figure 11A:
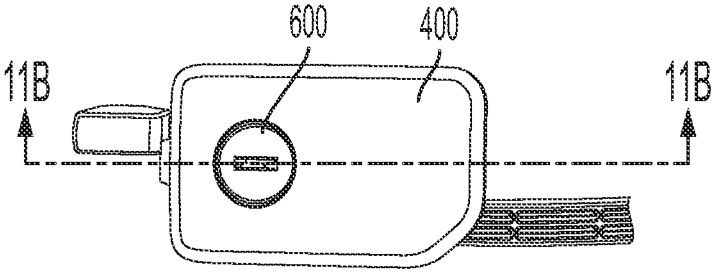
FIG. 11A is a front elevation view of the latch assembly of FIG. 10A, wherein the latch assembly is shown in an unlocked and opened state.
Figure 11B:
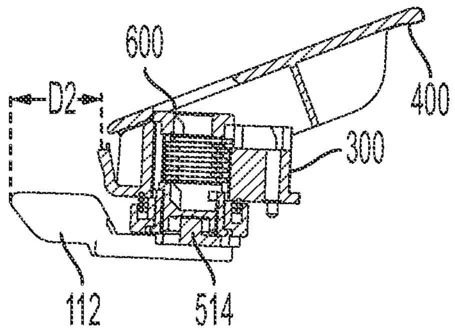
FIG. 11B is a cross-sectional view of the unlocked and opened latch assembly of FIG. 11A taken along the lines 11B-11B.

Turning now to FIGS. 11A, 11B, 11C and 12B, to move the latch assembly 104 to the open position, the user then rotates the paddle 400 in the outward direction about axis A (see arrow in FIG. 12B) against the bias of the spring 700. As the paddle 400 is rotated outwards, the slots 404 slide over their respective ribs 310 of the housing 300. As seen in FIG. 11B, the paddle 400 rotates relative to the lock barrel 600. At the same time, the rounded leg 420 of the paddle 400 bears on the bearing surface 520 of the rotor 500 thereby urging the rotor 500 to rotate in the counterclockwise direction, as viewed from the rear of the latch assembly in FIG. 11C. The rotor 500 is free to rotate against the bias of the spring 800 in the counterclockwise direction since the post 604 is spaced from the end 515*a* of the opening 515 of the rotor 500.

As the rotor 500 rotates, the slots 506 of the rotor 500 travel over the prongs 314 of the housing 300. Also, as the rotor 500 rotates, the pawls 112 and 114 are moved inwardly (compared distances D1 and D2 in FIGS. 10B and 11B) toward the housing 300. As the pawl 114 moves inwardly, the prongs 125 (FIG. 13D) slide along the sides of the projection 119. The posts 120 and 127 may rotate relative to their respective recesses 510 of the rotor 500.

Rotation of the paddle 400 and rotor 500 to the open position is ceased once (i) the prongs 314 bear on the ends of their respective slots 506, (ii) the ribs 310 bear on the ends of their respective slots 404, and/or (iii) the posts 407 on the paddle 400 contact the shoulder 317 on the housing 300. At this point, the leg 420 of the paddle 400 remains in contact with the bearing surface 520 of the rotor 500 to avoid becoming detached from the rotor 500. In the open position of the latch assembly 104, the door assembly 100 may be moved with respect to the opening of the motor vehicle to which the door assembly 100 is mounted.

Figure 12B:
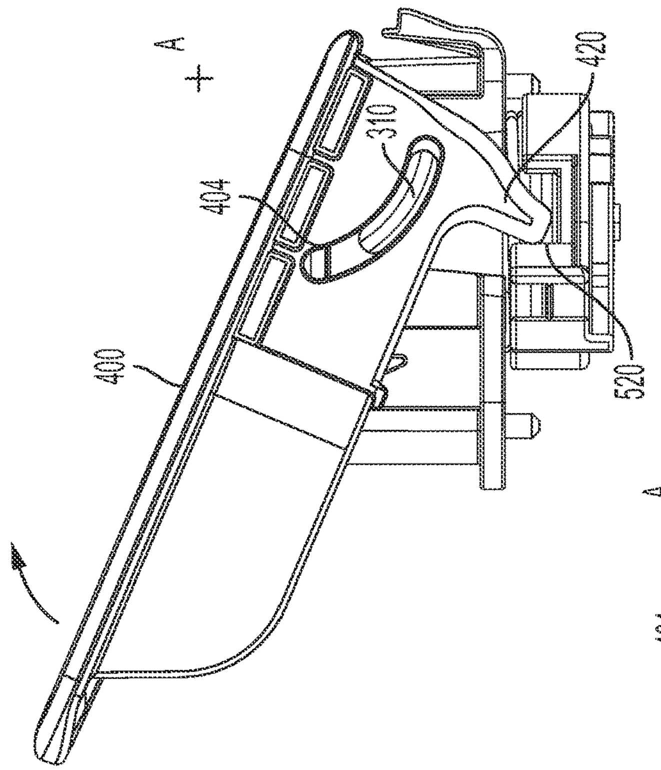
FIG. 12B is a side elevation view of the latch assembly of FIG. 12A, wherein the latch assembly is shown in the opened position.
Figure 12C:
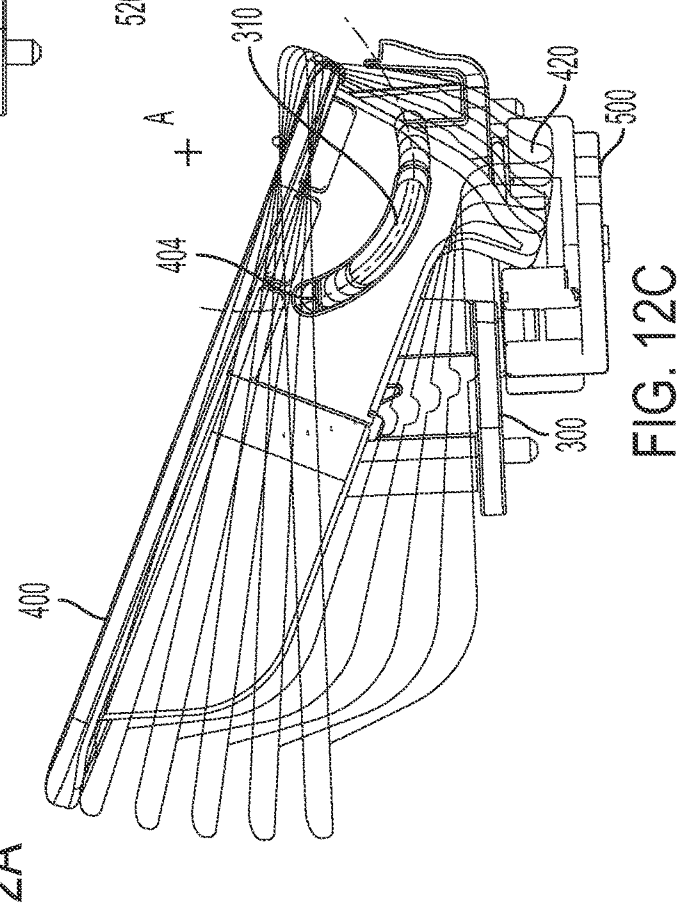
FIG. 12C is a side elevation view of the latch assembly of FIGS. 12A and 12B depicting the swept profile of the paddle trajectory.
Figure 12A:
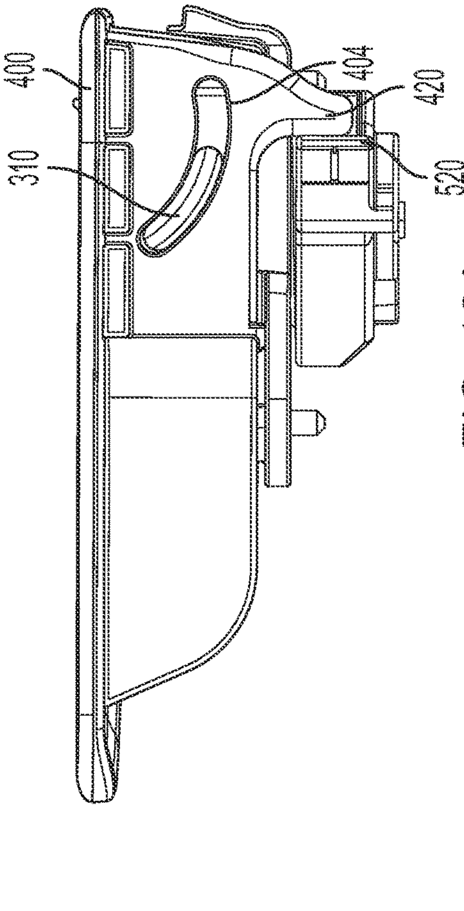
FIG. 12A is a side elevation view of the latch assembly of FIGS. 2, 9A, 10A and 11A, wherein the latch assembly is shown in the closed position. The latch assembly of FIG. 12A may be either locked or unlocked.

When the user releases the paddle 400, the spring 700 returns the paddle 400 to the home position shown in FIG. 12A. At the same time, the spring 800 causes the rotor 500 to rotate in the clockwise direction back to its starting position shown in FIG. 10C. The spring 800 also cause the paddle to return to the home position due to the engagement between the leg 420 and the bearing surface 520. As the rotor 500 rotates in the clockwise direction, the pawls 112 and 114 move outwardly and away from the housing 300 so that the ends 112*a* and 114*a* of the pawls 112 and 114, respectively, can engage with strikers (not shown) on the opening of the motor vehicle to which the door assembly 100 is mounted.

The user then closes the door assembly 100, thereby concealing the opening in the motor vehicle and causing the ends 112*a* and 114*a* of the pawls 112 and 114, respectively, to engage with strikers (not shown) on the opening of the motor vehicle.

The lock barrel 600 is still in the unlocked state at this stage. The user can insert a key into the keyhole 605 of the lock barrel 600 (if not already inserted) and rotate the lock cylinder 603 thereby converting the lock barrel 600 from the unlocked state to the locked state, as is known in the art. Locking the lock cylinder 603 causes the post 604 of the lock barrel 600 to move toward and bear on the end 515*a* of the opening 515 of the rotor 500, thereby preventing the rotor 500 from being rotated in the counter clockwise direction and the latch assembly 104 from being opened. In the locked state of the latch assembly 104, the pawls, the paddle, and the rotor are all locked in position and prevented from rotation. This feature provides improved security and performance under impact conditions and may reduce BSR (bump, squeak and rattle).

Referring now to FIGS. 13A-13D, in the event of movement of the door assembly 100 due to regular use or an accident, for example, the guide section 123 of the pawl 114 limits unintended deflection travel of the pawl 114 with respect to the door 102. More particularly, the prongs 125 of the guide section 123 squeeze the sides of the free end 131 of the projection 119, as shown in FIG. 13D to either limit or prevent the pawl 114 from deflecting along the axis F (see FIG. 13D). The prong 126 of the guide section 123 is a hard stop that interacts with the recess 133 formed at the free end 131 of the projection 119 to either limit or prevent the pawl 114 from deflecting downward along the axis G (see FIG. 13C). The prongs 125 and 126 can flex to accommodate a limited amount of deflection. The prongs 125 and 126 are configured to help mitigate vibration and noise in the pawl 114 by limiting motion of and deflection of the pawl 114 under vibration.

It should be understood that the above description of operating the latch assembly 104 and the door assembly 100 is not limited to any sequence of steps, and may vary from that which is shown and described without departing from the scope and spirit of the invention.

Second Embodiment

A second embodiment of a door assembly 900 incorporating aspects of the present invention is illustrated in FIGS. 15A through 24B. The door assembly 900 is both structurally and functionally similar to the door assembly 100 of FIGS. 1A through 1C, and only the differences between those door assemblies will be described hereinafter. The pawls of the door assembly 900 and the projections on the door 902 for supporting the pawls are not shown.

Figure 16:
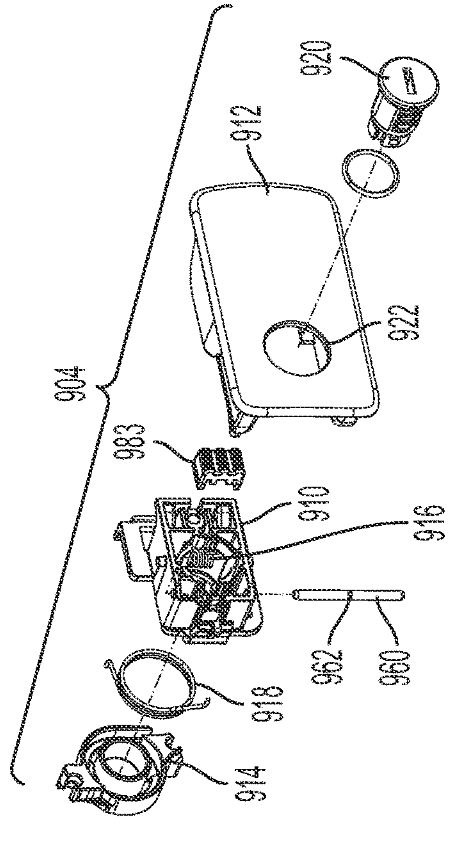
FIG. 16 is an exploded view of the latch assembly of the door assembly of FIGS. 15A-15H.
Figure 15B:
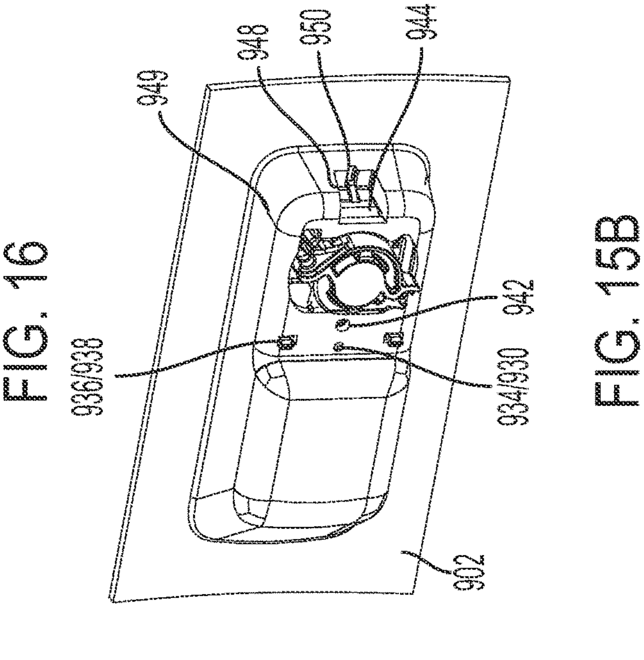
FIG. 15B is a rear isometric view of the door assembly.
Figure 15E:
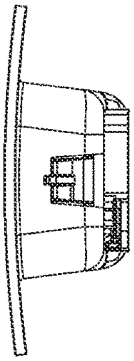
FIG. 15E is an elevation view of the door assembly taken from the left side.
Figure 15D:
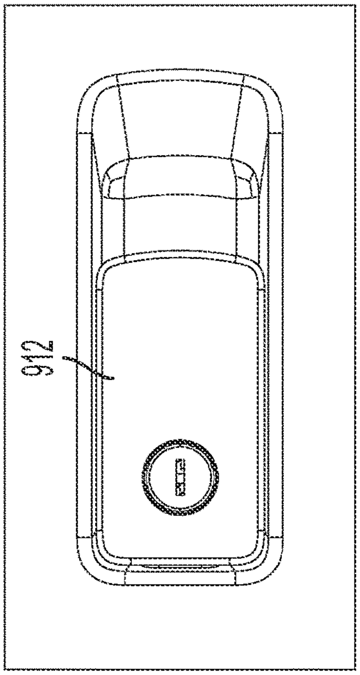
FIG. 15D is a front elevation view of the door assembly.
Figure 15F:
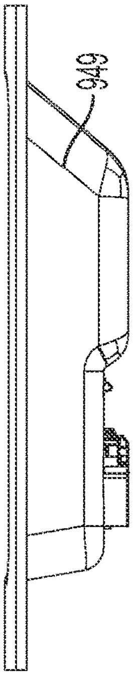
FIG. 15F is bottom plan view of the door assembly.
Figure 15H:
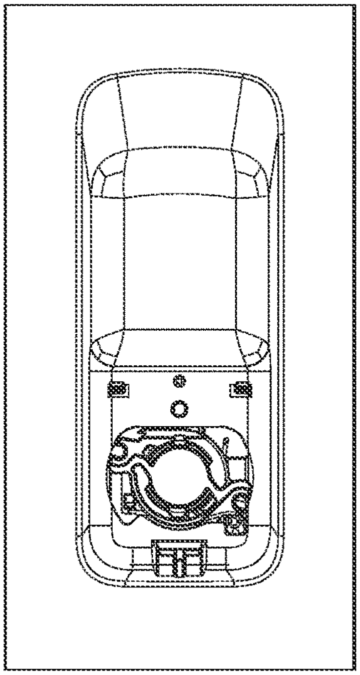
FIG. 15H is a rear elevation view of the door assembly.
Figure 15G:
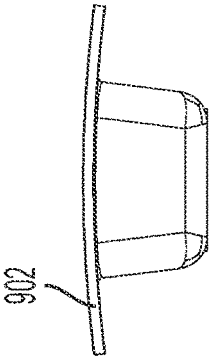
FIG. 15G is an elevation view of the door assembly taken from the right side.
Figure 17A:
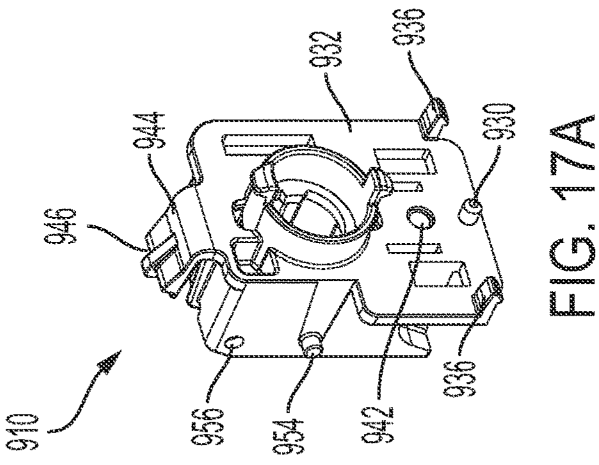
FIGS. 17A, 17B, 17C, 17D, 17E, 17F and 17G are rear isometric, front isometric, front elevation, right elevation, left elevation, top plan and bottom plan views, respectively, of the housing of the latch assembly of FIG. 16.
Figure 17B:
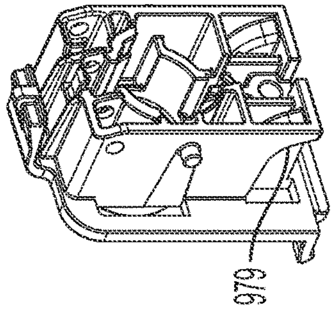
Figure 17C:
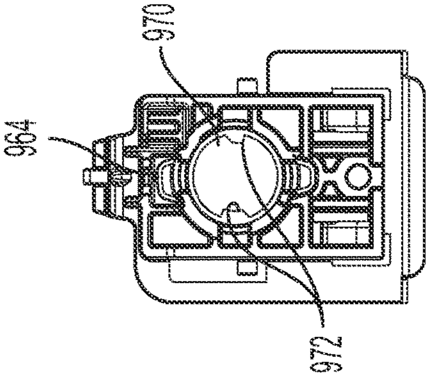
Figure 17D:
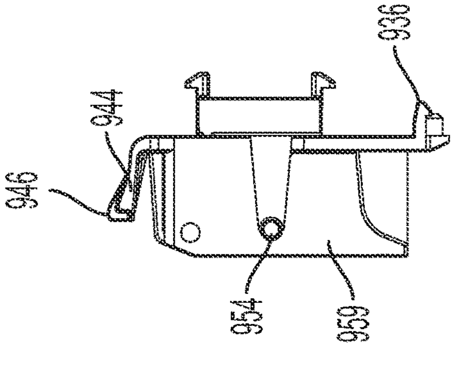
Figure 17E:
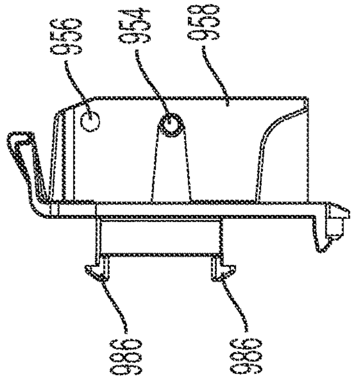
Figure 17F:
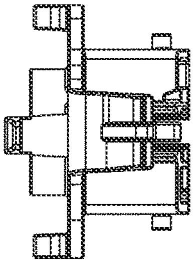
Figure 17G:
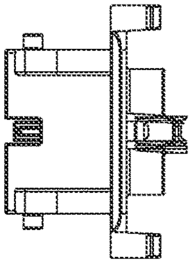
Figure 18C:
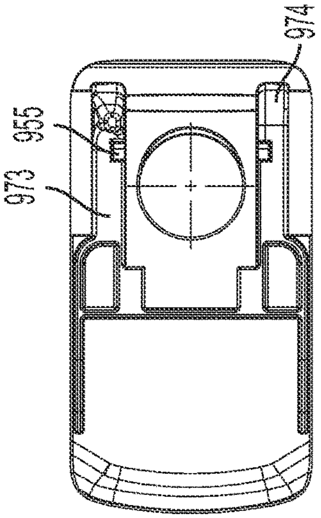
FIGS. 18A, 18B, 18C, 18D, 18E, 18F and 18G are front isometric, rear isometric, rear elevation, right elevation, left elevation, bottom plan and top plan views, respectively, of the paddle of the latch assembly of FIG. 16.
Figure 18B:
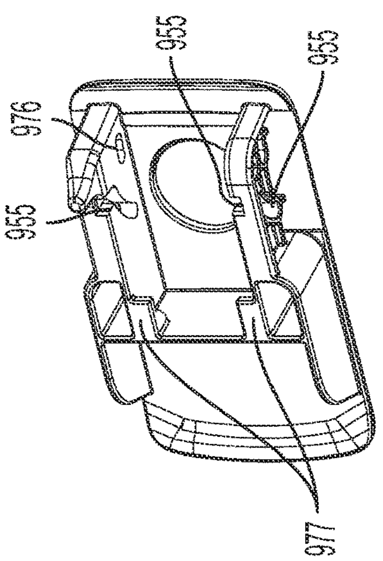
Figure 18A:
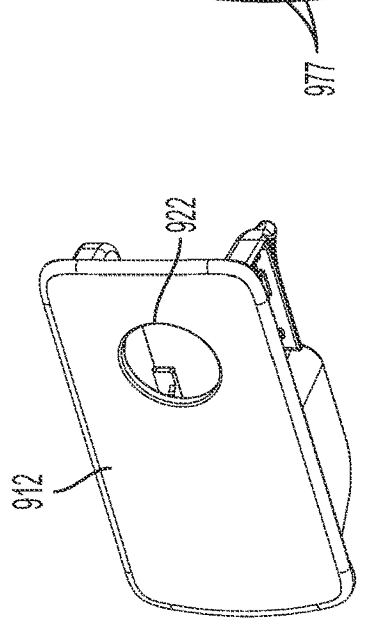
Figure 18G:
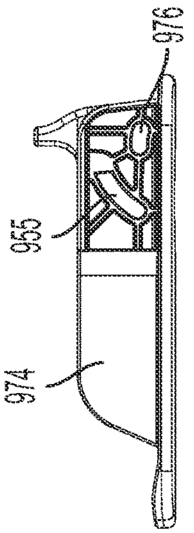
Figure 18F:
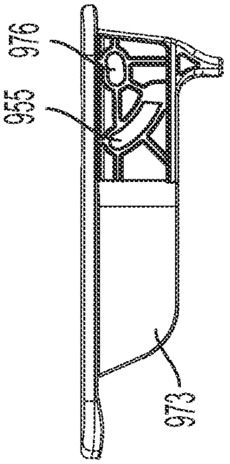
Figure 18E:
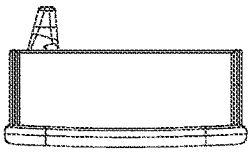
Figure 18D:
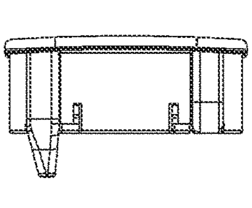
Figure 19A:
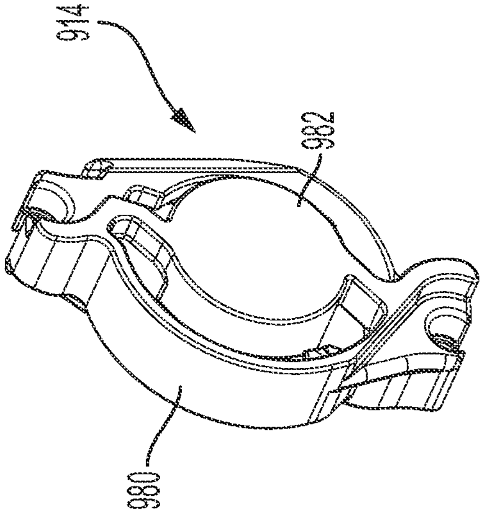
FIGS. 19A, 19B, 19C, 19D and 19E are rear isometric, front isometric, rear elevation, right elevation and bottom plan views, respectively, of the rotor of the latch assembly of FIG. 16.
Figure 19B:
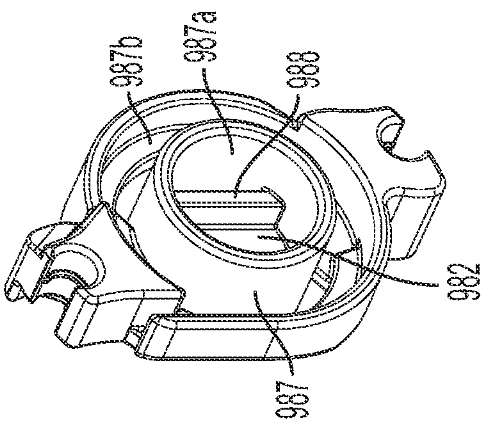
Figure 19C:
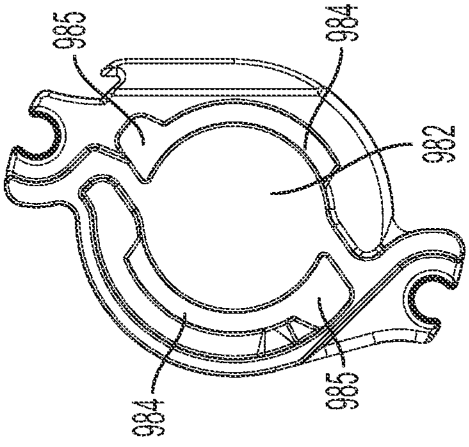
Figure 19D:
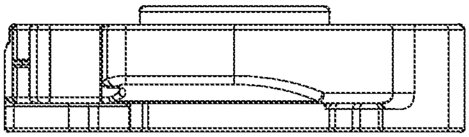
Figure 19E:
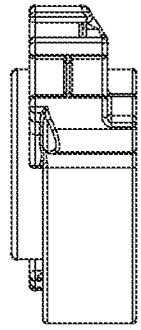

A latch assembly 904 of the door assembly 900 is mounted to the door 902 to releasably retain the door 902 in the closed position. FIG. 16 depicts an exploded view of the latch assembly 904 of the door assembly 900. The primary components of the latch assembly 904 are a base housing 910, a user-operated paddle 912, a rotor 914, torsion springs 916 and 918, a lock barrel 920 and, optionally, two pawls (not shown).

The base housing 910, which is shown in FIGS. 17A-17G, is similar to the housing 300 and only the primary differences between those housings will be described hereinafter. One alignment pin 930 protrudes from the rear face 932 of the housing 910. The pin 930 is aligned along the centerline of the housing 910. The pin 930 is configured to be inserted into a hole 934 (FIG. 15B) disposed in the door 902 for alignment purposes.

Figure 25A:
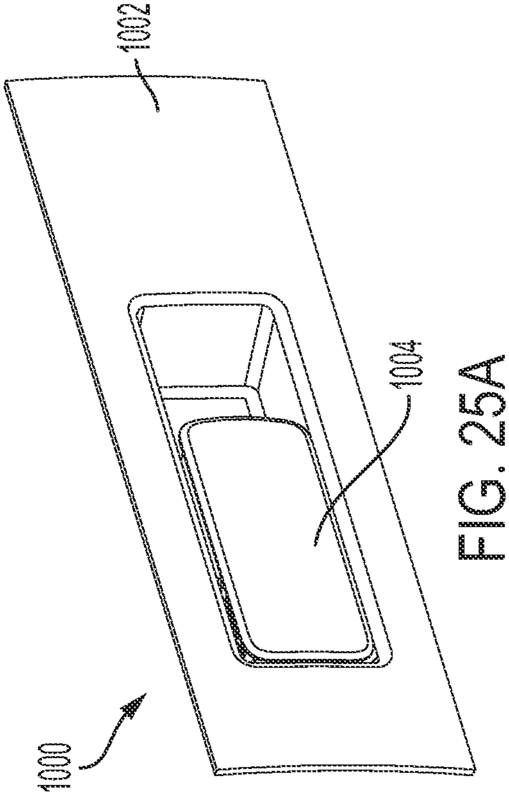
FIG. 25A is a front isometric view of a third exemplary embodiment of a door assembly having a non-locking latch assembly.
Figure 25B:
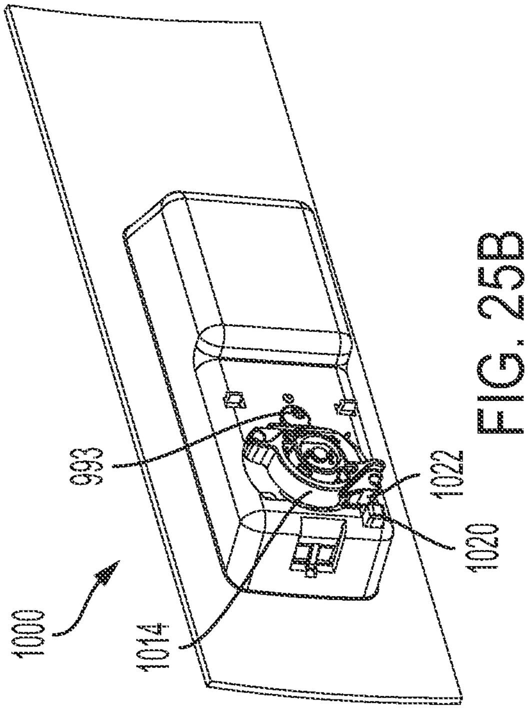
FIG. 25B is a rear isometric view of the door assembly.

Two prongs 936 also protrude from the rear face 932 of the housing 910 on the same end of the rear face 932 as the pin 930. The prongs 936 are positioned on opposite corners of the rear face 932. Each prong 936 includes a barb at its free end, and is configured to be snapped into a recess 938 (FIG. 15B) disposed in the door 902 for retention purposes prior to mounting the base housing 910 to the door 902 using a fastener 993 (not shown in this view, but is shown in FIG. 25B). The fastener is guided through a hole 940 in the door 902 and is threaded into a hole 942 in the housing 910 for securing the base housing 910 (and the entire latch assembly 904) to the door 902.

It is noted that with proper design and control, the fastener may be eliminated from the assembly and the unit may be retained in the door through use of only the prongs.

A clip 944, in the form of a flexible tab or prong, is formed on one side of the housing 902 and extends outwardly from that side of the housing 902. A rib 946 extends outwardly along the centerline of the clip 944. The clip 944 is configured to be inserted into a recess 948 formed on the side of the rectangular recessed region 949 of the door 902. The top end of the recess 948 includes a channel 950 for receiving the rib 946 of the clip 944. Engagement between the rib 946 and the channel 950 is used as a location feature during assembly of the latch assembly 904 onto the door 902.

Pins 954 project from opposing side walls 958 and 959 of the housing 910. The pins 954 are sized to be received in blind channels 955 (see FIG. 18B) formed in the paddle 912. A thru-hole 956 is formed through the side walls 958 and 959 of the housing 910 for receiving a pin 960. As shown in FIG. 16, the pin 960 has an annular relief (or cutout) 962 formed in a central region thereof. In an assembled form of the latch assembly 904, a projection 964 that extends from an interior surface of the housing 910 is seated within the relief 962 of the pin 960. Engagement between the projection 964 of the housing 910 and the relief 962 of the pin 960 retains the pin 960 within the thru-hole 956 of the housing 910. The pin 960 is positioned through the center of the coiled body of the spring 916 for biasing the paddle 912 to the home position.

The pin 960 may also be retained by other methods not described herein.

A hole 970 is formed through the housing 910 for receiving the lock barrel 920. Two inwardly extending ramped projections 972 are positioned at diametrically opposite positions along the inner circumference of the hole 970. The projections 972 engage surfaces on the lock barrel 920 and are configured to secure the lock barrel 920 within the hole 970, while permitting rotation of the lock barrel 920 within the hole 970.

The use of the two inwardly extended projections 972 may be altered both in number and in style as needed to accommodate the specifics of the lock cylinder design.

The paddle 912, which is shown in FIGS. 18A-18G, is similar to the paddle 400 and only the primary differences between those paddles will be described hereinafter. The paddle 912 includes opposing side walls 973 and 974. An arc-shaped blind channel 955 is defined on each side wall 973 and 974, and each channel 955 is sized for receiving one of the pins 954 on the housing 910. Another arc-shaped channel 976 is defined on each side wall 973 and 974, and each channel 976 is sized for receiving one end of the pin 960.

To assemble the paddle 912 onto the housing 910, the pins 954 are inserted into the channels 955 until the hole 956 of the housing 910 is aligned with the arc-shaped channel 976. Thereafter, the pin 960 is inserted through the channels 976 and the hole 956 until the relief 962 of the pin 960 engages the projection 964 of the housing 910, thereby captivating the paddle 912 to the housing 910.

Figure 22B:
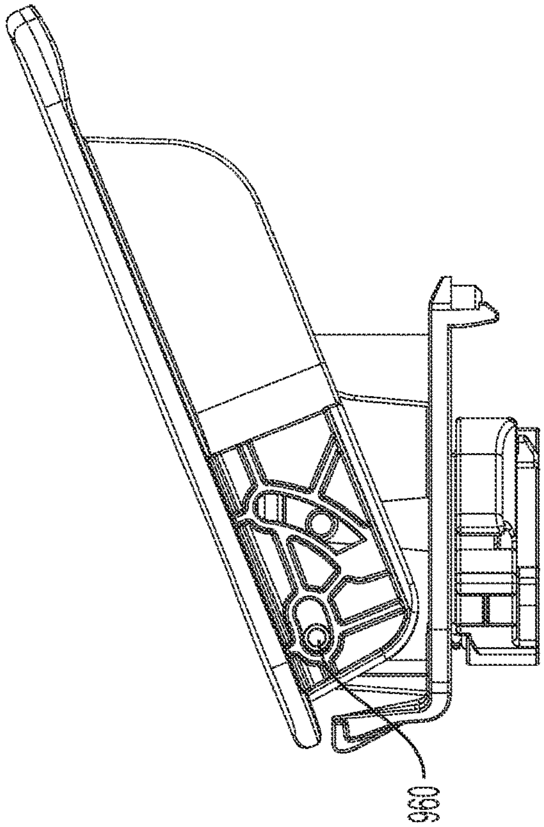
FIG. 22B is a bottom plan view of the latch assembly of FIG. 16 shown in the unlocked and open state.
Figure 22A:
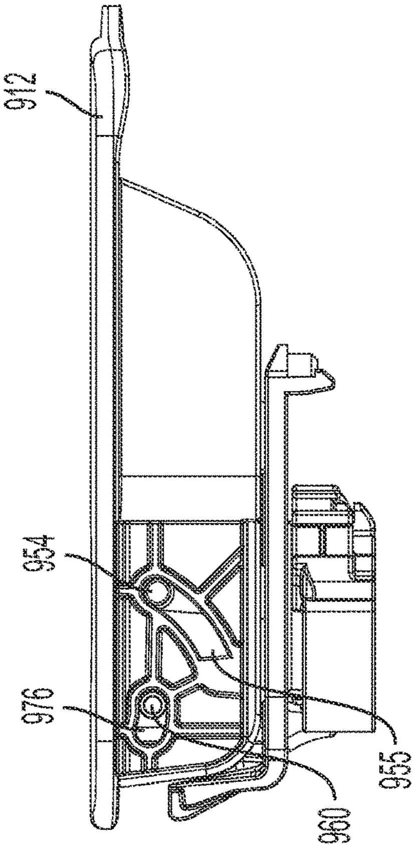
FIG. 22A is a bottom plan view of the latch assembly of FIG. 16 shown in the unlocked and closed state.
Figure 22C:
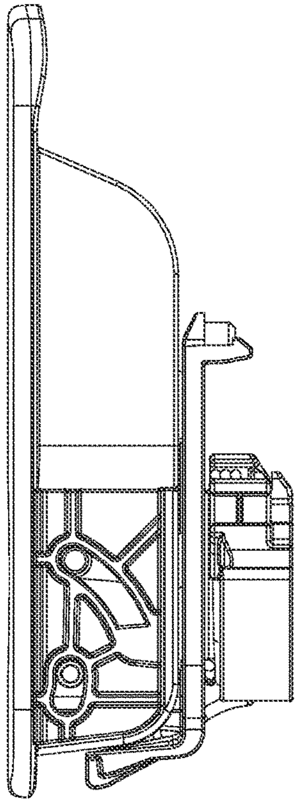
FIG. 22C is a bottom plan view of the latch assembly of FIG. 16 shown in the locked and closed state.

Turning now to FIGS. 22A-22C, 24A and 24B, the paddle 912 is capable of pivoting about the housing 910 between a closed position (FIG. 22A) and an open position (FIG. 22B). Upon pivoting the paddle 912 from the closed position to the open position, the channels 976 slide over the pin 960 while the channels 955 slide over the pins 954. The arc created the pivot is defined by two independent pins (per side of the paddle 912) riding in arc segments about the same center. The arcs of the channels 955 and 976 are concentric.

In the open position of the paddle 912, the pin 960 bears on the end of the channels 976, and walls 977 (FIG. 18B) of the paddle 912 bear on the outer walls 979 (FIG. 17B) of the housing 910 at location 981, thereby preventing further rotation of the paddle 912 beyond the open position shown. Stated differently, in the open position of the paddle 912, further rotation of the paddle 912 is prevented by features at opposite ends of the housing 910.

Figure 23B:
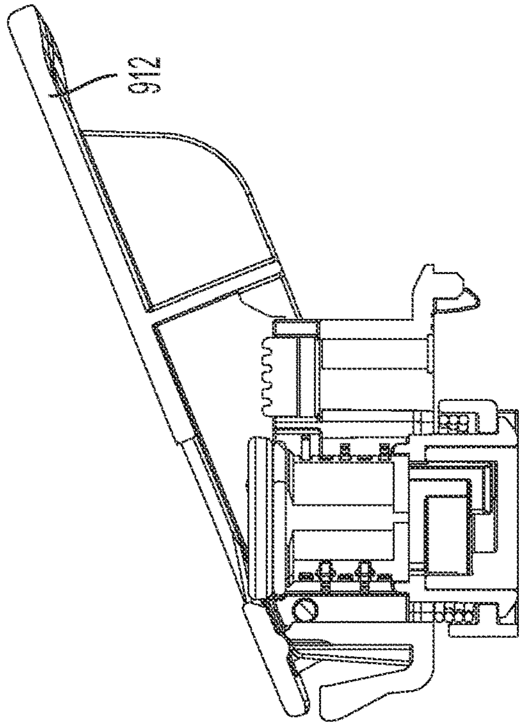
FIG. 23B is a cross-sectional view of the latch assembly of FIG. 16 shown in the unlocked and open state.
Figure 23A:
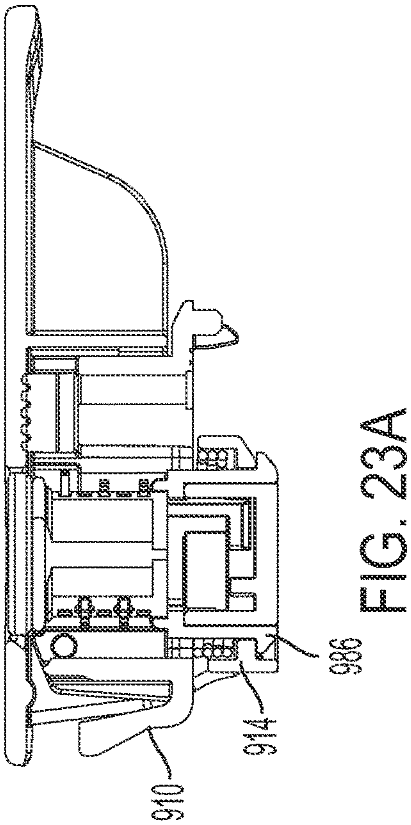
FIG. 23A is a cross-sectional view of the latch assembly of FIG. 16 shown in the unlocked and closed state.
Figure 23C:
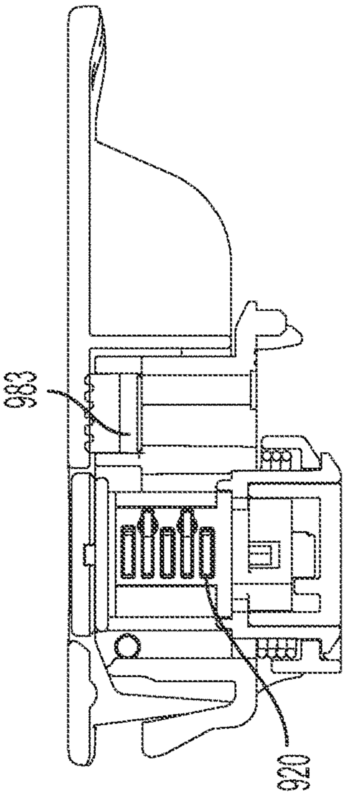
FIG. 23C is a cross-sectional view of the latch assembly of FIG. 16 shown in the locked and closed state.
Figure 24A:
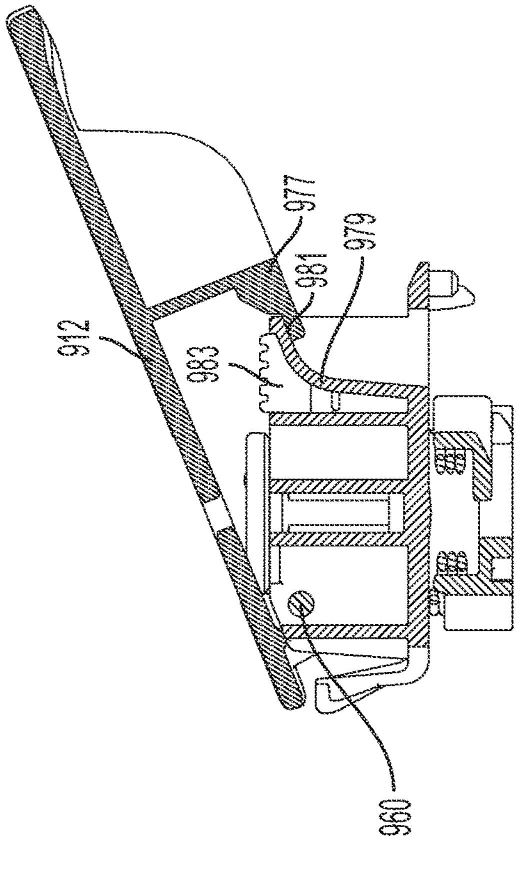
FIG. 24A is another cross-sectional view of the latch assembly of FIG. 16 shown in the unlocked and open state.
Figure 24B:
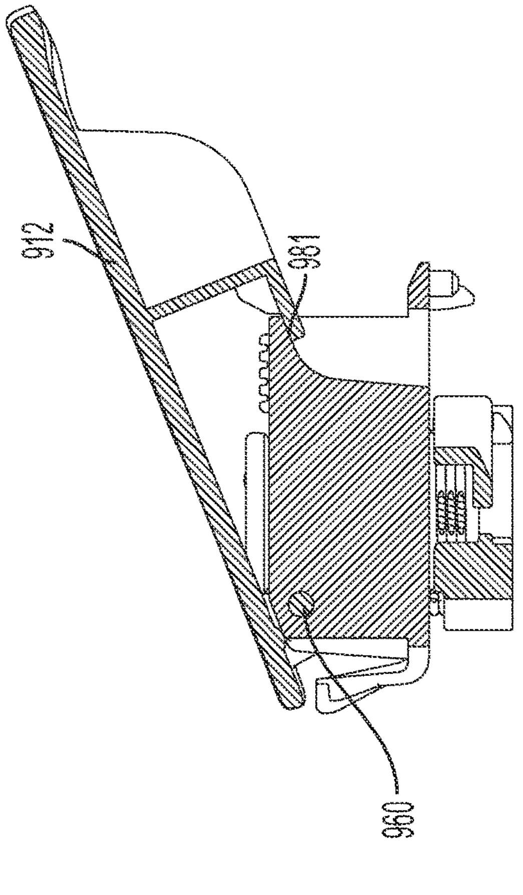
FIG. 24B is yet another cross-sectional view of the latch assembly of FIG. 16 shown in the unlocked and open state.

A bumper 983 which is formed from a soft material, such as rubber or plastic, is positioned within an aperture formed in the housing 910. The bumper 983 is also positioned to contact the underside of the paddle 912 in the closed position of the paddle 912. The bumper 983 reduces noise generated between the housing 910 and the paddle 912 when the paddle 912 is returned to the closed position, as shown in FIGS. 23A and 23C.

It is noted that the housing and the bumper form a directed channel or pathway allowing for access to the lock retention wafer as described earlier.

The rotor 914, which is shown in FIGS. 19A-19E, is similar to the rotor 500 and only the primary differences between those rotors will be described hereinafter. The rotor 914 includes a body 980 having a circular base wall 982. Two arc-shaped cutouts 984 surround the outer perimeter of the wall 982 at diametrically opposite positions. Each cutout 984 includes an enlarged opening 985 for receiving one of the barbs 986 of the housing 910. To assemble the rotor 914 onto the housing 910, the barbs 986 are first positioned through respective enlarged openings 985 in the rotor 914 and the rotor 914 is rotated to space the barbs 986 away from their openings 985. The barbs 986 retain the rotor 914 to the housing 910.

The barbs 986 and the attending cutouts 985 may be sized such that installation orientation may be controlled. In other words one barb and one attending cutout may be sized larger than the other pair to prevent installation in the incorrect orientation. Also, it may be possible to alter the number of barbs required for the installation.

An annular wall 987 extends from the bottom side of the base wall 982, and an interior space 987*a* is defined within the annular wall 987 in which the distal end of the lock barrel 920 is positioned. A straight rib 988 is disposed on the lower side of the wall 982 and within the interior space 987*a* for interacting with the post 990 of the lock barrel 920, as will be described later. An annular channel 987*b* surrounds the wall 987 and is sized to receive the spring 918.

Figure 20B:
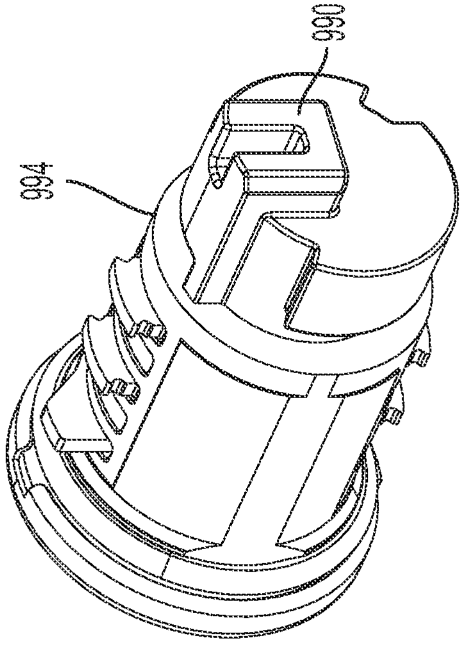
FIGS. 20A and 20B are front and rear isometric views, respectively, of the lock barrel of the latch assembly of FIG. 16.
Figure 20A:
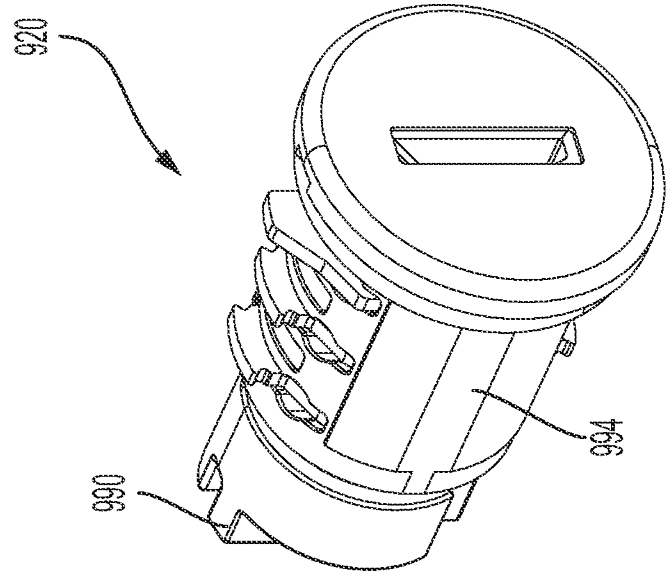

The lock barrel 920, which is shown in FIGS. 20A and 20B, is similar to the lock barrel 600 and only the primary differences between those lock barrels will be described hereinafter. The lock barrel 920 includes a post 990 that extends from the internal cylinder 994 and is capable of rotating along with the internal cylinder 994 (like post 604). The post 990 has a rectangular shape in cross-section with a relief disposed therein.

Figure 21A:
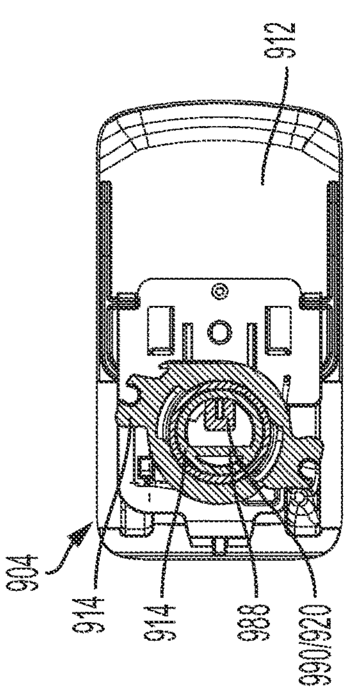
FIG. 21A is a rear elevation view of the latch assembly of FIG. 16 shown in an unlocked and closed state, wherein various surfaces of the latch assembly are shown cut-away to reveal interaction between the lock barrel and the rotor.
Figure 21B:
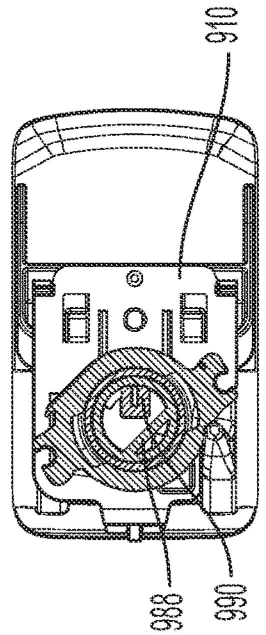
FIG. 21B is another view of the latch assembly of FIG. 21A, wherein the latch assembly is shown in the unlocked and open state.
Figure 21C:
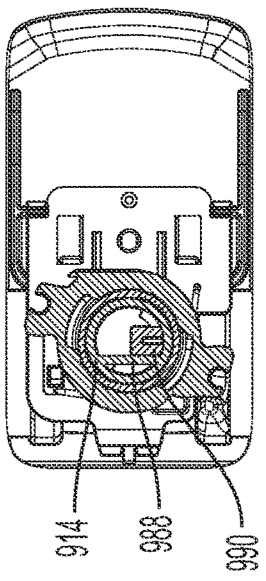
FIG. 21C is another view of the latch assembly of FIG. 21A, wherein the latch assembly is shown in the locked and closed state.

Turning now to FIGS. 21A-21C, in the unlocked and closed state of the latch assembly 904 shown in FIG. 21A, the post 990 of the lock barrel 920 is spaced apart (in the circumferential direction) from the rib 988 of the rotor 914. Thus, the paddle 912 and the rotor 914 are free to rotate toward the open position. In the open and unlocked state of the latch assembly 904 shown in FIG. 21B, the paddle 912 has been pivoted to the open position and the rotor 914 has been rotated by the paddle 912. In the open position, the post 990 of the lock barrel 920 remains spaced apart (in the circumferential direction) from the rib 988 of the rotor 914. In the closed and locked state of the latch assembly 904 shown in FIG. 21C, the post 990 of the lock barrel 920 has been rotated (i.e., by rotating the key in the lock barrel 920) such that the post 990 bears on the rib 988 of the rotor 914, thereby preventing counterclockwise rotation (as viewed in FIG. 21C) of the rotor 914, which also prevents rotation of the paddle 912 toward the open position.

Third Embodiment

A third embodiment of a door assembly 1000 incorporating aspects of the present invention is illustrated in FIGS. 25A through 31F. The door assembly 1000 is both structurally and functionally similar to the door assembly 900 of FIGS. 15A through 24B, and only the differences between those door assemblies will be described hereinafter.

A non-locking latch assembly 1004 of the door assembly 1000 is mounted to the door 1002 to releasably retain the door 1002 in the closed position. The latch assembly 1004 of the door assembly 1000 is mounted to the door 1002 in the same fashion as the latch assembly 904.

Figure 25C:
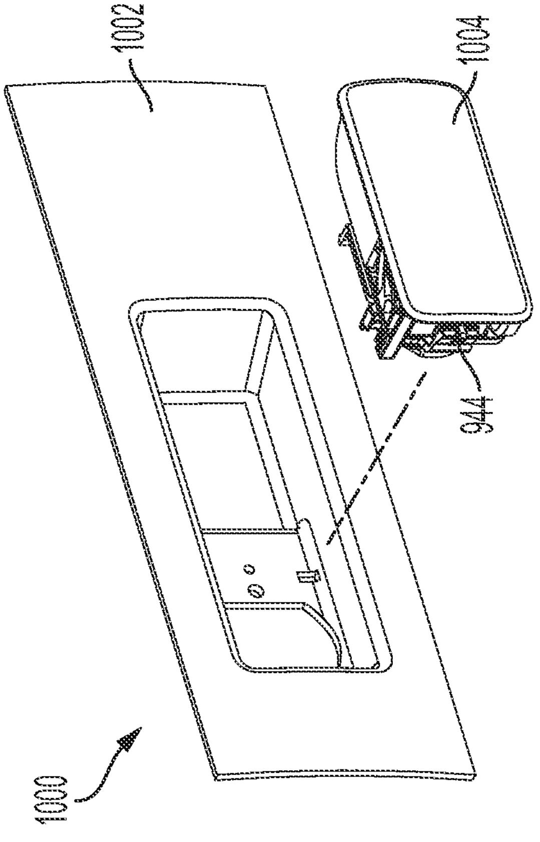
FIG. 25C is another front isometric view of the door assembly with the latch assembly shown exploded from the door.
Figure 25D:
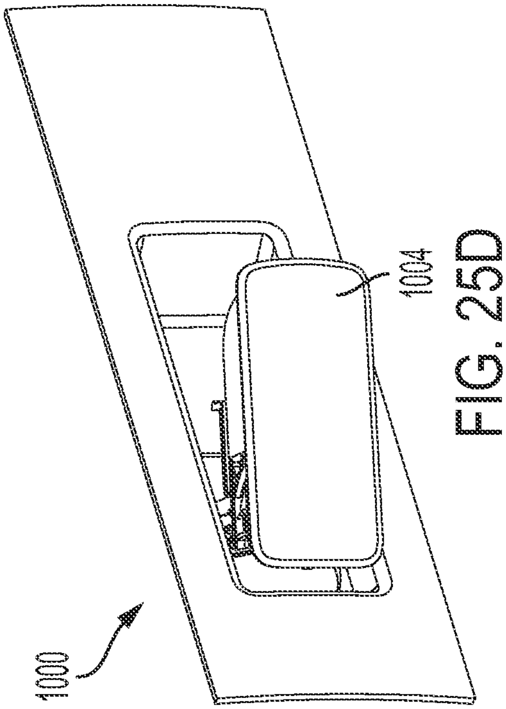
FIG. 25D is another front isometric view of the door assembly with the latch assembly shown partially assembled to the door.
Figure 26B:
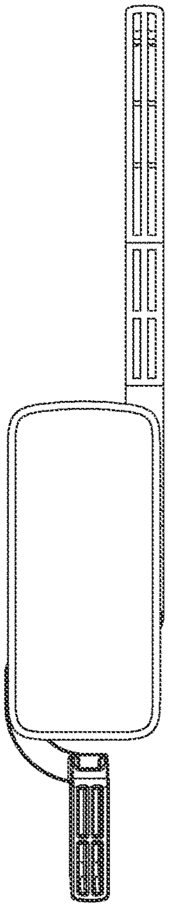
FIGS. 26A, 26B, 26C, 26D and 26E are isometric, front elevation, right side, left side, and rear side views, respectively, of the latch assembly of FIGS. 25A-25D (including the pawls).
Figure 26E:
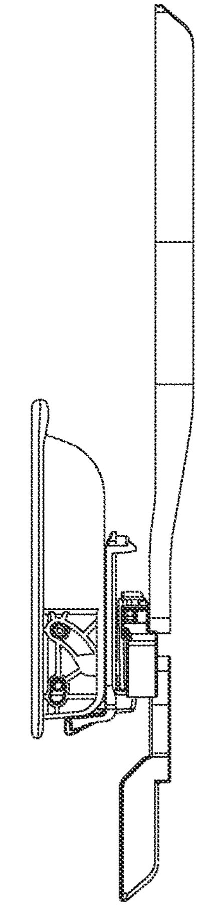
Figure 26A:
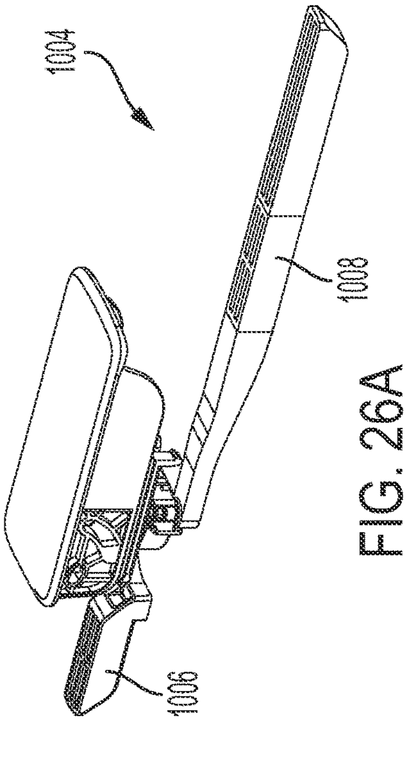
Figure 26D:
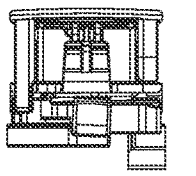
Figure 26C:
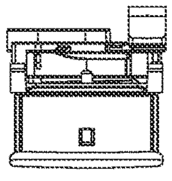

The sequence of assembling the latch assembly 1004 onto the door 1002 is shown starting from FIG. 25C in which the latch assembly 1004 is moved toward the door 1102. In FIG. 25D, the latch assembly 1004 is toed (angled) and brought together with the door 1002 and the clip 944 of the latch is positioned within the recess 948 in the door 1002, as described above. In FIG. 25A, the latch assembly 1004 is rotated into the recess of the door 1002 until the clips on the latch assembly 1004 connect into their respective openings in the door 1002. In FIG. 25B, the fastener 993 is mounted to the door 1002 and the latch assembly 1004.

FIGS. 26A-26E depict the latch assembly 1004 and two pawls 1006 and 1008 mounted to the latch assembly 1004. The pawls 1006 and 1108 operate in substantially the same fashion as the pawls of the latch assembly 104.

Figure 27:
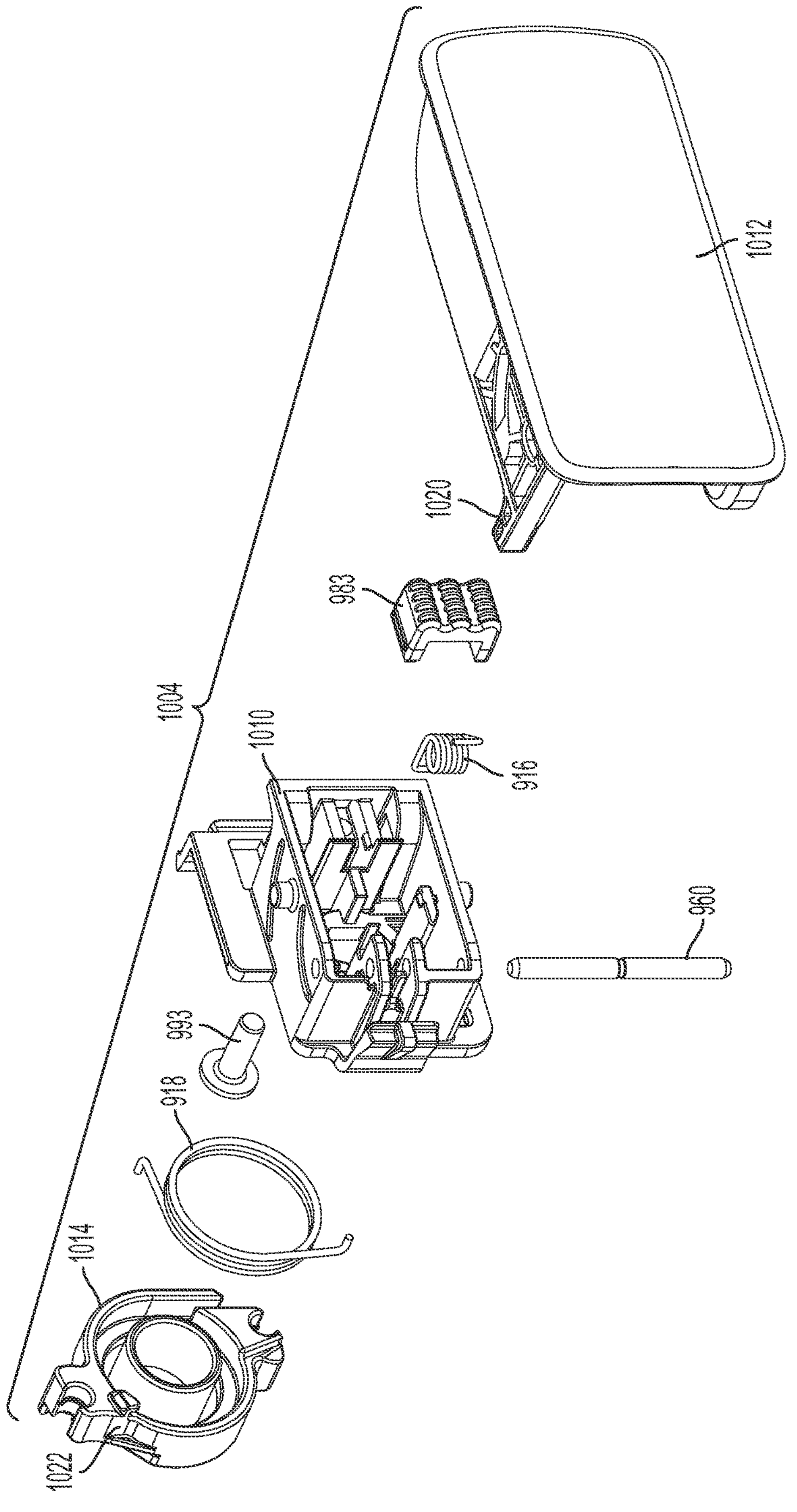
FIG. 27 is an exploded view of the non-locking latch assembly of the door assembly of FIGS. 25A-25D.
Figure 28A:
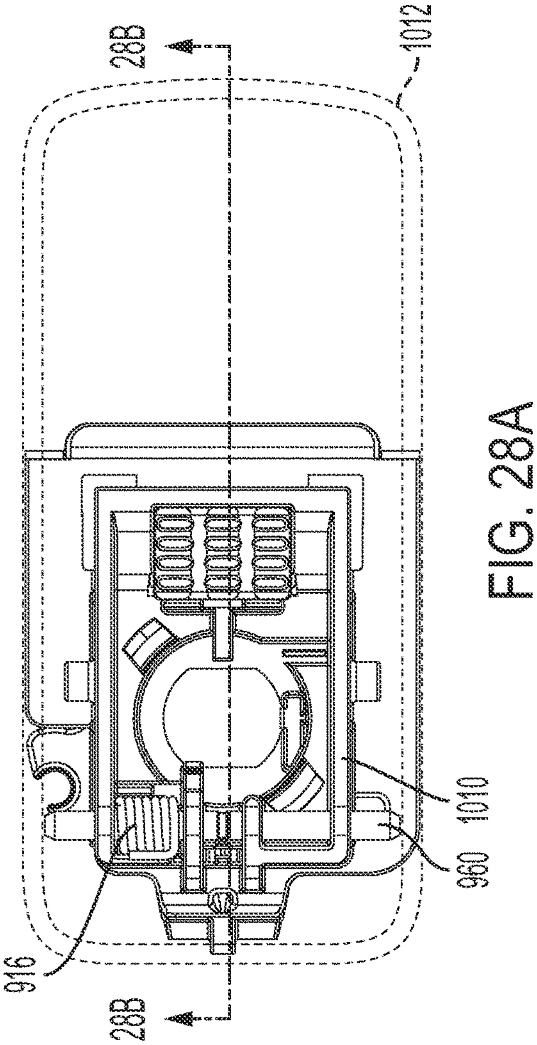
FIG. 28A is a top plan view of the latch assembly of FIG. 27 with the paddle shown in broken lines to reveal the remaining components.
Figure 28B:
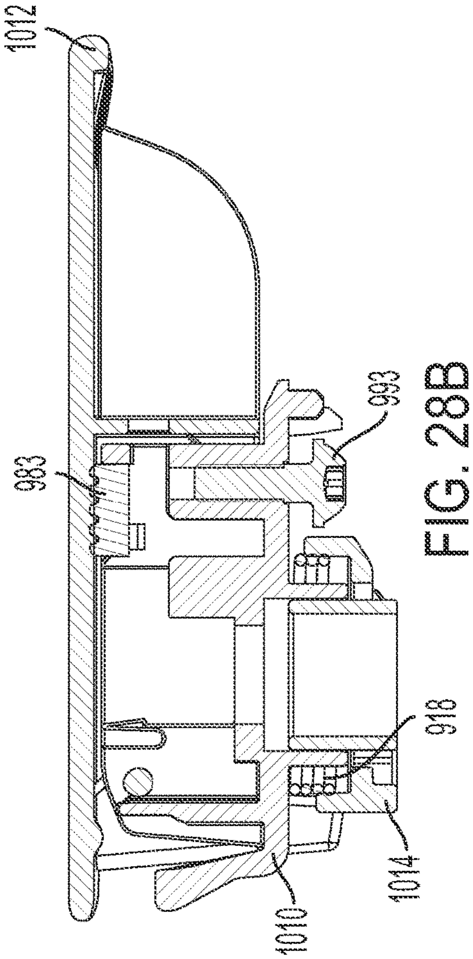
FIG. 28B is a cross-sectional side view of the latch assembly of FIG. 28A taken along the lines 28B-28B.
Figure 29C:
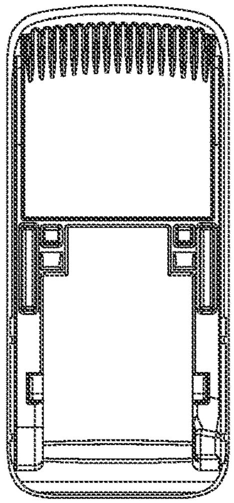
FIGS. 29A, 29B, 29C, 29D, 29E and 29F are front isometric, front elevation, rear elevation, left elevation, right elevation, and bottom plan views, respectively, of the paddle of the latch assembly of FIG. 27.
Figure 29B:
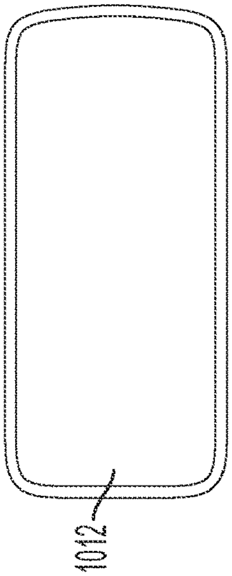
Figure 29A:
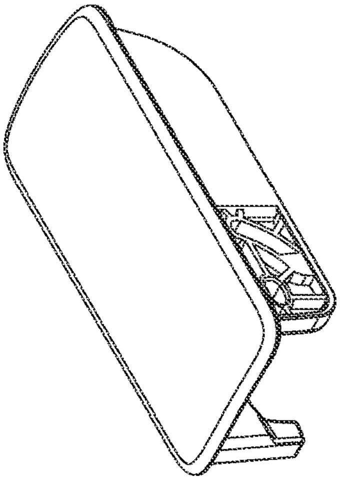
Figure 29F:
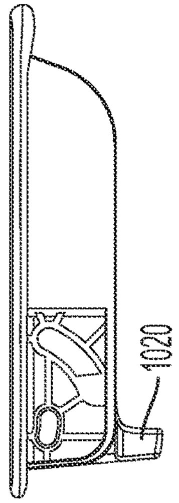
Figure 29E:
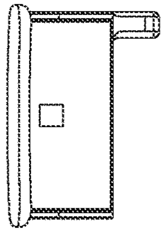
Figure 29D:
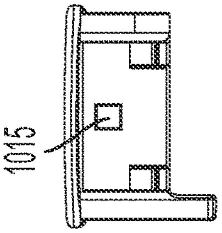

FIGS. 27-28B depict the non-locking latch assembly 1004 of the door assembly 1000. The primary components of the latch assembly 1004 are a base housing 1010, a user-operated paddle 1012, a rotor 1014, torsion springs 916 and 918, and, optionally, two pawls 1006 and 1008 (not shown in this view). The common features between latch assembly 1004 and latch assembly 904 will not be described herein.

The paddle 1012, which is shown in FIGS. 29A-29F, is substantially similar to the paddle 912 with the exception that the paddle 1012 includes a square shaped opening 1015 on a side face thereof. The opening 1015 is used with a deadbolt in the locking version of the latch assembly 1100 that is shown in the fourth embodiment of FIGS. 32-38. Although not shown, the opening 1015 in the paddle 1012 may be replaced with a blind pocket, ledge or bearing surface against which the deadbolt can bear without departing from the scope of the invention. The third embodiment is non-locking and the opening 1015 does not serve any particular purpose for the non-locking embodiment.

Figure 33A:
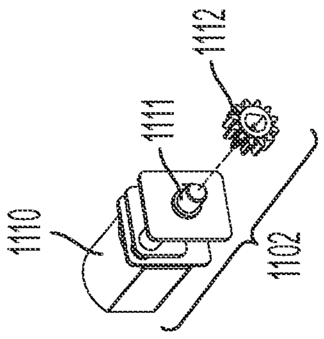
FIGS. 33A, 33B, 33C and 33D depict the sequence of steps for assembling the latch assembly of FIG. 32.
Figure 33B:
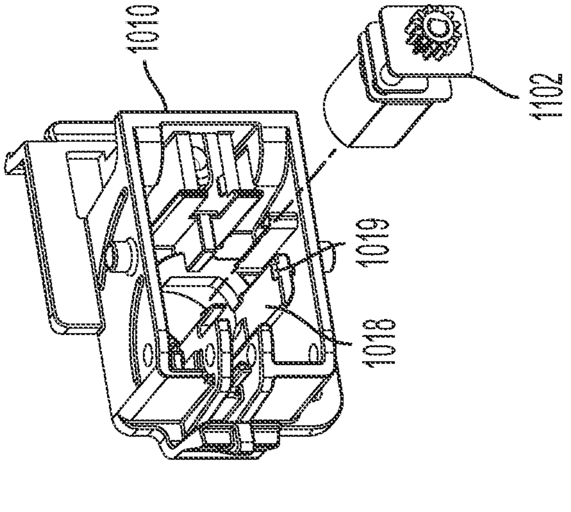
Figure 33C:
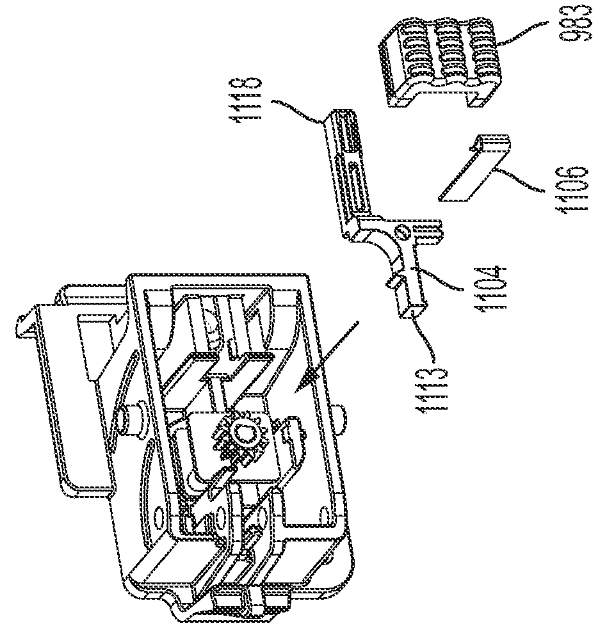
Figure 33D:
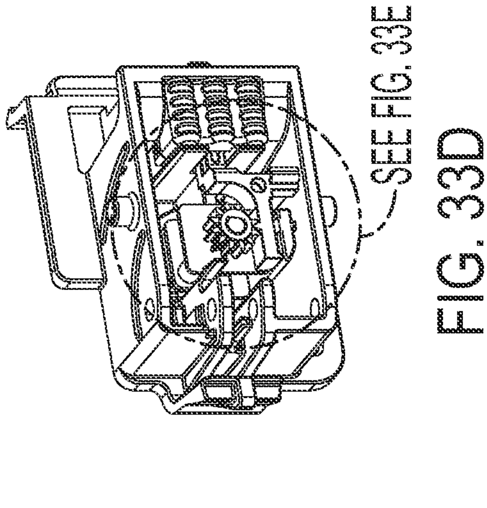
Figure 33E:
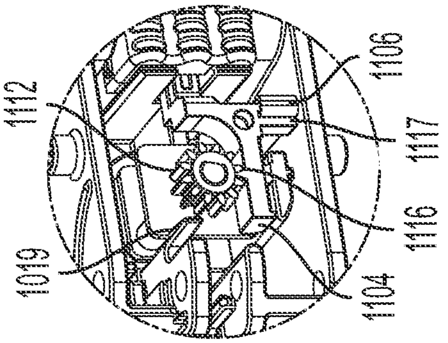
FIG. 33E is a detailed view of the latch assembly of FIG. 33D.
Figure 34A:
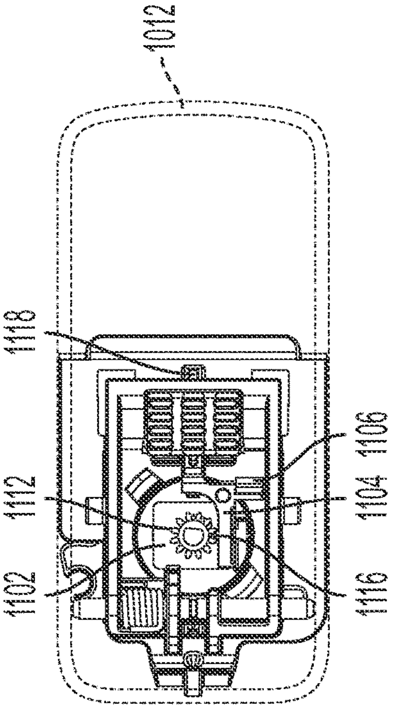
FIGS. 34A, 34B and 34C depict front elevation, cross-sectional side, and cross-sectional side views, respectively of the latch assembly of FIG. 32 shown in a locked configuration.

The base housing 1010, which is shown in FIGS. 30A-30F, is substantially similar to the housing 910 with the exception that the housing 1010 includes a square shaped opening 1016 on a side face thereof. The square shaped opening 1016 is used with the deadbolt in the locking version of the latch assembly 1100 that is shown in the fourth embodiment of FIGS. 32-38. Additionally, the opening 1018 in the housing 1010 is sized to receive a different style of lock barrel in the locking version of the latch assembly (only). Two outwardly protruding ramps 1020 and 1022 are defined on the top and bottom sides of the housing 1010. The radius of curvature of the ramp 1022 is less than that of the ramp 1020. Each ramp 1020 and 1022 is configured to interact with a surface or depression that is formed on the interior sides of the paddle 1012 to help guide rotation of the paddle 1012 about the base housing 1010. As best shown in FIG. 34C, a slot 1011 is formed on the base wall of the housing 1010 for retaining a spring tab, as will be described with reference to the locking version of the latch assembly 1100 that is shown in the fourth embodiment of FIGS. 32-38.

The rotor 1014, which is shown in FIGS. 31A-31F, is substantially similar to the rotor 914 with the exception that rotor 1014 does not include an internal rib (like rib 988) that is configured to interact with a lock.

In operation, starting from the closed position of the latch assembly 1004 shown in FIG. 25A, the user rotates the paddle 1012 in the outward direction against the bias of the spring 916 to the extended position shown in FIG. 25D. The paddle 1012 operates in the same manner as that described with reference to the second embodiment. As the paddle 1012 is rotated outwards, the rounded leg 1020 of the paddle 1012 bears on the bearing surface 1022 of the rotor 1014 thereby urging the rotor 1014 to rotate in the counterclockwise direction (as viewed from the rear of the latch assembly in FIG. 25B) against the bias of the spring 918. As the rotor 1012 rotates, the slots 1024 of the rotor 1014 travel over the prongs 1026 of the housing 1010. Also, as the rotor 1014 rotates, the pawls 1006 and 1008 are moved inwardly toward the housing 1010 and separate from their respective strikers in the vehicle dashboard. In the open position of the latch assembly 1004, the door assembly 1000 may be moved with respect to the opening of the motor vehicle to which the door assembly 1000 is mounted.

When the user releases the paddle 1012, the spring 916 causes the paddle 1012 to return to the home position shown in FIGS. 25A and 28B. Also, the spring 918 causes the paddle 1012 to return to the home position due to the bearing engagement between the leg 1020 and the bearing surface 1022 of the rotor 1014. The paddle 1012 comes to rest on the bumper 983 to prevent BSR, as described above. As the rotor 1014 rotates in the clockwise direction, the pawls 1006 and 1008 move outwardly and away from the housing 1010 so that the free ends of the pawls 1006 and 1008, respectively, can engage with strikers (not shown) on the opening of the motor vehicle to which the door assembly 1000 is mounted. The user then closes the door assembly 1000, thereby concealing the opening in the motor vehicle and causing the free ends of the pawls 1006 and 1008, respectively, to engage with strikers (not shown) on the opening of the motor vehicle.

Fourth Embodiment

A fourth embodiment of a locking latch assembly 1100 incorporating aspects of the present invention is illustrated in FIGS. 32 through 38. The locking latch assembly 1100 can be used with the door 1002 of FIG. 25A. The latch assembly 1100 is both structurally and functionally similar to the non-locking latch assembly 1004 of FIGS. 25A through 31F, with the overall exception that the latch assembly 1100 is configured to lock the door 1002 in the closed position.

The locking latch assembly 1100 generally includes all of the components of the latch assembly 1004, and, additionally, an electronic lock 1102 for selectively locking and unlocking the latch assembly 1100, and a deadbolt 1104 that is moved by the lock 1102 against the bias of a spring tab 1106 between locked and unlocked positions.

The electronic lock 1102 comprises a motor housing 1110 containing an electric motor having an output shaft 1111. A gear 1112 having a number of gear teeth is non-rotatably connected to the output shaft 1111 of the motor in a keyed fashion such that the gear 1112 rotates along with the output shaft 1111. The motor housing 1110 is fixed in the hole 1018 in the housing 1010 by spring tabs 1019 defined in the interior of the housing 1010. Although not shown, the electronic lock 1102 includes electrical wires for connection to a power source in the vehicle (e.g., the vehicle battery). The rotor 1014 has a central opening 1025 through which the wires can pass. The electronic lock 1102 or a receiver unit that is connected thereto is configured to receive commands wirelessly (e.g., short range radio transmission, Bluetooth, RFID, etc.) from a key fob having a transmitter (for example), however, the lock 1102 could also receive commands through a wired connection in the vehicle. The lock 1102 could also be electrically controlled using a simple switch. The lock 1102 is not visible from the exterior of the door assembly.

The lock 1102 is also referred to more broadly herein as an "actuator," because the lock 1102 may be a button or lock cylinder that is manually actuated.

The motor of the lock 1102 has a large gear ratio (e.g., 100:1) such that that the system cannot be back driven. More particularly, the large gear ratio prevents the deadbolt 1104 from being manually pushed backwards into the housing 1010 in order to unlock the latch assembly 1100 in a manual and unauthorized manner.

The deadbolt 1104, which is shown in FIGS. 37A through 37F, is an elongated body having a square or rectangular cross-section, at least in part. Specifically, the deadbolt 1104 includes an axially extending first end 1113 having a triangular shaped gear tooth 1116 on side that faces the gear 1112. As best shown in FIG. 34A, the gear tooth 1116 is configured to be meshed with the gear 1112 of the lock 1102. An axially extending second end 1118 is parallel and spaced apart from the first end 1113. A shoulder 1115 extends transversely between the ends 1113 and 1118. Two parallel prongs 1117 extend the shoulder 1115 at the intersection of the shoulder 1115 and the first end 1113 in a direction that is transverse to the first end 1113.

Figure 34B:
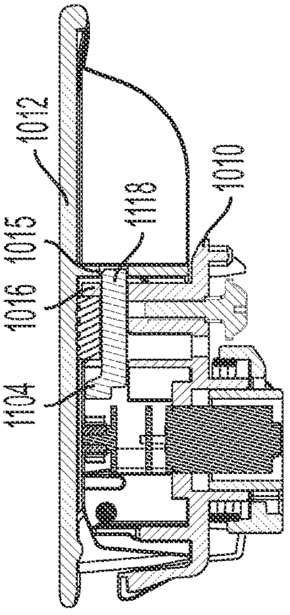
Figure 34C:
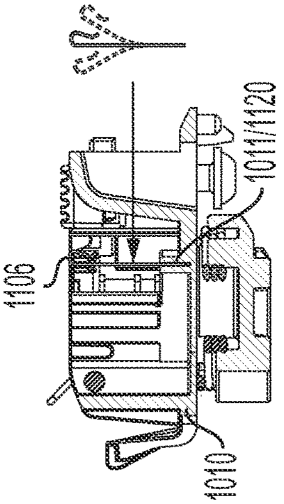

The second end 1118 of the deadbolt 1104 is configured to retain the latch assembly 1100 in a locked configuration when the deadbolt 1104 is moved to the extended and locked position shown in FIGS. 34A and 34B. Specifically, in the locked state of the deadbolt 1104, the second end 1118 is positioned at least partially through both the hole 1016 in the housing 1010 and the hole 1015 in the paddle 1012. Thus, the second end 1118 of the deadbolt 1104, the hole 1016 in the housing 1010 and the hole 1015 in the paddle 1012 are all axially aligned.

Figure 30A:
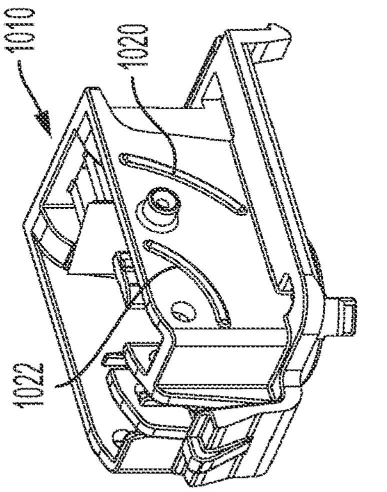
FIGS. 30A, 30B, 30C, 30D, 30E and 30F are front isometric, front elevation, rear elevation, bottom plan, left elevation, and right elevation views, respectively, of the housing of the latch assembly of FIG. 27.
Figure 30B:
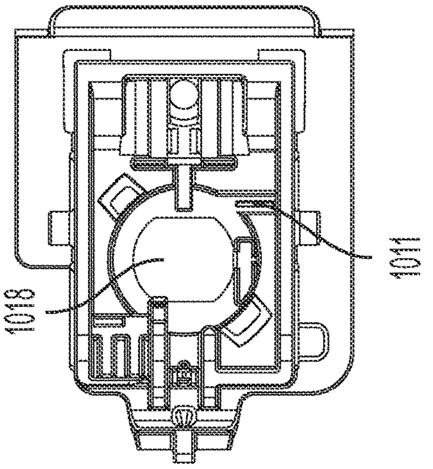
Figure 30C:
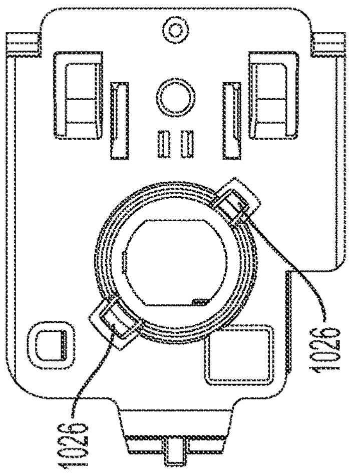
Figure 30D:
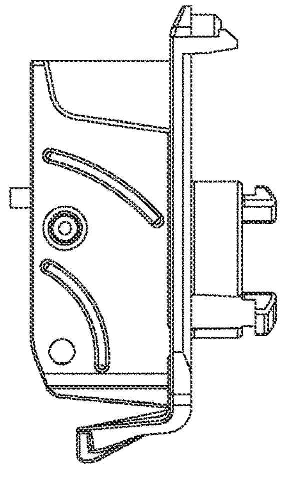
Figure 30E:
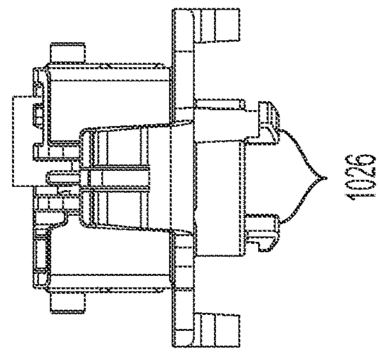
Figure 30F:
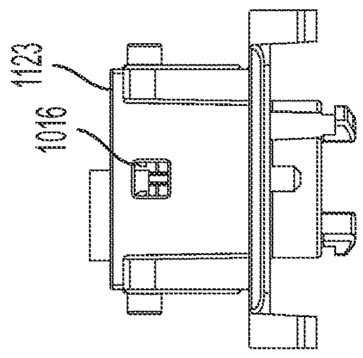
Figure 31A:
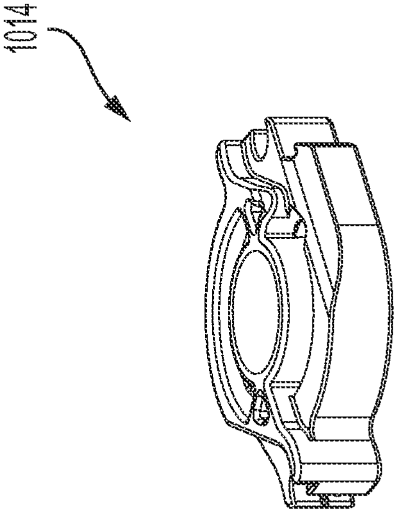
FIGS. 31A, 31B, 31C, 31D, 31E and 31F are rear isometric, rear elevation, front elevation, top plan, right elevation, and left elevation views, respectively, of the rotor of the latch assembly of FIG. 27.
Figure 31B:
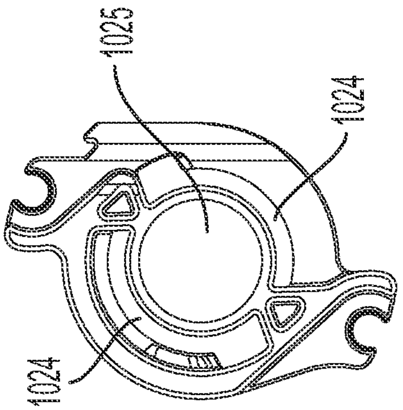
Figure 31C:
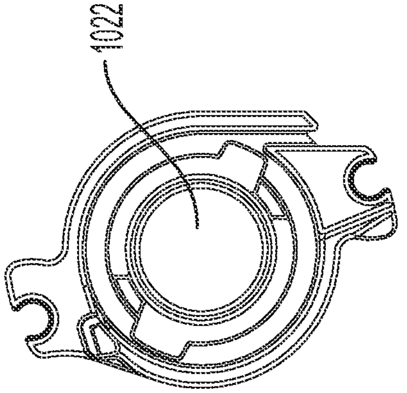
Figure 31D:
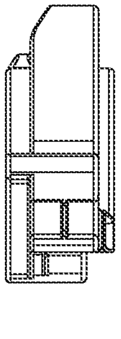
Figure 31E:
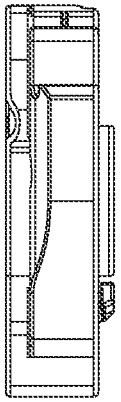
Figure 31F:
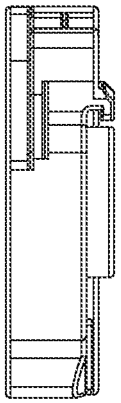

It was found that engaging the deadbolt 1104 with the paddle 1102 at the forward most edge 1123 (see FIG. 30F)

of the housing 1010 (i.e., the edge of the housing 1010 opposite the axis of rotation that is at least partially defined by the pin 960), increased the ultimate locking load in comparison to traditional locks that act closer to the pivot point of a paddle. In other words, the locking strength of the latch assembly 1100 is greater than that of a traditional paddle lock having a deadbolt that engages the paddle near a pivot point of the paddle.

Figure 38:
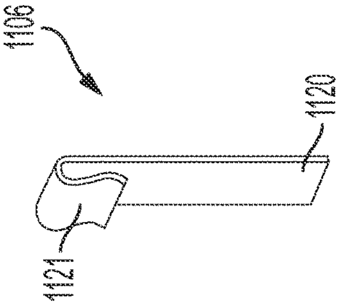
FIG. 38 is an isometric view of the spring of the locking latch assembly of FIG. 32.

The spring tab 1106 is shown in FIG. 38, and is composed of a thin flexible and elastic material, such as metal or plastic. The spring tab 1106 comprises an elongated body having a first end 1120 that is fixedly mounted in the slot 1011 formed in the housing 1010, and a second end 1121 opposite the first end 1120. The second end 1121 is folded over itself and a gap is formed between the fold. In assembled form, as best shown in FIG. 33E, the second end 1121 of the spring tab 1106 is mounted to the prongs 1117 of the deadbolt 1104. The spring tab 1106 is configured to bias the moveable deadbolt 1104 with respect to the stationary housing 1010. Specifically, the spring tab 1106 is biased to center the deadbolt 1104 between the locked and unlocked positions shown in FIGS. 34B and 35B, respectively. The spring tab 1106 does not have to be a separate component, and could be co-molded and integral with the housing 1010 or the deadbolt 1104. Also, the spring could take on other forms such as a wound spring or a torsional spring.

FIGS. 33A through 33E depict the sequential process of assembling the lock 1102, deadbolt 1104, spring tab 1106 and bumper 983 into the latch assembly 1100.

In operation, starting from the closed and locked position of the latch assembly 1100 shown in FIGS. 34A and 34B, the second end 1118 of the deadbolt 1104 is positioned through the hole 1016 in the housing 1010 and at least partially through the hole 1015 in the paddle 1012, thereby preventing the paddle 1012 from being rotated by a user with respect to the housing 1010.

Figure 35A:
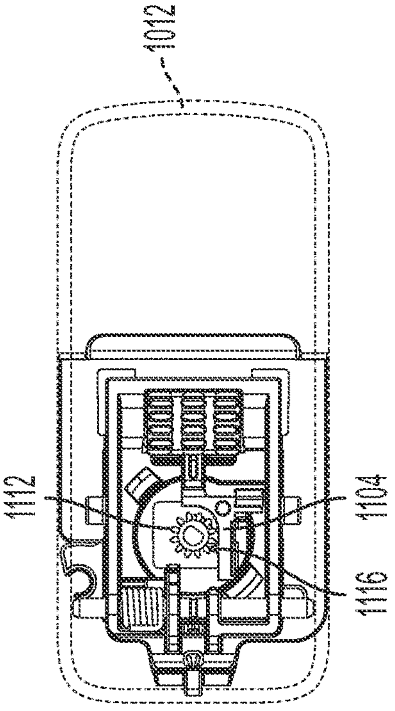
FIGS. 35A, 35B and 35C depict front elevation, cross-sectional side, and cross-sectional side views, respectively of the latch assembly of FIG. 32 shown in an unlocked configuration.
Figure 35B:
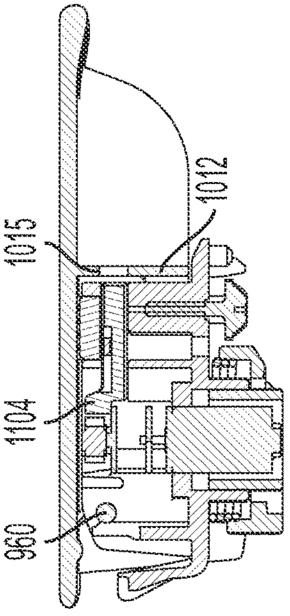
Figure 35C:
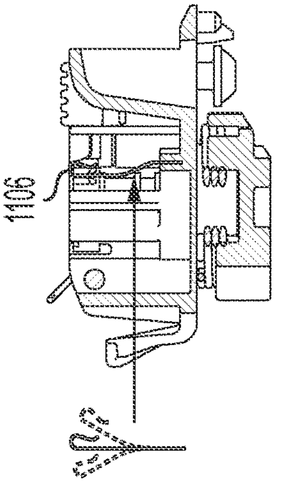
Figure 36A:
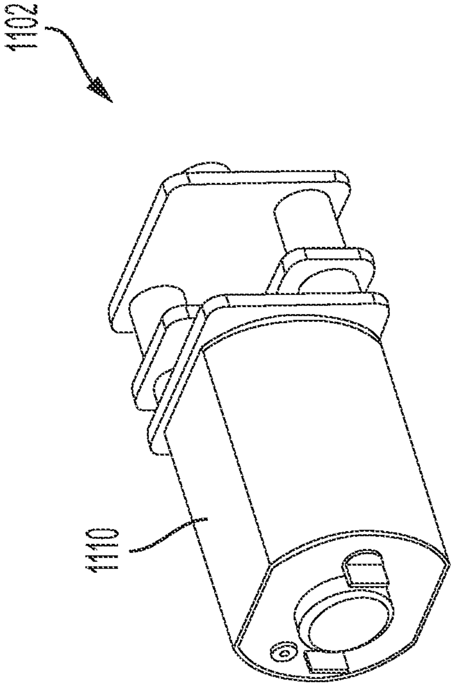
FIGS. 36A and 36B depict front isometric and rear isometric views, respectively, of the electronic lock assembly of the locking latch assembly of FIG. 32.
Figure 36B:
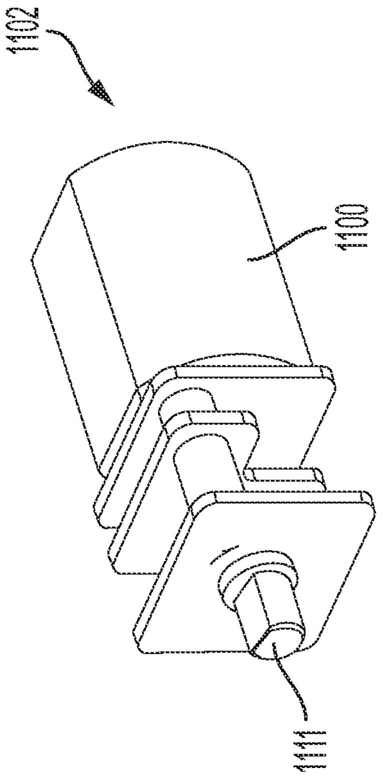
Figure 37A:
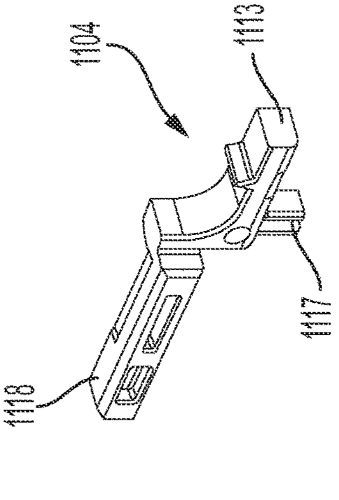
FIGS. 37A, 37B, 37C, 37D, 37E and 37F depict isometric, front elevation, top plan, bottom plan, right elevation and left elevation views of the deadbolt of the locking latch assembly of FIG. 32.
Figure 37B:
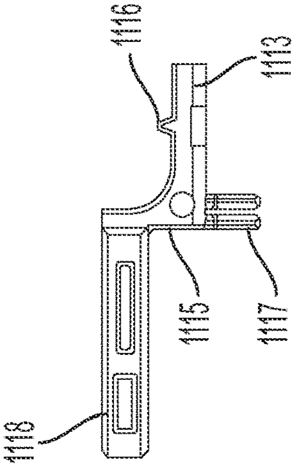
Figure 37C:
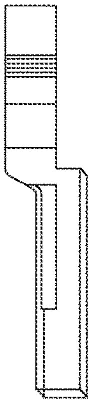
Figure 37D:
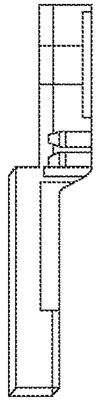
Figure 37E:
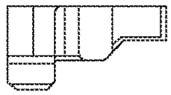
Figure 37F:
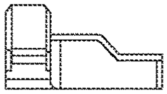

The user then transmits a signal to the lock 1102, which causes the motor of the lock 1102 to rotate the gear 1112 in a clockwise direction (as viewed in FIG. 34A) which translates the deadbolt 1104 out of the hole 1015 of the paddle 1012 against the bias of the spring tab 1106, as depicted in FIG. 35A. Once the deadbolt 1104 is separated from the hole 1015 of the paddle 1012, the latch assembly 1100 is maintained in the unlocked position. The user can then rotate the paddle 1012 to open the door 1002, as is described with reference to the third embodiment.

To lock the door 1002, the user transmits a signal to the lock 1102, which causes the motor of the lock 1102 to rotate the gear 1112 in a counterclockwise direction (as viewed in FIG. 34A) which translates the deadbolt 1104 into the hole 1015 of the paddle 1012 against the bias of the spring tab 1106, as depicted in FIG. 34B. Once the deadbolt 1104 is positioned within the hole 1015 of the paddle 1012, the latch assembly 1100 is maintained in the locked position.

It is noted that the lock 1102 and the deadbolt 1104 are decoupled from the pawls 1006 and 1008 and the rotor 1014 such that the pawls 1006 and 1008 are capable of translating even when the paddle 1012 is locked by the deadbolt 1104. Accordingly, the door 1002 can be moved to the closed position even while the latch assembly 1100 is locked. This feature prevents breakage of the latch assembly 1100 if the door 1002 is closed while the latch assembly 1100 is locked. It is also noted that the deadbolt 1104 has a limited number of teeth (e.g., one) such that at the moment when the deadbolt 1104 has reached either the locked or unlocked position, the gear tooth 1116 is not meshed with the gear 1112. Instead, the gear 1112 can continue to rotate without causing damage to either the gear 1112 or the deadbolt 1104. However, at the moment that rotation of the gear 1112 ceases, the spring tab 1106 pulls the deadbolt 1104 toward the center of the gear 1112 to engage the tooth 1116 with the teeth of the gear 1112. Accordingly, when the drive direction of the gear 1112 is reversed, the deadbolt 1104 and gear 1112 engage so that the deadbolt 1104 can be moved in the opposite direction.

The biasing of the spring tab 1106 also serves as a protection against gear stripping or motor stalling. The ability for the tooth 1116 on the deadbolt 1104 to disengage from the gear 1112 on the motor prevents an overload condition at end of stroke for the deadbolt 1104. The spring tab 1106 ensures reengagement of the tooth 1116 to the gear 1112 for reverse actuation as needed.

Fifth Embodiment

FIGS. 45A-45D and 46 depict a fifth exemplary embodiment of a locking latch assembly 1800 for use with a door assembly, such as the door assembly of FIGS. 25A-25D (or similar). The locking latch assembly 1800 is substantially similar to the latch assembly 1100 of FIG. 32 and only the primary differences therebetween will be described hereinafter. The common components between those latch assemblies share the same reference characters.

The paddle 1808 of the latch assembly 1800 includes an aperture 1809 through which a lock barrel (not shown) is positioned for either locking or unlocking the latch assembly 1800. Further details regarding the lock barrel are described with reference to FIGS. 6A and 6B.

Figure 45A:
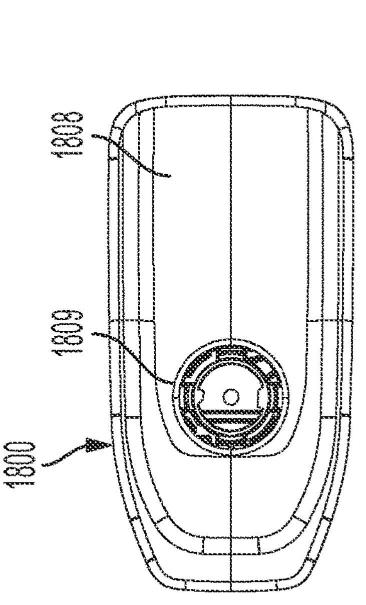
FIGS. 45A-45D depict front, left, right and side views, respectively, of a partially assembled locking latch assembly for use with the door assembly of FIGS. 25A-25D according to a fifth exemplary embodiment.
Figure 45B:
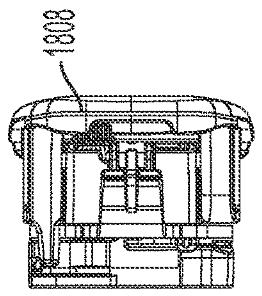
Figure 45C:
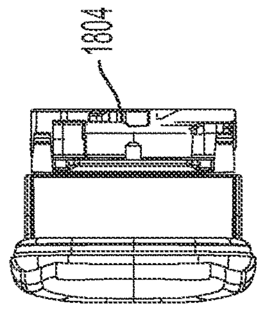
Figure 45D:
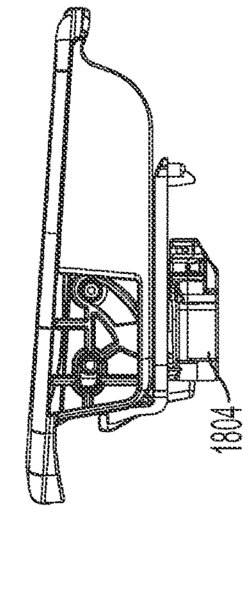
Figure 46:
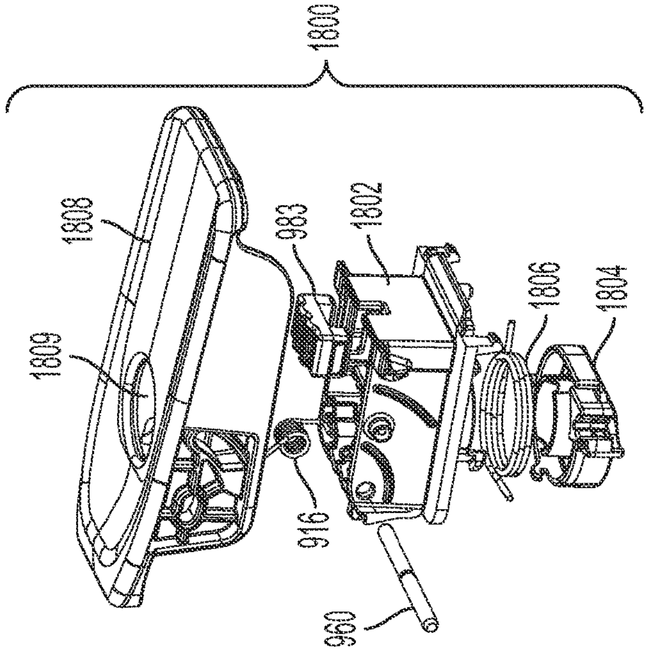
FIG. 46 is an exploded view of the locking latch assembly of FIG. 45A.
Figure 49:
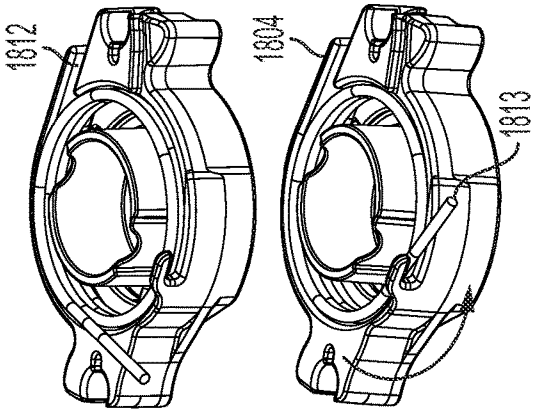
FIGS. 47-52 depict an exemplary sequence for assembling the spring, rotor and base housing of the locking latch assembly of FIG. 45A.

FIGS. 47-52 depict an exemplary sequence for assembling the torsion spring 1806, rotor 1804 and base housing 1802 of the latch assembly 1800 of FIG. 45A. Starting from FIGS. 47 and 48, the spring 1806 is mounted to the rotor 1804 by positioning the coiled portion of the spring 1806 into an annular recess 1810 formed on one side of the rotor 1804. One free end 1811 of the spring 1806 is positioned into a first spring mounting recess 1812 that extends tangentially from the annular recess 1810. Referring now to FIG. 49, the other free end 1813 of the spring 1806 is wound about the rotor 1804, thereby tightening the coiled portion of the spring 1806, and is inserted into a second spring mounting recess 1814 that is formed on a side surface of the rotor 1804. The rotor 1804 and the spring 1806 now constitute a sub-assembly.

Figure 11C:
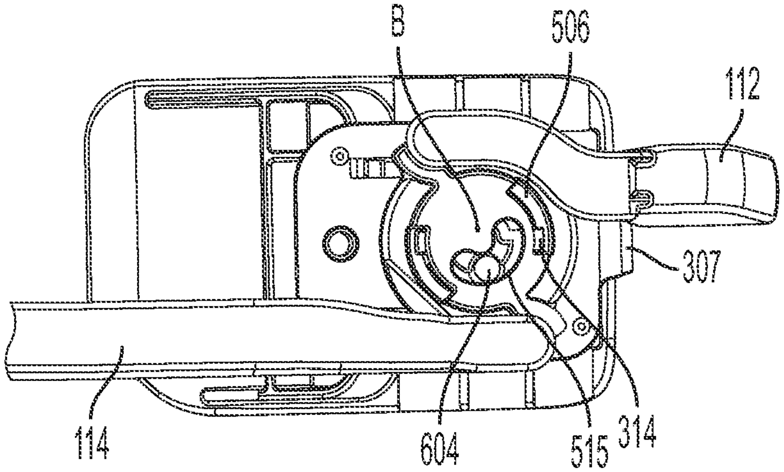
FIG. 11C is a rear elevation view of the unlocked and opened latch assembly of FIG. 11A.
Figure 52:
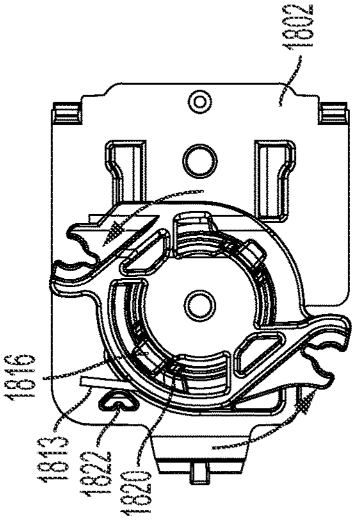
Figure 48:
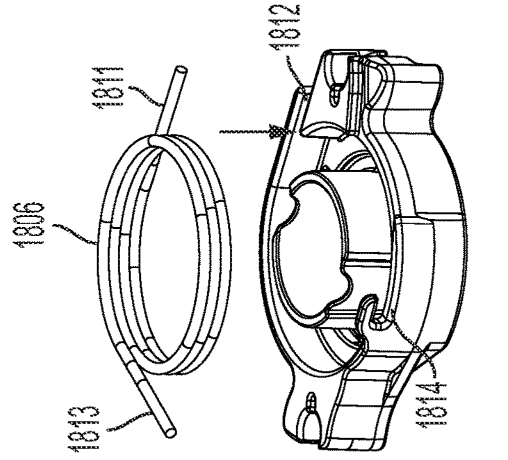
Figure 51:
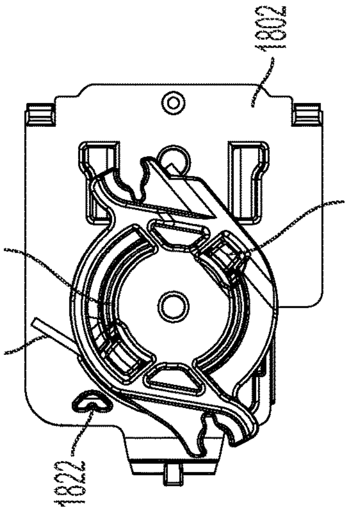
Figure 47:
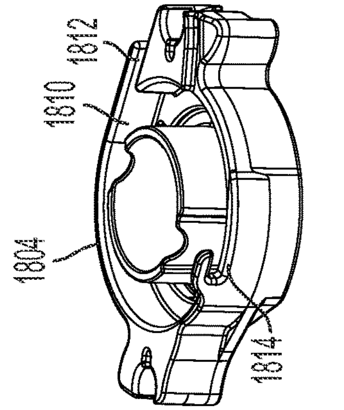
Figure 50:
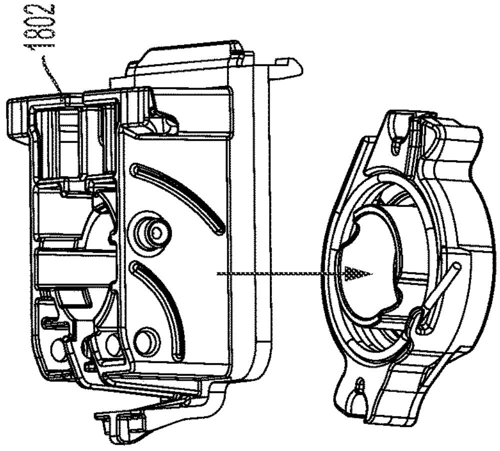

Referring now to FIGS. 50 and 51, the sub-assembly of the rotor 1804 and the spring 1806 are mounted to the underside of the base housing 1802 by positioning barbs 1816 on the housing 1802 into respective slots 1818 formed in the rotor 1804, much like the connection between the barbs and slots of FIG. 11C. Referring now to FIG. 52, the rotor 1804 is rotated in the direction depicted by the arrow until one of the barbs 1816 on the housing 1802 snaps over a protruding surface 1820 formed on the rotor 1804. Thereafter, the sub-assembly of the rotor 1804 and the spring 1806 are rotatably connected to the housing 1802. The free end 1813 of the spring 1806 is positioned against a stop 1822 formed on an exterior surface of the housing 1802. The spring 1806 biases the rotor 1804 to rotate in a direction that is opposite to the direction of the arrow shown in FIG. 52.

Figure 53:
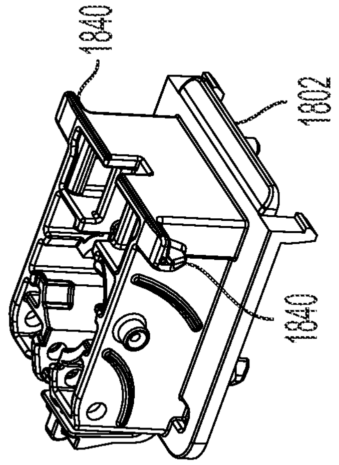
FIG. 53 depicts the base housing of the locking latch assembly of FIG. 45A.
Figure 54A:
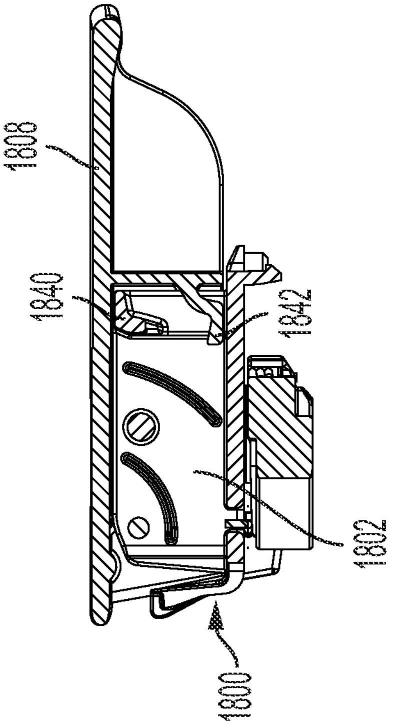
FIG. 54A depicts a cross-sectional side elevation view of the assembled locking latch assembly of FIG. 45A, wherein the latch assembly is shown in the closed position.
Figure 54B:
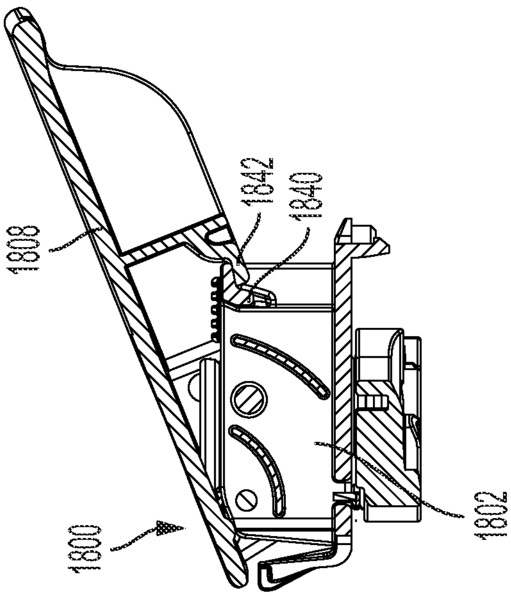
FIG. 54B depicts a cross-sectional side elevation view of the assembled locking latch assembly of FIG. 45A, wherein the latch assembly is shown in an open position.

Turning now to FIGS. 53-54B, the base housing 1802 of the locking latch assembly 1800 includes rotation limiters 1840 extending from axial sides thereof. Each rotation limiter 1840 is a surface that is configured to engage with respective surfaces 1842 formed on the paddle 1808 to limit rotation of the paddle 1808 beyond the open position shown in FIG. 54B. Surfaces 1842 on paddle are heel shaped and are concealed from view within the interior of the hollow paddle 1808. It is noted that other components of the locking latch assembly 1800, acting in concert with the rotation limiters 1840, may also prevent rotation of the paddle 1808 beyond the open position shown in FIG. 54B.

Sixth Embodiment

Figure 55:
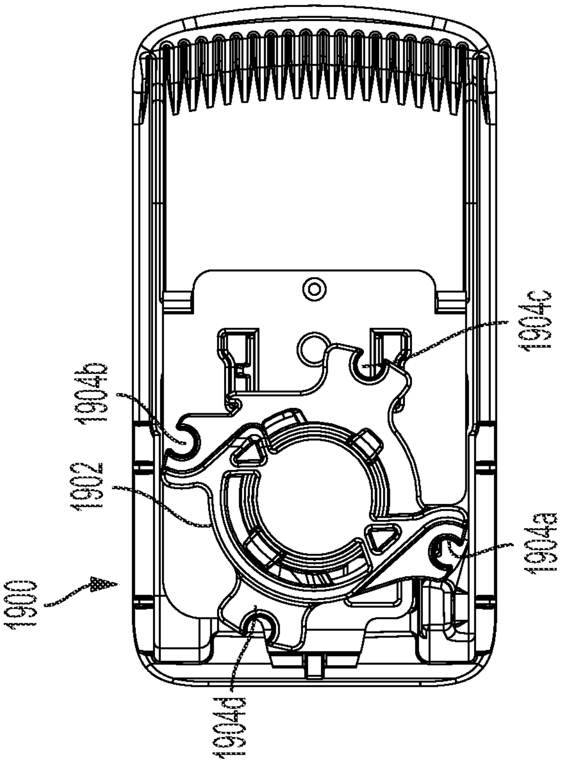
FIG. 55 depicts a bottom plan views of a sixth exemplary embodiment of a locking latch assembly for use with the door assembly of FIGS. 25A-25D.

FIG. 55 is a bottom plan view of a sixth exemplary embodiment of a locking latch assembly 1900 for use with the door assembly of FIGS. 25A-25D, and FIGS. 56A and 56B depict pawls 1908 mounted to the latch assembly 1900. The latch assembly 1900 is substantially identical to the latch assembly 1800 of FIG. 45A and only the primary differences therebetween will be described hereinafter.

The rotor 1902 of the latch assembly 1900 includes four crescent shaped recesses 1904*a* through 1904*d* (referred to either individually or collectively as recess(es) 1904) defined on the perimeter of the rotor 1900. Recesses 1904*a*-1904*d* are evenly spaced apart by approximately ninety degrees about the perimeter of rotor 1902. Each recess 1904 is configured to be releasably coupled to one of the posts 120 and 127 of the pawls 112 and 114, respectively, for example, as was described above with respect to FIG. 5B.

Figure 56A:
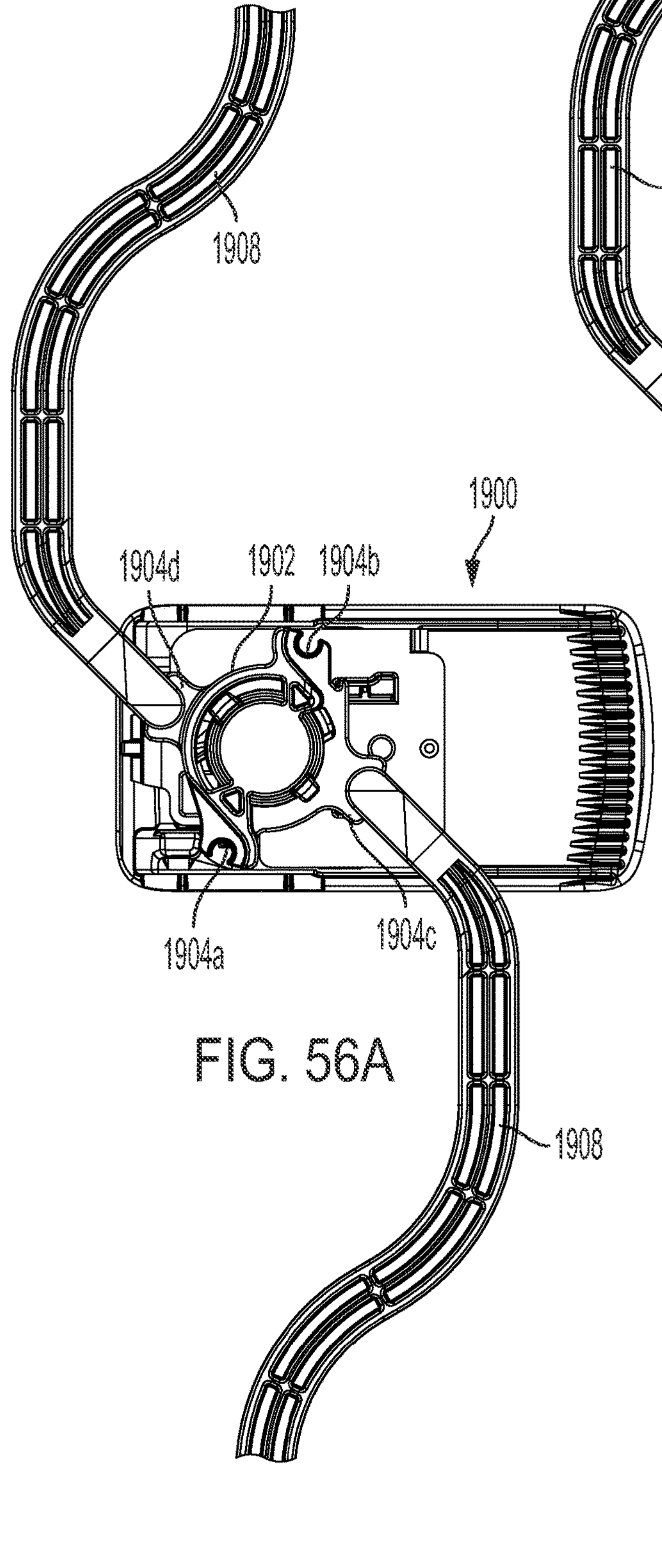
FIGS. 56A and 56B depict pawls connected to the locking latch assembly of FIG. 55, wherein the locking latch assembly is shown rotated in FIG. 56B.
Figure 56B:
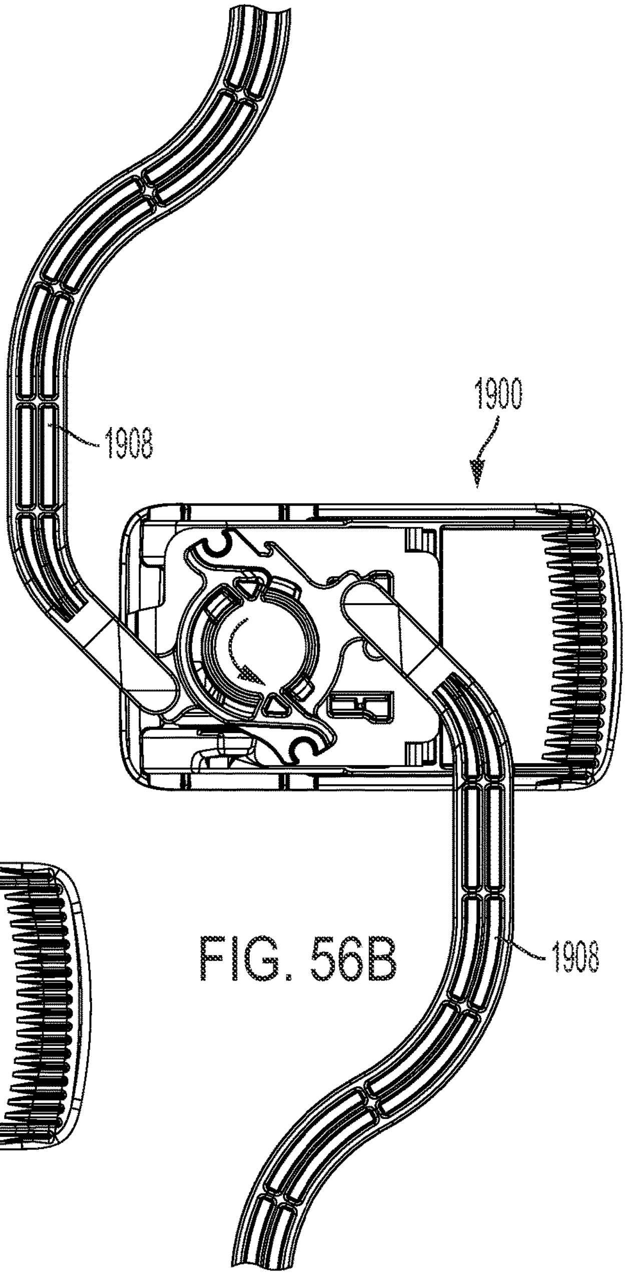
Figure 57:
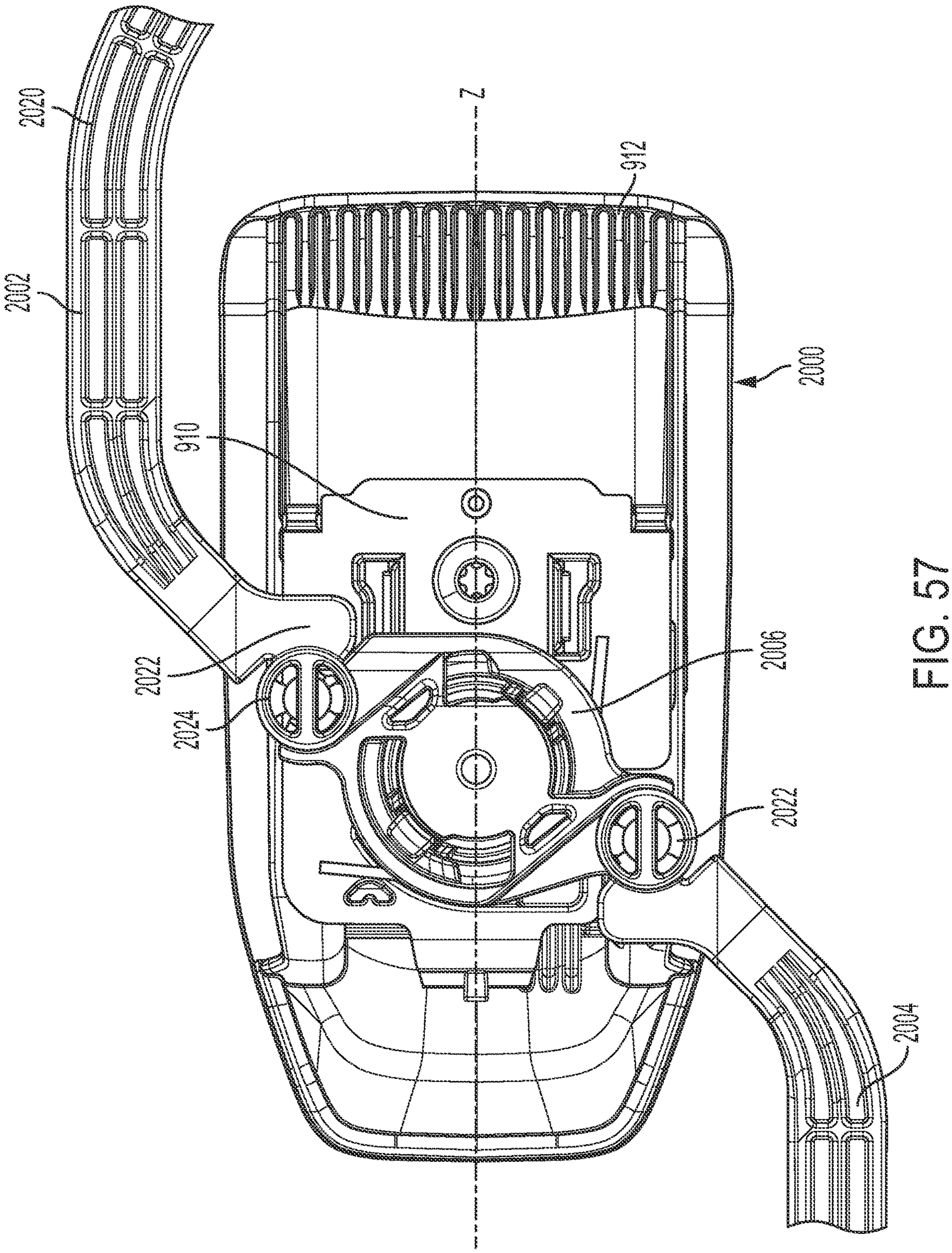
FIG. 57 is a rear elevation view of a latch assembly including pawls mounted thereto according to a seventh exemplary embodiment.

It is noted that recesses 1904*a* and 1904*b* can be found on the rotor 1804 of the latch assembly 1800, however, unlike the rotor 1804, the rotor 1902 additionally includes two further two recesses 1904*c* and 1904*d*. The recesses 1904*c* and 1904*d* are provided as an alternative to using recesses 1904*a* and 1904*b*. More particularly, when it is desired to utilize the locking latch assembly 1900 in a "side-pull" arrangement (like that shown in FIG. 1A) the two pawls are connected to recesses 1904*a* and 1904*b*. Alternatively, when it is desired to utilize the locking latch assembly 1900 in a "vertical-lift" arrangement, as shown in FIGS. 56A and 56B, the two pawls 1908 are connected to recesses 1904*c* and 1904*d*. In FIGS. 56A and 56B, the pawls are shown mounted to (only) the recesses 1904*c* and 1904*d*, and the pawls are shown rotating the rotor 1902 in those views.

It is noted that the number of recesses 1904 and the spacing therebetween can vary. For example, the rotor 1902 may only include two recesses 1904, and the orientation of the pawls may be changed to switch between the vertical-lift and side-pull arrangements.

It is also noted that any of the latch assemblies shown herein can be employed in either a side-pull configuration or a vertical-lift configuration.

Seventh Embodiment

Turning now to FIGS. 57-63, those figures depict a latch assembly 2000 including pawls 2002 and 2004 mounted thereto according to a seventh exemplary embodiment. The latch assembly 2000 is substantially similar to the latch assembly 904 and includes many of the components thereof. The components of any of the latch assemblies that are described herein may be incorporated into the latch assembly 2000. For example, the latch assembly 2000 may include the electronic lock 1102 for selectively locking and unlocking the latch assembly 2000, and a deadbolt 1104 that is moved by the lock 1102 against the bias of a spring tab 1106 between locked and unlocked positions. The latch assembly 2000 may include any of the above components that reduce BSR. The primary differences between the latch assemblies 2000 and 904 will be described hereinafter.

Figure 58:
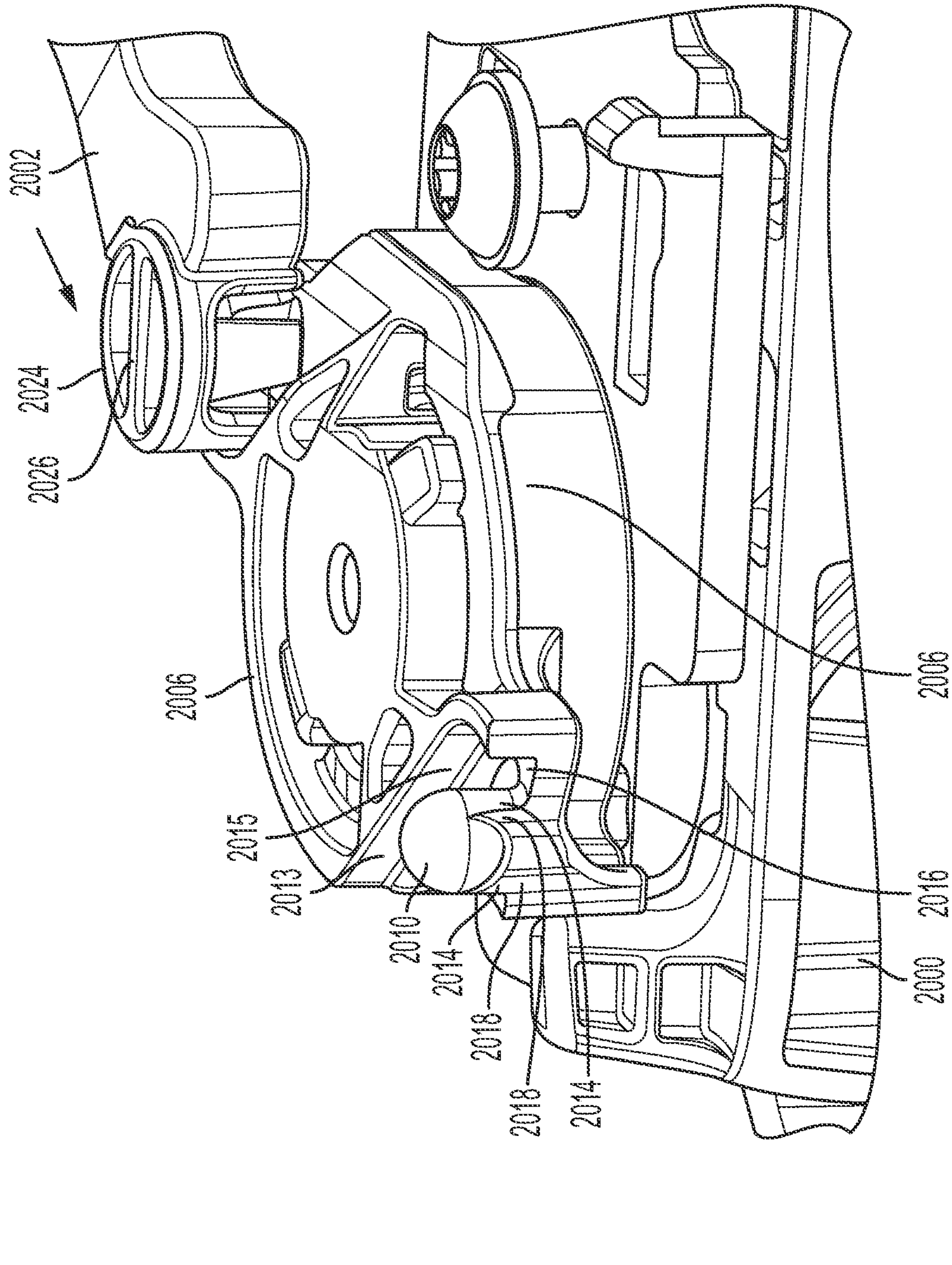
FIG. 58 is an isometric rear view of the latch assembly of FIG. 57 with one pawl omitted.
Figure 59:
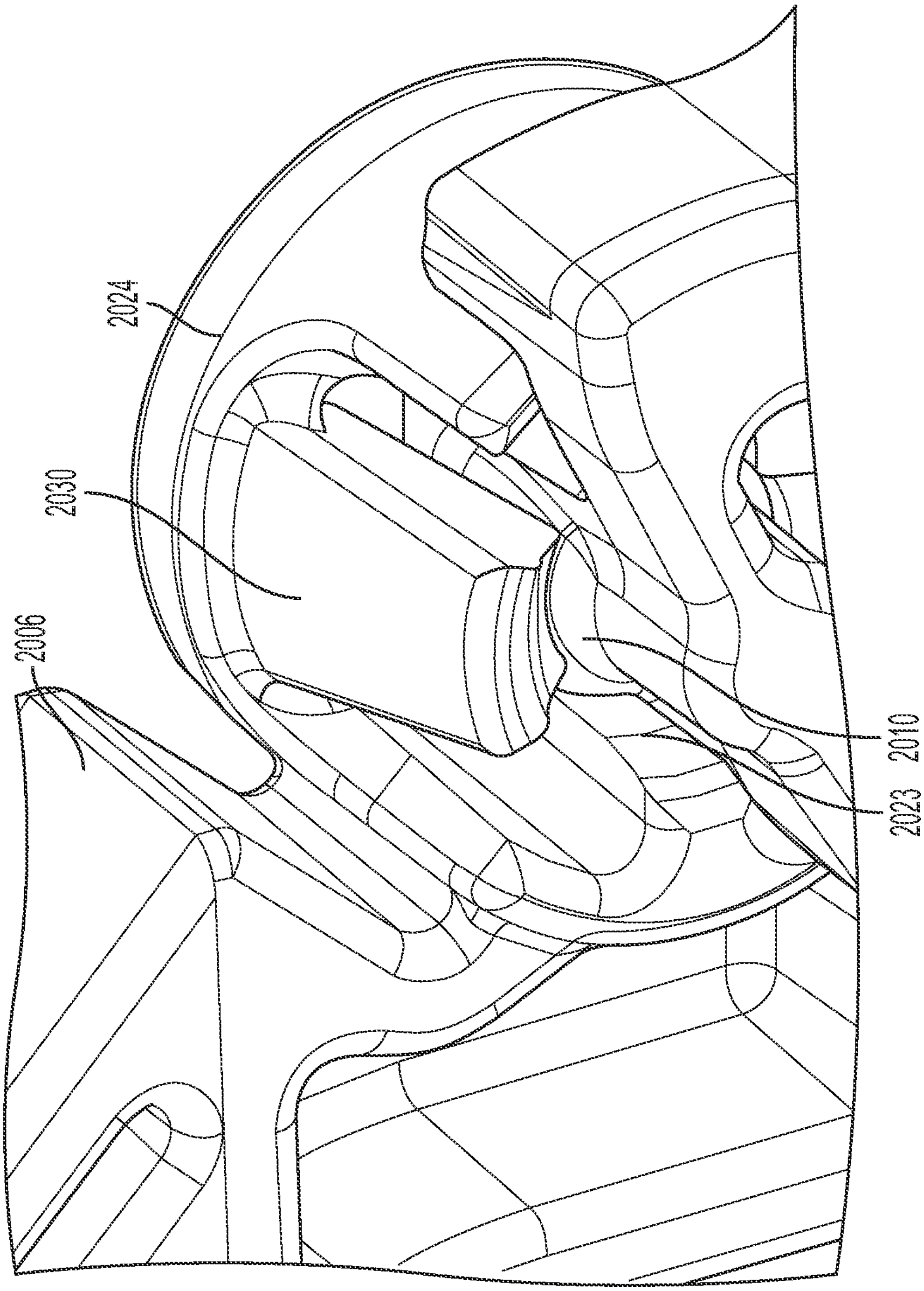
FIG. 59 is an isometric detailed view of the latch assembly of FIG. 57 showing interaction between the pawl and the rotor.
Figure 65:
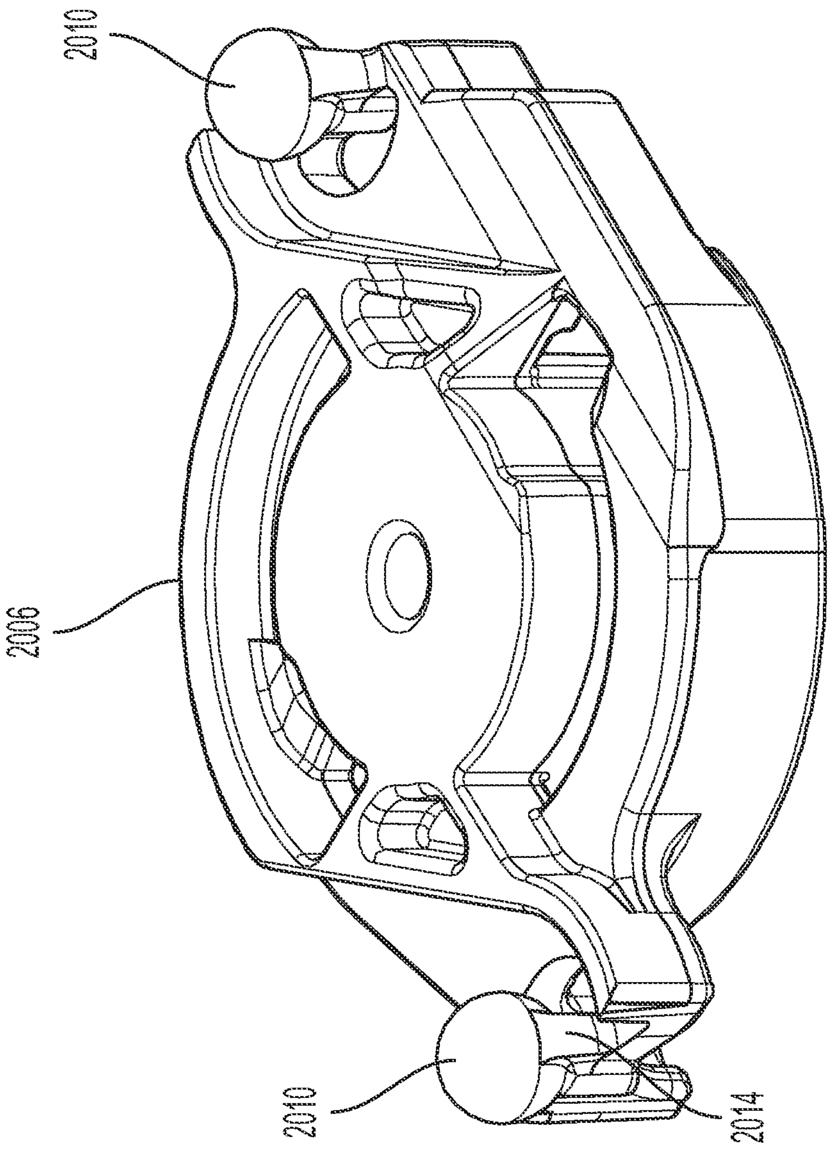
FIG. 65 is an isometric view of the rotor of the latch assembly of FIG. 57.

As best shown in FIGS. 58 and 65, the rotor 2006 of the latch assembly 2000 includes two posts 2010 (one shown) on the outer perimeter. Although only one post 2010 will be described, it should be understood that the other post 2010 is structurally and functionally equivalent. The post 2010 comprises an at least partially spherical ball that is configured to be releasably coupled to the recess 2012 of the pawl 2012. The post 2010 is capable of pivoting by a predetermined angle within the recess 2012 during operation without becoming detached from the recess 2012.

A wall 2013 on an exterior surface of the rotor 2006 at least partially surrounds the post 2010. A similar wall surrounds the other post 2010. The wall 2013 is provided to reduce the compressive loads applied to the post 2010 in the direction of the wall 2013. In use, if significant force is applied to the pawl 2002 in the direction of the wall 2013 (see arrow in FIG. 58), the outer surface 2024 of the pawl 2002 will bear on the wall 2013 of the rotor 2006, thereby alleviating pressure on the mated interface between the post 2010 and the recess 2012 of the pawl 2002. It is noted that in other embodiments, such as that shown in FIG. 5A, walls on the exterior of the rotor 500 surround the recesses 510, and those walls serve the same purpose. A gap 2015 (FIG. 58) extends between the wall 2013 and the post 2010 for receiving the end portion of the pawl 2002.

Gussets 2014 extend from opposing sides of the post 2010. The gussets 2014 are spaced apart about the perimeter of the post 2010 by about 180 degrees. Each gusset 2014 is a substantially flat and vertical surface that extends from the equator of the post 2010 downward to another surface 2016 of the rotor 2006 that adjoins the outer perimeter of the rotor 2006. Shoulders 2018 are formed on opposing sides of each gusset 2014. The gussets 2014 may also be referred to herein as rotation limiters or rotation limiting surfaces.

Figure 60:
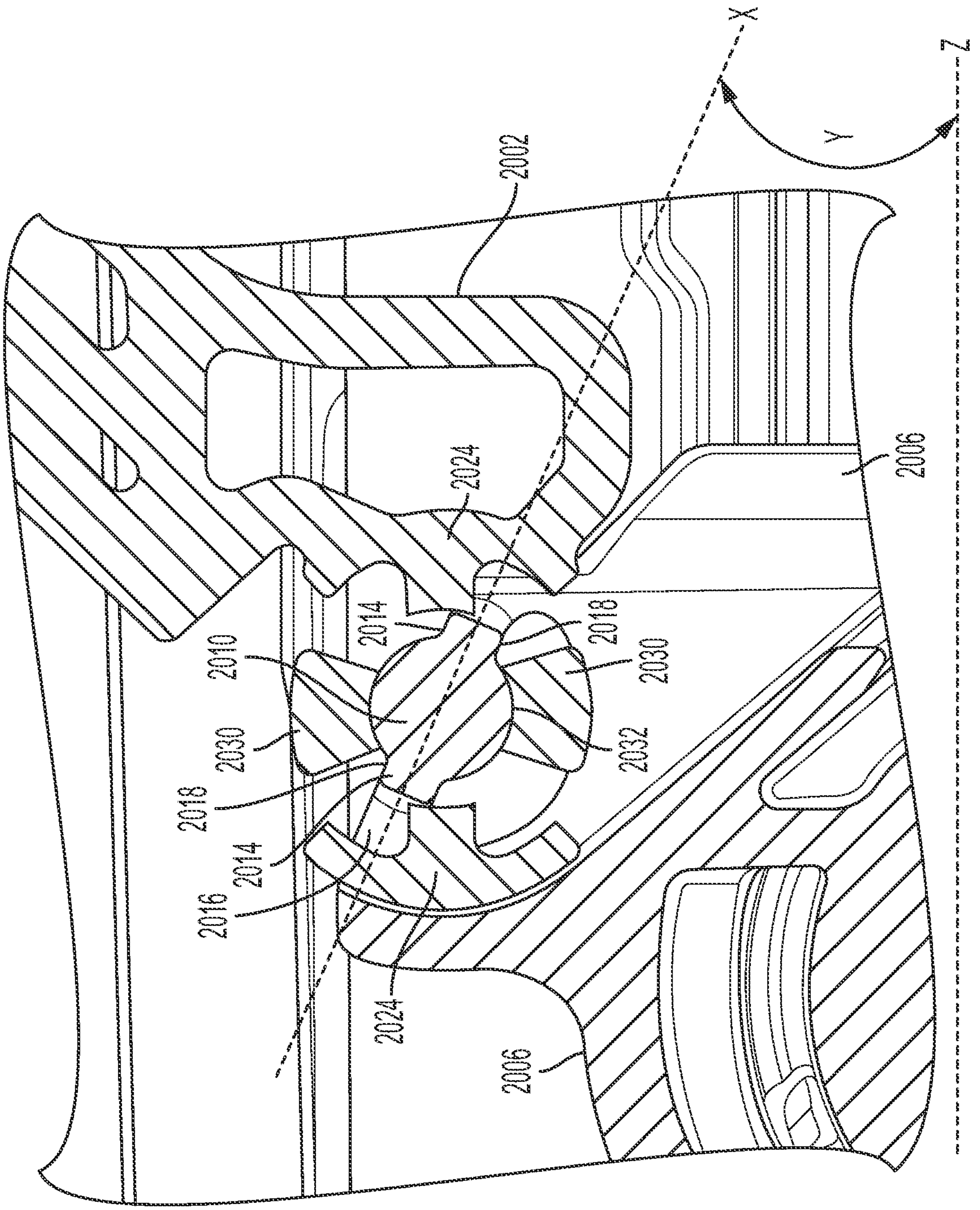
FIG. 60 is a cross-sectional view taken through the pawl and the rotor of FIG. 59.
Figure 61:
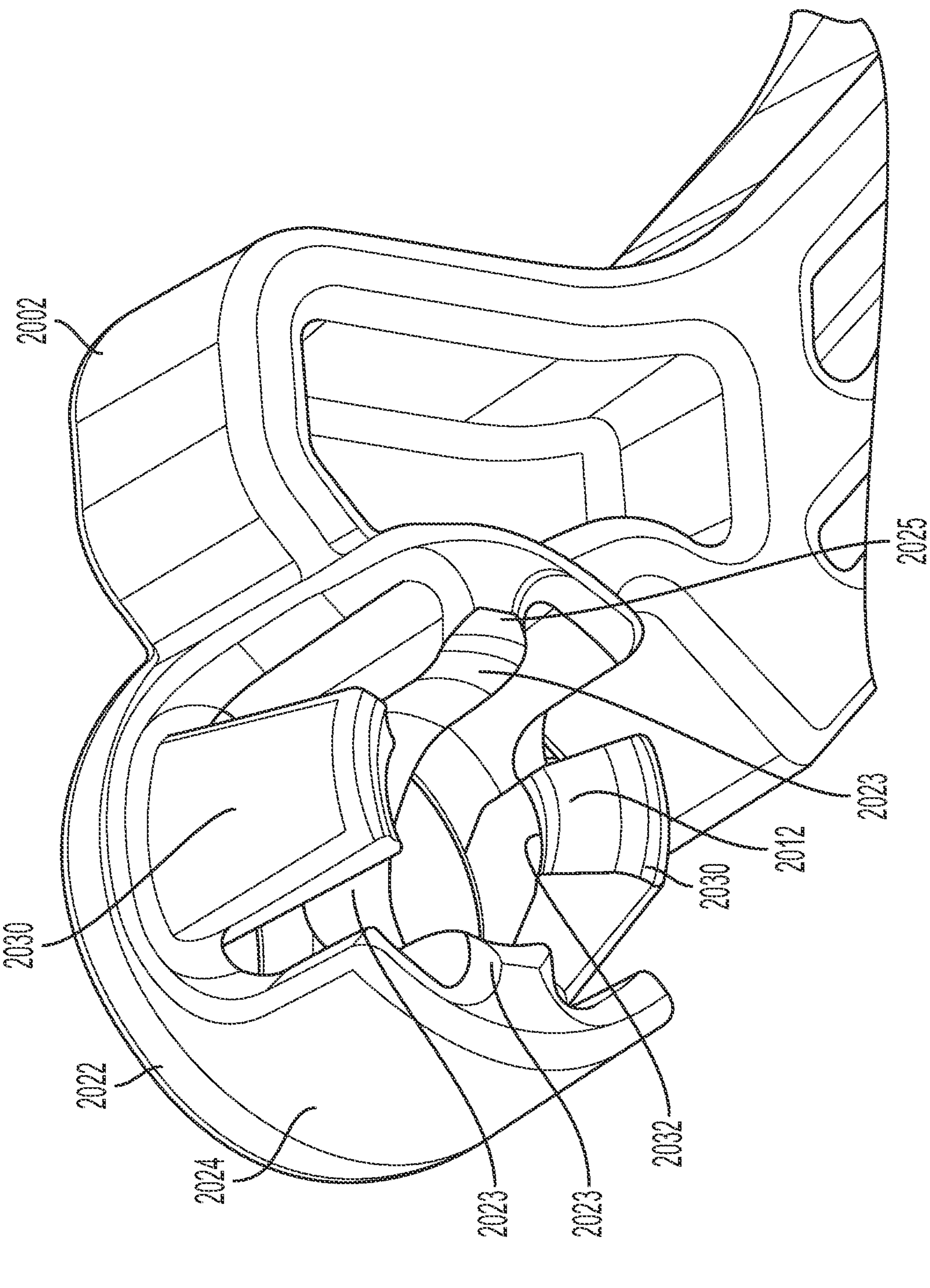
FIG. 61 is a front isometric detailed view of a portion of the pawl of FIG. 57.
Figure 62:
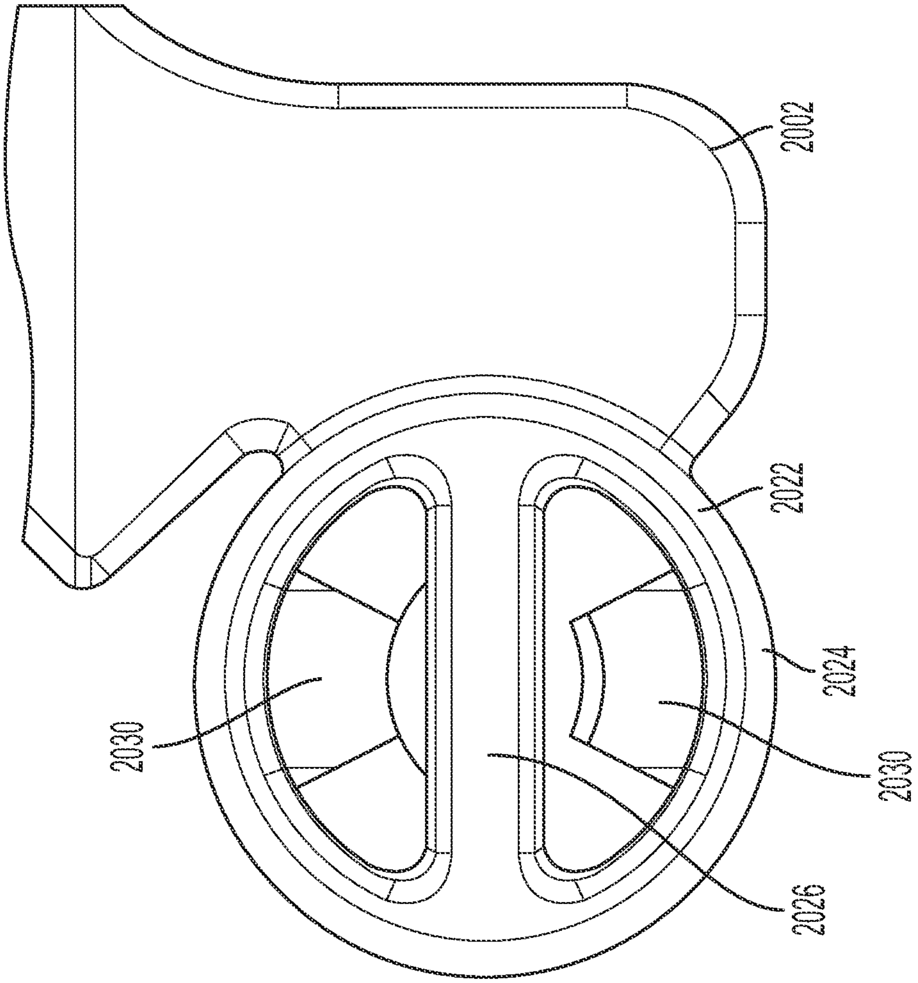
FIG. 62 is a rear elevation view of a portion of the pawl of FIG. 57.
Figure 63:
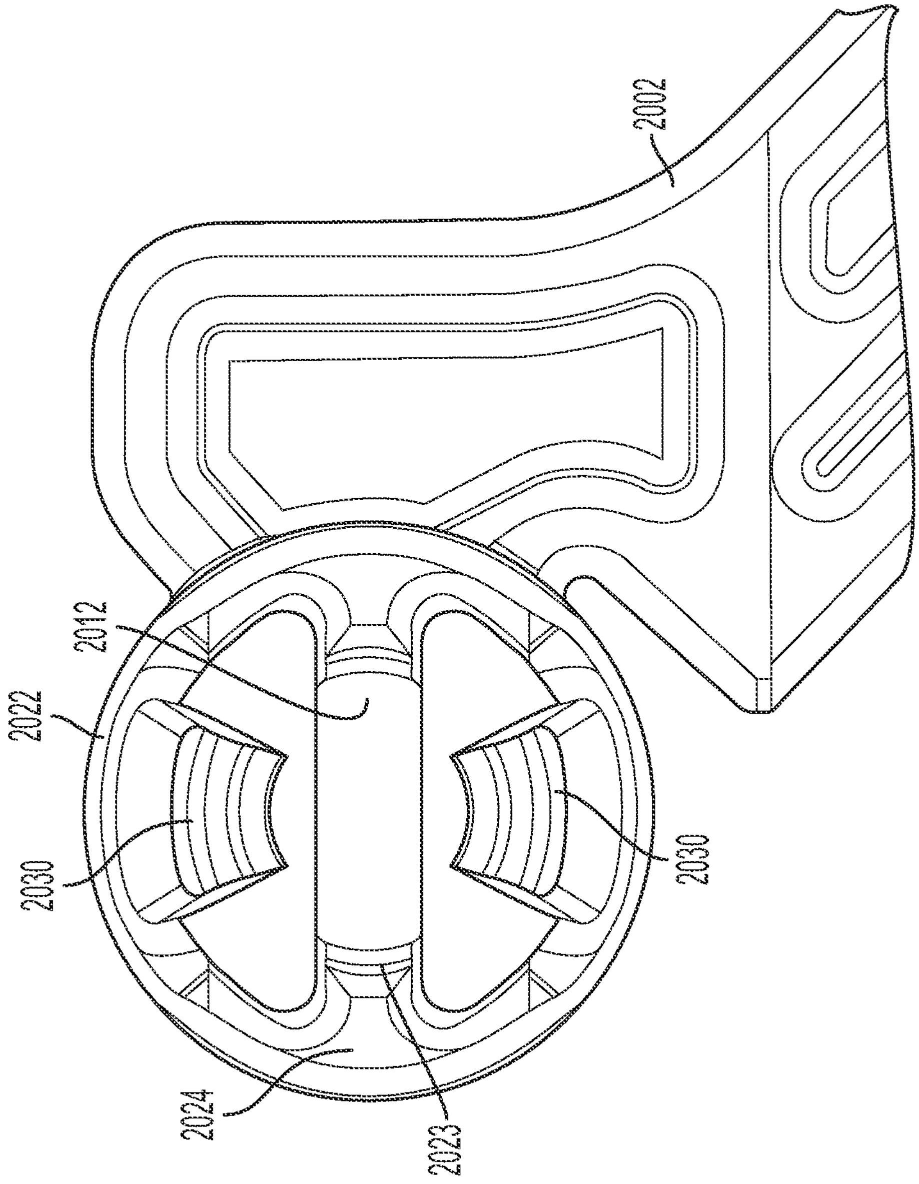
FIG. 63 is a front elevation view of a portion of the pawl of FIG. 57.

As best shown in the cross-sectional view of FIG. 60, a line X passes through the gussets 2014 of each post 2010. Another line Z represents the centerline of the latch assembly 2000. The centerline Z is oriented perpendicular to the axis of rotation of the latch assembly 2000 with respect to the door 102. The centerline Z also extends across a width dimension of the door 102. An acute angle Y is defined between the imaginary lines Y and Z. The angle Y may be 45 degrees, for example.

Figure 64:
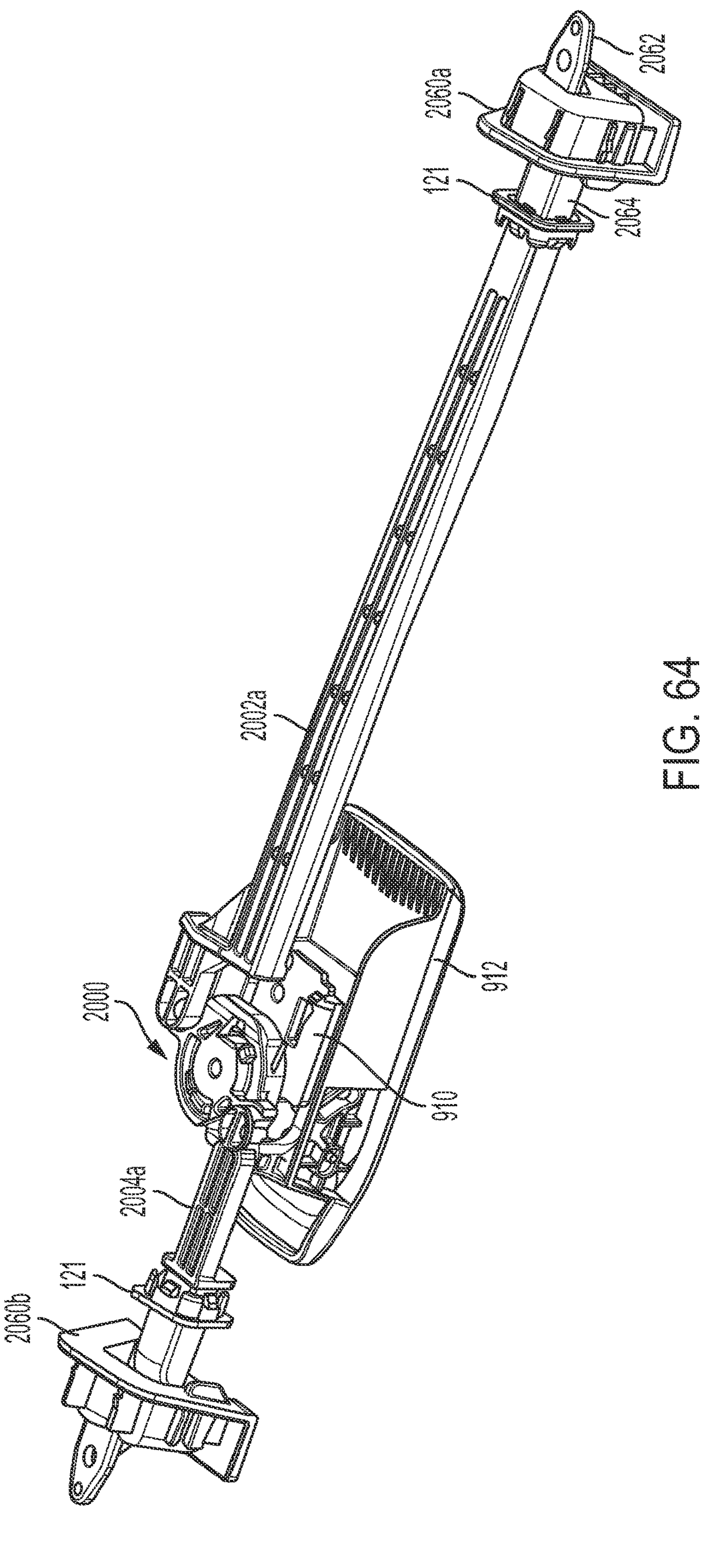
FIG. 64 is an isometric view of the latch assembly of FIG. 57 coupled to clips and strikers, and having alternative pawls.
Figure 67:
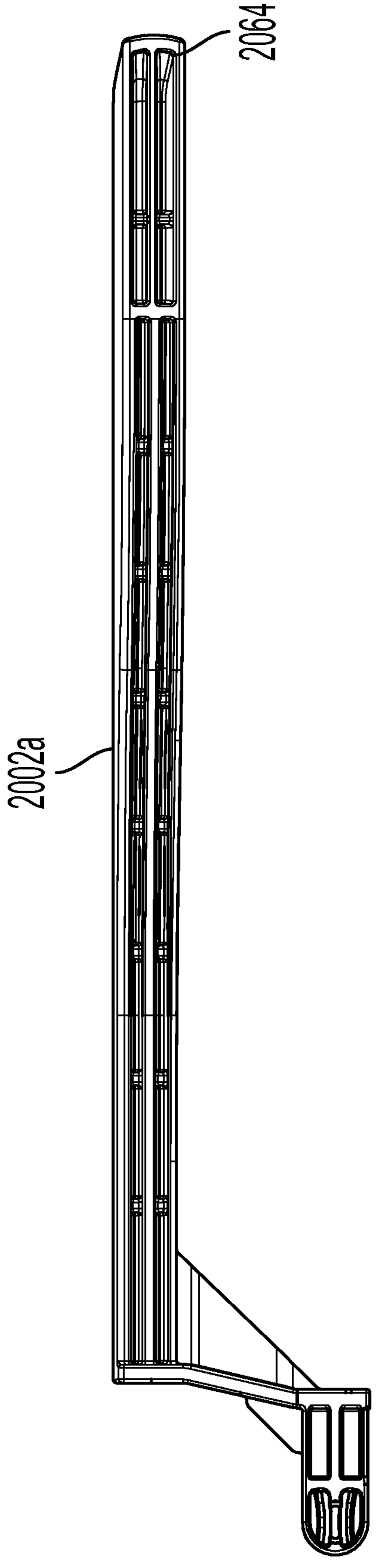
FIG. 67 is an isometric view of the long pawl of FIG. 64.
Figure 69:
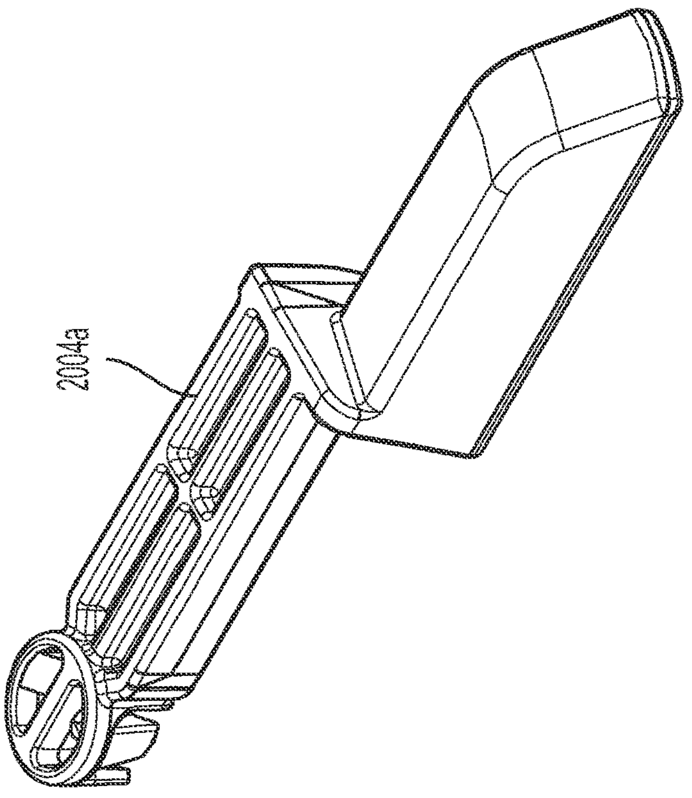
FIGS. 68 and 69 are isometric views of the short pawl of FIG. 64.
Figure 68:
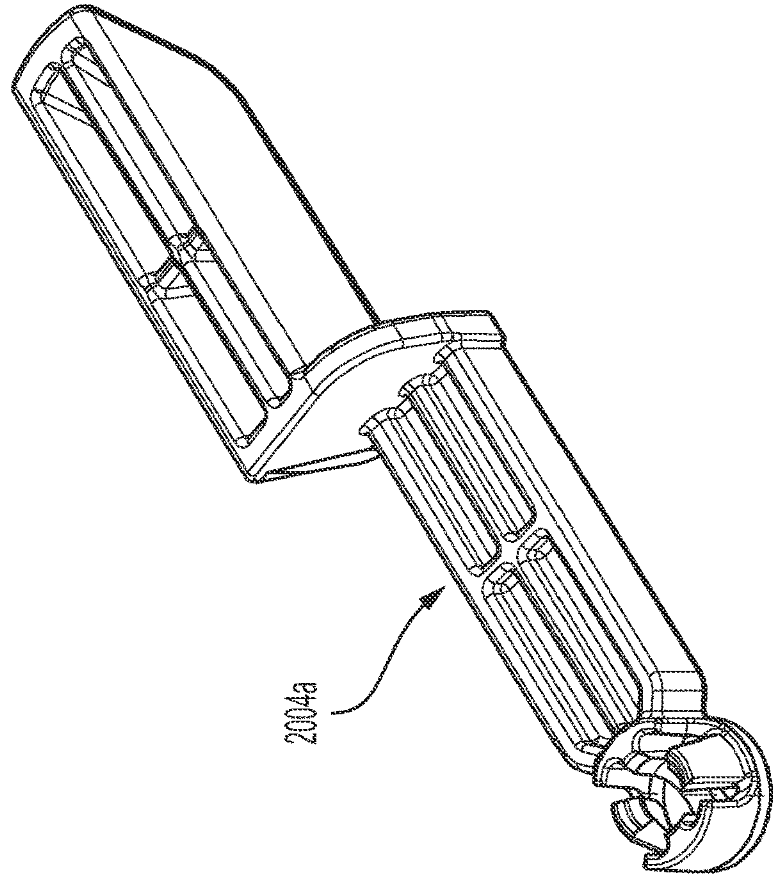

Although the attachment portion of only the pawl 2002 will be described hereinafter, it should be understood that the attachment portion of the other pawl 2004 is structurally and functionally equivalent. The pawl 2002 includes an elongated portion 2020 that passes through the clip 121 (FIGS. 1B and 64) and a striker 2060*b*. The other pawl 2004 also includes an elongated portion that interacts with the clip 121 and a striker 2060*a*. It is noted that the pawls shown in FIG. 64 differ slightly from those shown in FIG. 58, therefore the pawls in FIG. 64 are designed with characters 'a.' Detailed views of the alternative pawls 2002*a* and 2004*a* are shown in FIGS. 67-69.

Figure 70:
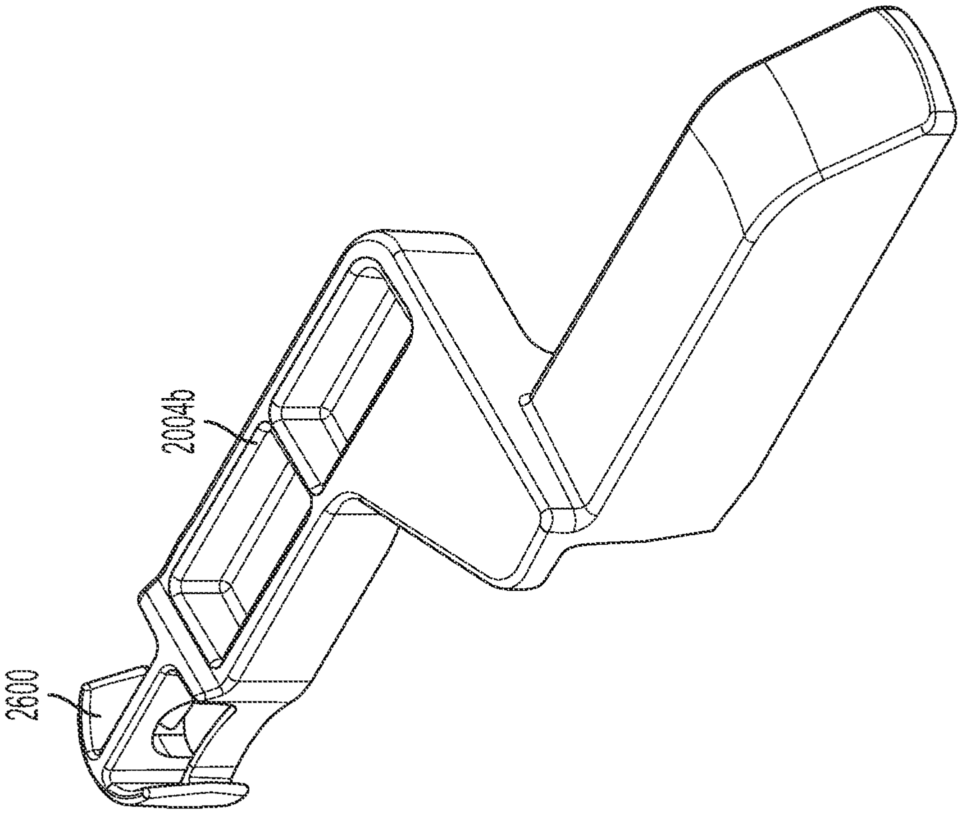
FIG. 70 is an isometric view of another alternative pawl that can be used with the rotor of FIG. 65.

Referring back to FIG. 61, the pawl 2002 includes an attachment end 2022 that is configured to be connected to the post 2010. The attachment end 2022 includes an annular portion 2024 and a rib 2026 extending across the revolved interior surface of the annular portion 2024. The top end of the annular portion 2024 shown in FIG. 58 forms a complete circle, whereas the bottom end of the annular portion 2024 is non-continuous. As an alternative to the non-continuous bottom end of the annular portion 2024, the outer surface of the annular portion 2024 may continue about its entire perimeter along the full length of the portion 2024, such as shown in FIG. 67. As an alternative to the continuous top end of the annular portion 2024 shown in FIG. 58, the top end 2700 may be discontinuous as shown in FIG. 70. The discontinuous top end 2700 of the pawl 2700 will offer increased flexion, and may be simpler to mold.

Referring back to FIG. 61, an interior facing rounded surface 2023 is defined on opposing sides of the annular portion 2024 as well as the lower surface of the rib 2026. The geometry of the rounded surface 2023 is configured to compliment that of the spherical surface of the post 2010. The free edges of the rounded surface 2023 are either rounded or chamfered for receiving the post 2010 upon assembling the post 2010 onto the attachment end 2022.

Two prongs 2030 extend downward from annular portion 2024 and are positioned at opposing circumferential locations about the perimeter of the portion 2024. Each prong 2030 includes an interior surface 2032 that is positioned in contact with the outer surface of the post 2010. The interior surface 2032 includes an edge that, along with the rounded surface 2023, is intended to captivate the post 2010 to the attachment end 2022 of the pawl 2002. Stated differently, the surfaces 2032 and 2023 form a socket for receiving the post 2010. The interior surfaces 2032 and the side 2023 are arranged sequentially and are evenly spaced about the annular portion 2024.

The prongs 2030 also serve as rotation limiters to limit rotation of the post 2010 within the attachment end 2022 of the pawl 2002. More particularly, upon rotation of the post 2010 by more than a pre-determined angle in either a clockwise or counterclockwise direction, two leading shoulders 2018 will bear on two opposing sides of the prongs 2030, thereby preventing further rotation of the post 2010 in that same direction.

Due to the geometry and arrangement of the gussets 2014, the prongs 2030 and the gap 2014, the pawls 2002 and 2004 can only be installed on their respective posts 2010 in a single rotational orientation. This aids in simplifying the assembly process and preventing an assembly error. If an assembler were to attempt to connect the pawl in the incorrect rotational orientation (and where the pawl would be out of alignment with the strikers 2060 (FIG. 64)), then the prongs 2030 of the pawl would bear on and interfere with the gussets 2014, which interference would prevent the pawl from connecting to the post 2010 in that incorrect rotational orientation.

It is noted that the latch assembly 2000 may be provided in the form of a sub-assembly along with pawls 2002 and 2004 (or pawls **2002*a* and 2004*a*), the clips 121 and/or the strikers 2060*a* and 2060*b* of FIG. 64. The clip 121** may also be referred to herein as a bushing.

Figure 66:
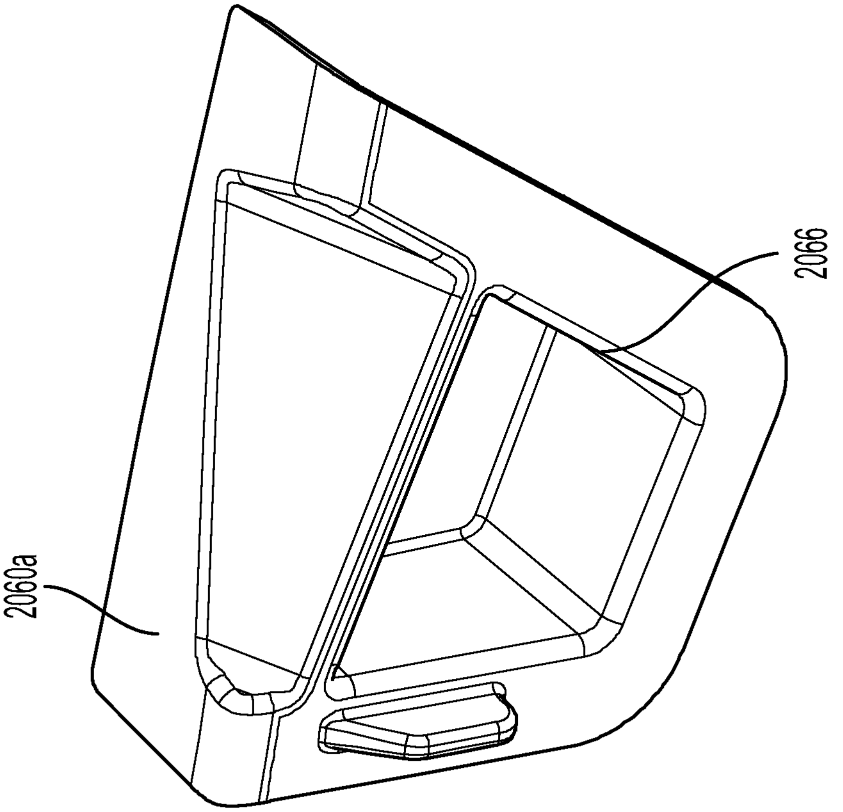
FIG. 66 is an isometric view of a striker of FIG. 64.

FIG. 66 depicts the striker **2060*a*. It should be understood that the striker 2060*b* is similar to the striker 2060*a*, and may be a mirror image thereof. Referring now to FIGS. 64, 66 and 67, the striker 2060*a* is mounted to the interior wall of the glove box housing (not shown) by one or more fasteners (for example) that are inserted through holes in the tab 2062 of the striker 2060*a* (FIG. 64). The surface of the striker 2060*a* facing the connection end 2064 of the pawl 2002*a* includes a recess 2066 for releasably receiving the tip at the connection end 2064 of the pawl 2002*a***.

Alternative Arrangements for Actuator

FIGS. 39-44 depict alternative arrangements for an actuator that moves a deadbolt or a deadbolt-like member.

Figure 32:
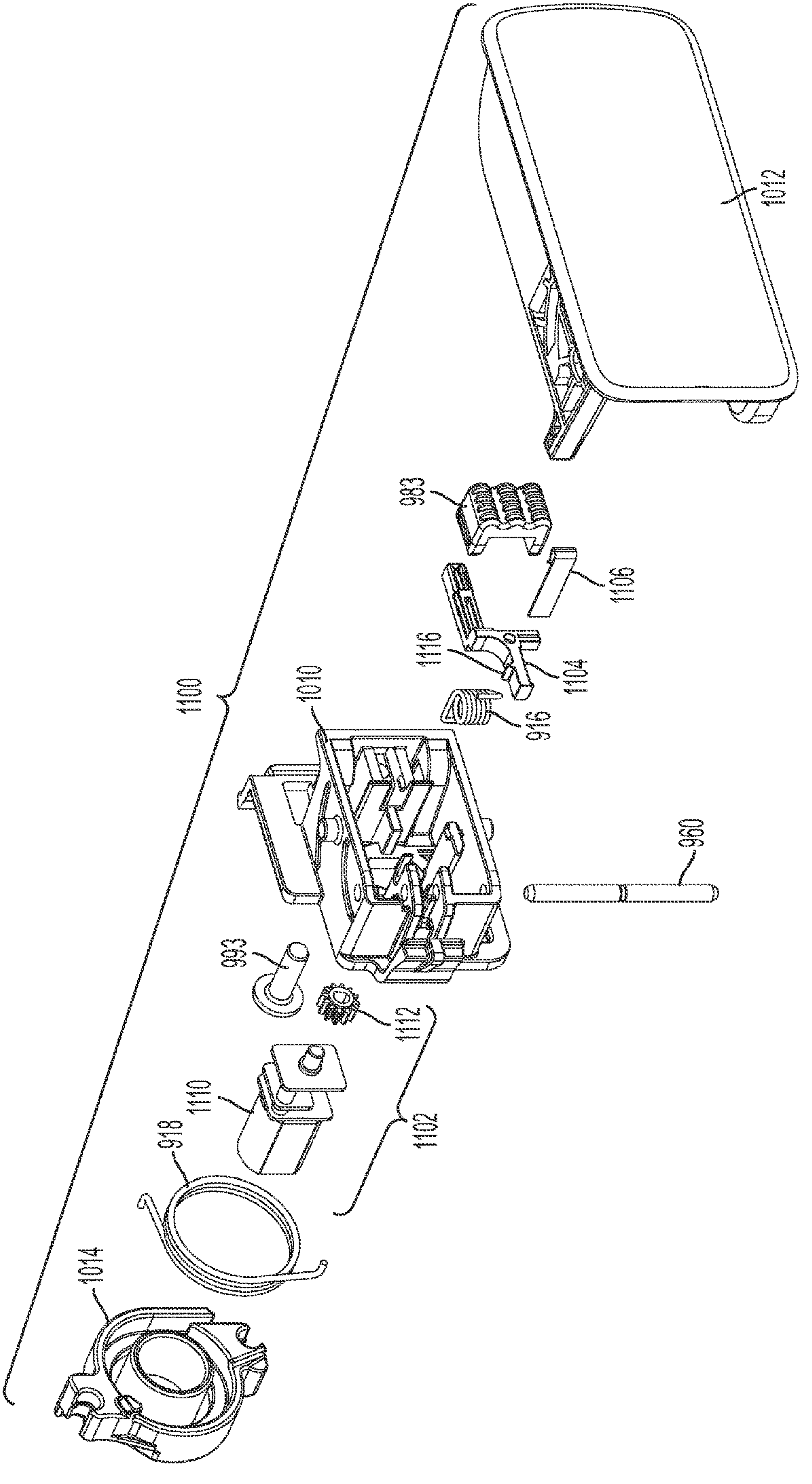
FIG. 32 is an exploded view of a fourth exemplary embodiment of a locking latch assembly for use with the door assembly of FIGS. 25A-25D.
Figure 39:
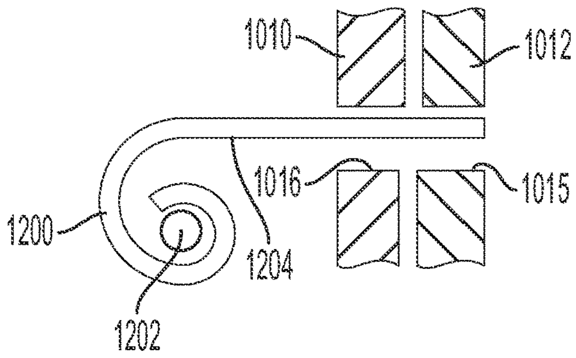
FIG. 39 depicts a schematic view of an alternative arrangement for locking the paddle of the locking latch assembly of FIG. 32, wherein the alternative arrangement comprises a motor driven clock spring.

FIG. 39 depicts a schematic view of an alternative arrangement for locking the paddle 1012 of the locking latch assembly of FIG. 32, wherein the alternative arrangement comprises a motor driven clock spring 1200. The clock spring 1200 is wound or unwound by the shaft 1202 of a motor. When the clock spring 1200 is unwound, the end 1204 is positioned through the opening 1016 of the housing 1010 and at least partially through the opening 1015 of the paddle 1012, thereby locking the paddle 1012 in a fixed position. Rotating the shaft 1202 of the motor in the opposite direction withdrawals the end 1204 of the paddle 1012 from the opening 1015 of the paddle 1012, thereby releasing and unlocking the paddle 1012. The locked position of the paddle 1012 is shown.

Figure 40:
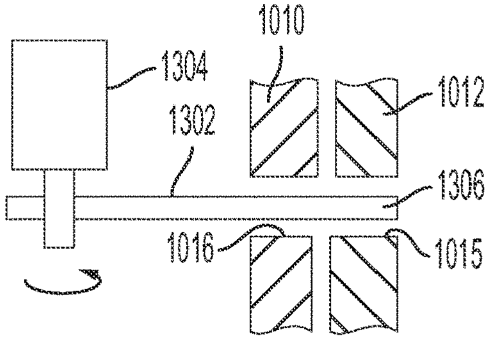
FIG. 40 depicts a schematic view of an alternative arrangement for locking the paddle of the locking latch assembly of FIG. 32, wherein the alternative arrangement comprises a motor driven eccentric member.

FIG. 40 depicts a schematic view of an alternative arrangement for locking the paddle 1012 of the locking latch assembly of FIG. 32, wherein the alternative arrangement comprises a motor driven eccentric member 1302. The eccentric member 1302 is rotated by the shaft 1202 of a motor 1304 to which it is non-rotatably mounted. To lock the paddle 1012 in a fixed position, the eccentric member 1302 is rotated such that the eccentric portion 1306 having a large diameter is positioned through the opening 1016 of the housing 1010 and at least partially through the opening 1015 of the paddle 1012, thereby preventing the paddle 1012 from moving with respect to the housing 1010. To unlock the paddle 1012, the eccentric member 1302 is rotated such that the eccentric portion 1306 having a large diameter is separated from the opening 1015 of the paddle 1012, thereby permitting the paddle 1012 to move with respect to the housing 1010.

Figure 41:
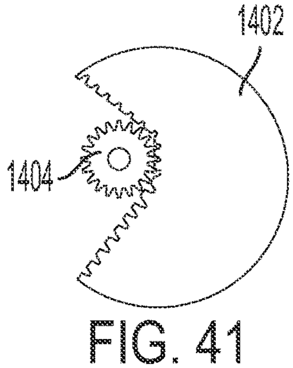
FIG. 41 depicts an alternative motor driven eccentric member for the schematic of FIG. 40 comprising a motor driven crescent cam.

FIG. 41 depicts an alternative motor driven eccentric member for the arrangement of FIG. 40 comprising a motor driven crescent cam 1402. The crescent cam 1402 is driven by a gear 1404. The crescent cam 1402 replaces the eccentric member 1302 shown in FIG. 40, and the gear 1404 can be connected to the motor 1304 of FIG. 40.

Figure 42:
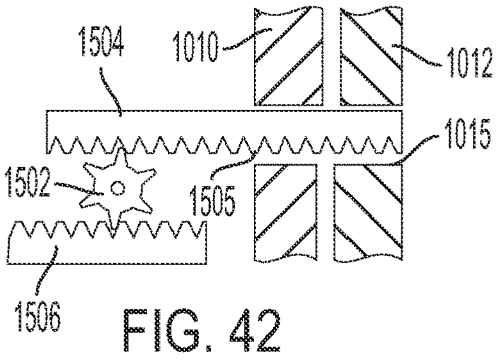
FIG. 42 depicts a schematic view of yet another alternative arrangement for locking the paddle of the locking latch assembly of FIG. 32, wherein the alternative arrangement comprises a motor driven rack and pinion.

FIG. 42 depicts a schematic view of yet another alternative arrangement for locking the paddle of the locking latch assembly of FIG. 32, wherein the alternative arrangement comprises a motor driven rack and pinion. A gear 1502, which is powered by the output shaft of a motor (not shown) is engaged with the gear teeth 1505 on a top rack 1504, and the gear teeth on a bottom rack 1506. The bottom rack 1506 is optional. To lock the paddle 1012 in a fixed position, the gear 1502 is rotated such that the top rack 1504 moves through the opening 1016 of the housing 1010 and at least partially through the opening 1015 of the paddle 1012, thereby preventing the paddle 1012 from moving with respect to the housing 1010. To unlock the paddle 1012, the gear 1502 is rotated in the opposite direction such that the top rack 1504 moves out of the opening 1015 of the paddle 1012, thereby permitting the paddle 1012 to move with respect to the housing 1010.

Figure 43:
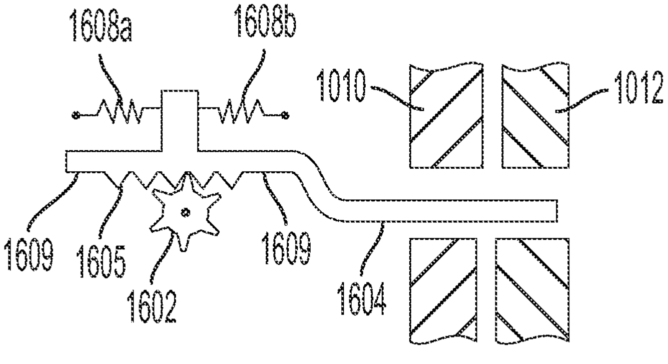
FIG. 43 depicts a schematic view of still another alternative arrangement for locking the paddle of the locking latch assembly of FIG. 32, wherein the alternative arrangement comprises a motor driven rack and pinion that is biased by springs.

FIG. 43 depicts a schematic view of yet another alternative arrangement for locking the paddle of the locking latch assembly of FIG. 32, wherein the alternative arrangement comprises a motor driven and spring loaded rack and pinion. A gear 1602, which is powered by the output shaft of a motor (not shown) is engaged with the gear teeth 1605 on the lower surface of a rack 1604. The rack 1604 is biased to a central position by two springs **1608*a* and 1608*b* that bias the rack 1604 in opposing directions. One end of each spring 1608*a* and 1608*b* is mounted to the rack 1604 and the opposite end of each spring 1608*a* and 1608*b* is mounted to a stationary and fixed point. To lock the paddle 1012 in a fixed position, the gear 1602 is rotated such that the rack 1604 moves through the opening 1016 of the housing 1010 and at least partially through the opening 1015 of the paddle 1012 against the bias of the spring 1608*a*, thereby preventing the paddle 1012 from moving with respect to the housing 1010. To unlock the paddle 1012, the gear 1602 is rotated in the opposite direction such that the rack 1604 moves out of the opening 1015 of the paddle 1012 against the bias of the spring 1608***b*, thereby permitting the paddle 1012 to move with respect to the housing 1010. The length 1609 of the rack 1604 on either side of the teeth 1605 is free of teeth to prevent damage to the rack 1604.

Figure 44:
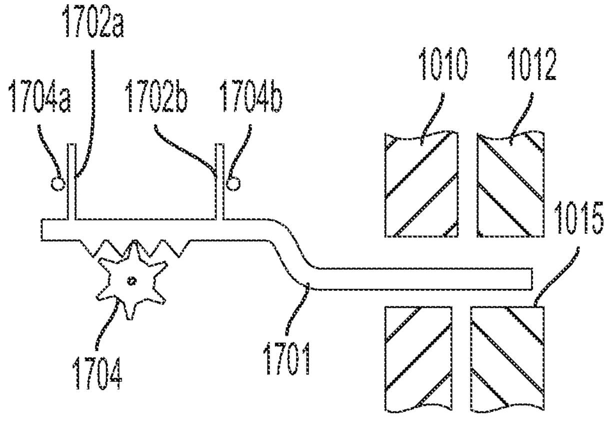
FIG. 44 depicts a schematic view of yet another alternative arrangement for locking the paddle of the locking latch assembly of FIG. 32, wherein the alternative arrangement comprises a motor driven rack and pinion that is biased by living springs extending from the rack and that are engaged by stationary posts.

FIG. 44 depicts a schematic view of yet another alternative arrangement for locking the paddle of the locking latch assembly of FIG. 32. The arrangement shown in FIG. 44 is substantially the same as the arrangement shown in FIG. 43 with the exception that the arrangement shown in FIG. 44 is biased by flexible living springs 1702*a* and 1702*b*. More particularly, living springs 1702*a* and 1702*b* extend from the top surface of the rack 1701. The interaction between the living springs 1702*a* and 1702*b* and the stationary posts 1704*a* and 1704*b*, respectively, centers the rack 1701. More particularly, when the gear 1705 rotates the rack 1701 toward the locked position, the living spring 1702*b* deflects against the stationary post 1704*b*, and when the gear 1705 is rotated in the opposite direction, the living spring 1702*b* returns to its initial form. Conversely, when the gear 1705 rotates the rack 1701 toward the unlocked position, the living spring 1702*a* deflects against the stationary post 1704*a*, and when the gear 1705 is rotated in the opposite direction, the living spring 1702*a* returns to its initial form.

Figure 71A:
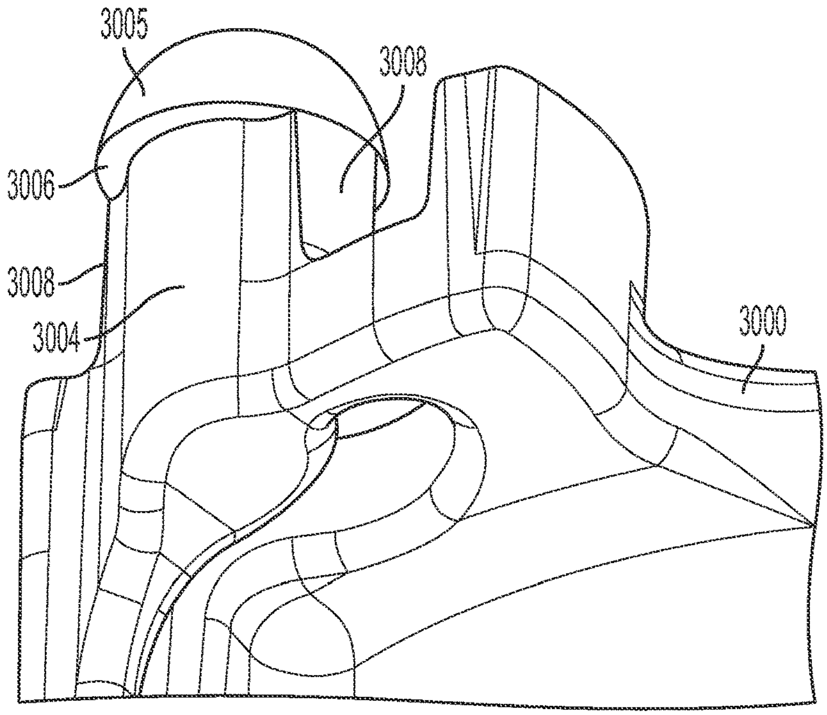
FIG. 71A depicts a partial isometric view of alternative rotor.
Figure 71B:
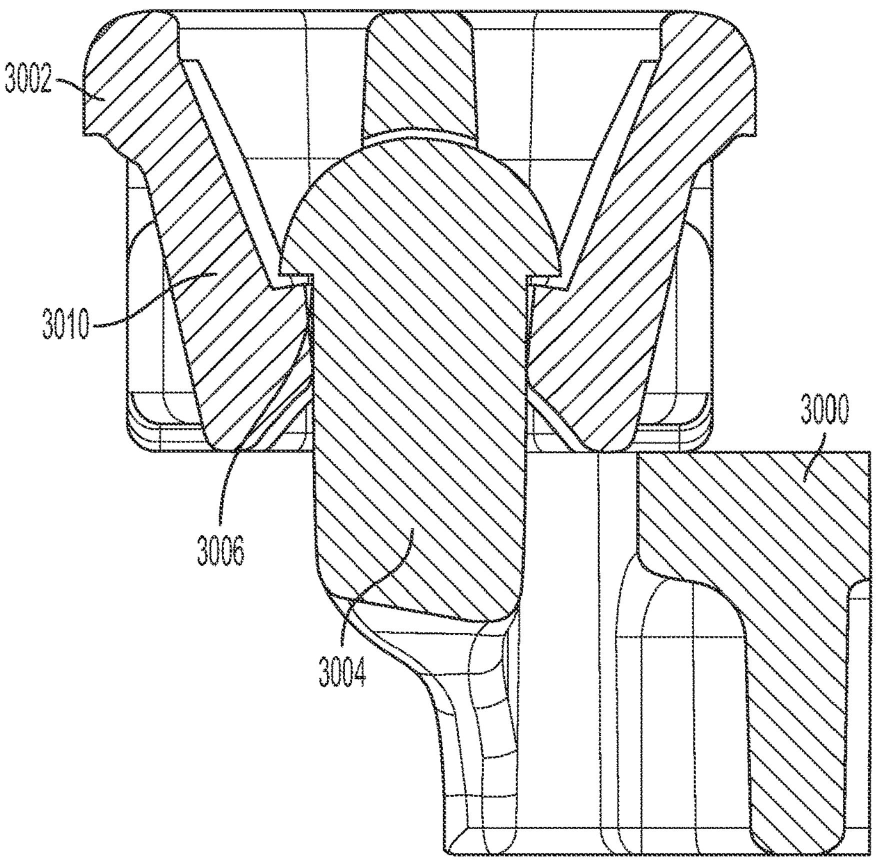
FIG. 71B depicts a cross-sectional view of the rotor of FIG. 71A mated with a pawl.

FIG. 71A depicts a partial isometric view of alternative rotor 3000. And, FIG. 71B depicts a cross-sectional view of the rotor 3000 mated with a pawl 3002. The rotor 3000 is similar to the rotor 2006, and the pawl 3002 is similar to the pawl 2002, and only the differences therebetween will be described.

The rotor 3000 is structurally similar to the rotor 2006 with the exception that each post 3004 of the rotor 3000 is cylindrical and includes a hemi-spherical top portion 3005 and a relief or shoulder 3006 defined directly beneath the hemi-spherical top portion 3005. The shoulder 3006 is defined at the intersection of the cylindrical portion and the hemi-spherical top portion 3005. The shoulder 3006 extends between the opposing gussets 3008.

Upon assembling the post 3004 onto the pawl 3002, the hemi-spherical top portion 3005 urges the free ends of each resilient prong 3010 of the pawl 2002 radially outwardly. Once the prongs 3010 clear the hemi-spherical top portion 3005, the prongs 3010 and spring back inwardly and snap into the shoulder 3006. The prongs 3010 are captivated between the shoulder 3006 and the top side of the rotor 3000, as shown in FIG. 71A to prevent detachment of the rotor 3000 from the pawl 3002.

While preferred embodiments of the invention have been shown and described herein, it will be understood that such embodiments are provided by way of example only. Numerous variations, changes and substitutions will occur to those skilled in the art without departing from the spirit of the invention. For example, the latches described herein may be used for any compartment, and are not limited to a vehicle glove box. Accordingly, it is intended that the appended claims cover all such variations as fall within the spirit and scope of the invention.

What is claimed is:

1. A vehicle glove box latch sub-assembly for a vehicle glove box, said vehicle glove box latch sub-assembly comprising:

a housing that is configured to be connected to the vehicle glove box;

a rotor that is pivotably connected to a rotor mounting portion of the housing, the rotor including a body, a post disposed on the body, and rotation limiters extending from the post; and at least one pawl rotatably coupled to the rotor and having opposing ends, wherein one end of the opposing ends of the pawl includes an engagement portion that is configured to be engaged with an opening in the vehicle in which the glove box is mounted, and the other end of the opposing ends of the pawl includes a socket that is mounted to the post of the rotor for securing the pawl to the rotor, wherein the socket includes a rotation limiter that is configured to bear on the rotation limiter of the post upon relative rotation between the post and the socket to either limit or prevent rotation relative rotation between the post and the socket beyond a pre-determined rotational angle.

2. The vehicle glove box latch sub-assembly of claim 1, wherein each rotation limiter of the post comprises a gusset that extends radially outwardly from the post.

3. The vehicle glove box latch sub-assembly of claim 1, wherein a shoulder is formed on each side of the gusset, and the shoulder is configured to bear on the rotation limiter of the socket.

4. The vehicle glove box latch sub-assembly of claim 1, wherein the post is a spherical surface.

5. The vehicle glove box latch sub-assembly of claim 1, wherein the socket of the pawl includes an annular portion and the rotation limiter of the pawl extends in an axial direction from the annular portion.

6. The vehicle glove box latch sub-assembly of claim 1, wherein the rotation limiter of the socket comprises a flexible and resilient prong that is configured to be connected directly to the post.

7. The vehicle glove box latch sub-assembly of claim 6 further comprising two rotation limiters disposed on the socket that are positioned on opposite ends of the socket and face each other.

8. The vehicle glove box latch sub-assembly of claim 1, wherein the rotation limiter of the socket includes a rounded surface for receiving the post, and the rotation limiter of the socket is circumferentially spaced apart from the rounded surface of the socket.

9. The vehicle glove box latch sub-assembly of claim 8, wherein a geometry of the rounded surface mimics the geometry of the post.

10. The vehicle glove box latch sub-assembly of claim 1, further comprising a user operated paddle that is pivotably connected to a paddle mounting portion of the housing, the paddle configured for movement between a home position and a deployed position.

11. The vehicle glove box latch sub-assembly of claim 1, further comprising at least one striker that is configured to interact with an elongated body of the pawl.

12. The vehicle glove box latch sub-assembly of claim 1, further comprising a bearing surface disposed on the rotor that is spaced from the post and positioned adjacent an exterior surface of the pawl, wherein, in the event of application of force applied onto the pawl, the exterior surface of the pawl is configured to bear on the bearing surface of the rotor in order to limit the application of force applied onto the post by the pawl.

13. The vehicle glove box latch sub-assembly of claim 1, further comprising a user operated paddle that is pivotably connected to a paddle mounting portion of the housing, the paddle configured for movement between a home position and a deployed position.

14. The vehicle glove box latch sub-assembly of claim 13, wherein the paddle is configured to be operated as a side-pull paddle.

15. The vehicle glove box latch sub-assembly of claim 13, wherein the paddle is configured to be operated as a vertical-lift paddle.

16. The vehicle glove box latch sub-assembly of claim 13, further comprising:

a deadbolt that is movable with respect to the paddle between a locked position and an unlocked position, wherein, in the locked position of the deadbolt, the deadbolt is positioned to prevent the paddle from moving from the home position toward the deployed position, and, in the unlocked position of the deadbolt, the deadbolt is positioned to permit the paddle to move from the home position toward the deployed position; and an actuator that is engaged with the deadbolt and configured to move the deadbolt between the locked position and the unlocked position.

17. The vehicle glove box latch sub-assembly of claim 16, wherein the actuator is a lock that includes an electric motor having an output shaft and a gear that is non-rotatably coupled to the output shaft.

18. The vehicle glove box latch sub-assembly of claim 1, wherein the post includes a cylindrical base portion, a hemi-spherical head portion at a free end of the post, and a shoulder defined at the intersection of the cylindrical base portion and the hemi-spherical head portion, wherein a resilient prong defined on the socket is configured to bear on the shoulder of the post in an assembled configuration.

19. A pawl for a vehicle glove box latch for a vehicle glove box, said pawl comprising:

an elongated body having opposing ends, wherein one end of the opposing ends of the pawl includes an engagement portion that is configured to be engaged with an opening in the vehicle in which the glove box is mounted, and the other end of the opposing ends of the pawl includes a socket that is configured to be mounted to a rotor for securing the pawl to the rotor, wherein the socket includes a rotation limiter that is configured to bear on a surface of the rotor upon relative rotation between the rotor and the socket to either limit or prevent rotation relative rotation between the rotor and the socket beyond a pre-determined rotational angle.

20. The pawl of claim 19, wherein the socket of the pawl includes an annular portion and the rotation limiter of the pawl extends in an axial direction from the annular portion.

21. The pawl of claim 19, wherein the rotation limiter of the socket comprises a flexible and resilient prong that is configured to be connected directly to the rotor.

22. The pawl of claim 21 further comprising two rotation limiters disposed on the socket that are positioned on opposite ends of the socket and face each other.

23. The pawl of claim 19, wherein the rotation limiter of the socket includes a rounded surface for receiving the post, and the rotation limiter of the socket is circumferentially spaced apart from the rounded surface of the socket.

* * * * *